(12) United States Patent
Okamoto et al.

(10) Patent No.: US 6,922,220 B2
(45) Date of Patent: Jul. 26, 2005

(54) REFLECTIVE LIQUID CRYSTAL DISPLAY DEVICE AND REFLECTIVE LIQUID CRYSTAL DISPLAY DEVICE INCORPORATING TOUCH PANEL ARRANGED THEREFROM

(75) Inventors: Masayuki Okamoto, Kashiwa (JP); Seiichi Mitsui, Kashiwa (JP); Takashi Satoh, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/804,109

(22) Filed: Mar. 19, 2004

(65) Prior Publication Data

US 2004/0174477 A1 Sep. 9, 2004

Related U.S. Application Data

(62) Division of application No. 09/403,487, filed as application No. PCT/JP98/01348 on Mar. 26, 1998, now Pat. No. 6,791,640.

(30) Foreign Application Priority Data

Apr. 23, 1997 (JP) .............................................. 9-105518

(51) Int. Cl.7 .......................................... G02F 1/1335
(52) U.S. Cl. ..................................... 349/113; 349/119
(58) Field of Search ................................ 349/113, 117, 349/119, 96, 97, 98

(56) References Cited

U.S. PATENT DOCUMENTS

| | | |
|---|---|---|
| 3,960,438 A | 6/1976 | Bonne et al. |
| 4,701,028 A | 10/1987 | Clerc et al. |
| 4,767,190 A | 8/1988 | Dir et al. |
| 5,105,289 A | 4/1992 | Sonehara et al. |
| 5,220,444 A | 6/1993 | Mitsui et al. |
| 5,361,151 A | 11/1994 | Sonehara et al. |

(Continued)

FOREIGN PATENT DOCUMENTS

| | | |
|---|---|---|
| EP | 0 079 044 | 5/1983 |
| EP | 0522620 A2 | 1/1993 |

(Continued)

OTHER PUBLICATIONS

K.H. Yang, Euro Display 1996, LP–B, pp. 449–451, "A Self–Compensated Twisted Nematic Mode for Reflective Light Valves."

E. Beynon et al., 1997 SID, L–34–L37 "Single Polariser Reflective Twisted Nematics."

Wu et al., Appl. Phys. Lett 68 (11), Mar. 11, 1996, pp. 1455–1457, "Mixed–Mode Twisted Nematic Liquid Crystal Cells for Reflective Displays."

(Continued)

Primary Examiner—Kenneth Parker
Assistant Examiner—David Chung
(74) Attorney, Agent, or Firm—Birch, Stewart, Kolasch & Birch, LLP

(57) ABSTRACT

A reflective color liquid crystal display device with a liquid crystal layer sandwiched between a first substrate having a light reflectibility and a second substrate having a light transmissibility. The liquid crystal layer being composed of twist-aligned nematic liquid crystal having a positive dielectric anisotropy. A circularly polarizing unit, including a single linear polarizer plate, selectively passes either right handed or left handed circularly polarized light out of natural light. The circularly polarizing unit is disposed so that a major surface of the circularly polarizing unit is on a liquid crystal layer side, the circularly polarized light exiting the circularly polarizing unit through the major surface when natural light enters the circularly polarizing unit. Various parameters of the liquid crystal layer are optimized for a liquid crystal layer having a twist angle in the range of 0° to 100°.

13 Claims, 31 Drawing Sheets

U.S. PATENT DOCUMENTS

| | | | |
|---|---|---|---|
| 5,490,003 A | 2/1996 | Van Sprang | |
| 5,519,523 A | 5/1996 | Makokoro et al. | |
| 5,684,551 A | 11/1997 | Nakamura et al. | |
| 5,691,791 A | 11/1997 | Nakamura et al. | |
| 5,847,789 A | 12/1998 | Nakamura et al. | |
| 6,091,477 A * | 7/2000 | Kwok et al. | 349/180 |
| 6,295,109 B1 | 9/2001 | Kubo et al. | |
| 6,362,862 B1 | 3/2002 | Itoh et al. | |
| 6,496,241 B1 | 12/2002 | Tillin | |
| 6,542,210 B1 * | 4/2003 | Wu | 349/119 |
| 6,778,288 B1 * | 8/2004 | Ogaki et al. | 358/1.15 |

FOREIGN PATENT DOCUMENTS

| | | |
|---|---|---|
| EP | 0 576 303 | 12/1993 |
| EP | 0811870 A2 | 12/1997 |
| EP | 0840160 A2 | 5/1998 |
| GB | 1477478 | 6/1977 |
| JP | 55 48733 A | 4/1980 |
| JP | 56-19610 B2 | 5/1981 |
| JP | 01-118805 A | 5/1989 |
| JP | 02-042406 A | 2/1990 |
| JP | 02-197816 A | 8/1990 |
| JP | 2236523 A | 9/1990 |
| JP | 03-033719 A | 2/1991 |
| JP | 03-223715 A | 10/1991 |
| JP | 4116515 A | 4/1992 |
| JP | 05-100114 A | 4/1993 |
| JP | 5127822 A | 5/1993 |
| JP | 05-0323371 A | 12/1993 |
| JP | 611711 A | 1/1994 |
| JP | 06-059258 A | 3/1994 |
| JP | 6167708 A | 6/1994 |
| JP | 08-095071 A | 4/1996 |
| JP | 08-220533 A | 8/1996 |
| JP | 09-080426 A | 3/1997 |
| WO | WO 97/15255 A1 | 5/1997 |

OTHER PUBLICATIONS

A. Yariv et al., 1984, pp. 62–63, John Wiley & Sons, "Optical Waves in Crystals."

Hirakata et al., SID 1995 DIGEST, P–49, pp. 563–566, "A High–Contrast Wide–Viewing Angle Low–Twisted Nematic LCD Mode."

S. Palmer, Applied Optics, vol. 36, No. 10, Apr. 1, 1997, pp. 2094–2100, "Liquid–Crystal Cell with a Wide Viewing Angle and a High Cell Contrast."

Wei, Chung–Kuang et al., Proceedings of the Fourth Asian Symposium on Information Display (ASID), pp. 25–28 (1997)—"A 10.4–in Reflective Type TFT–LCD Using Mixed–Mode Twisted Nematics".

Pancharatnam, S., Proceedings of the Indian Academy of Science, vol. XLI, No. 4, Sec. A, pp. 130–144 (1955)— "Achromatic Combinations of Birefringent Plates".

* cited by examiner

FIG. 15

| θ4/degree | BRIGHTNESS | CONTRAST | COLOR DIFFERENCE FROM ACHROMATIC AXIS | OVERALL RATING |
|---|---|---|---|---|
| 0 | ○ | △ | ○ | ○ |
| 10 | ○ | △ | ○ | ○ |
| 20 | ○ | △ | ○ | ○ |
| 30 | ○ | △ | ○ | × |
| 40 | △ | △ | ○ | × |
| 50 | × | △ | ○ | × |
| 60 | × | △ | △ | × |
| 70 | × | ○ | × | × |
| 80 | △ | ○ | × | × |
| 90 | △ | ○ | × | × |
| 100 | △ | ○ | × | × |
| 110 | △ | ○ | × | × |
| 120 | × | ○ | × | × |
| 130 | × | ○ | × | × |
| 140 | × | ○ | × | × |
| 150 | × | ○ | △ | × |
| 160 | × | ○ | △ | × |
| 170 | × | △ | ○ | × |
| 180 | ○ | △ | ○ | ○ |
| 190 | ○ | △ | ○ | ○ |
| 200 | ○ | △ | ○ | ○ |
| 210 | ○ | △ | ○ | ○ |
| 220 | △ | △ | ○ | × |
| 230 | △ | △ | ○ | × |
| 240 | △ | △ | ○ | × |
| 250 | △ | △ | △ | × |
| 260 | ○ | ○ | × | × |
| 270 | ○ | ○ | × | × |
| 280 | ○ | ○ | × | × |
| 290 | ○ | ○ | × | × |
| 300 | △ | ○ | × | × |
| 310 | × | ○ | × | × |
| 320 | × | ○ | × | × |
| 330 | × | △ | △ | × |
| 340 | × | △ | △ | × |
| 350 | △ | △ | △ | × |

(IN TABLE, ○ IS FOR EXCELLENT, △ FOR GOOD, AND × FOR UNSUITABLE FOR USE)

Y
(12 O'CLOCK
DIRECTION
OF DEVICE)

X (3 O'CLOCK DIRECTION OF DEVICE)

REFLECTIVE LIQUID CRYSTAL DISPLAY DEVICE AND REFLECTIVE LIQUID CRYSTAL DISPLAY DEVICE INCORPORATING TOUCH PANEL ARRANGED THEREFROM

This application is a Divisional of application Ser. No. 09/403,487 filed on Oct. 22, 1999 now U.S. Pat. No. 6,791,640 and for which priority is claimed under 35 U.S.C. §120. application Ser. No. 09/403,487 is the national phase of PCT International Application No. PCT/JP98/01348 filed on Mar. 26, 1998 under 35 U.S.C. §371. The entire contents of each of the above-identified applications are hereby incorporated by reference. This application also claims priority of Application No. 9-105518 filed in Japan on Apr. 23, 1997 under 35 U.S.C. §119.

TECHNICAL FIELD

The present invention relates to reflective liquid crystal display devices for direct view application used in wordprocessors, laptop personal computers, and other office machinery, as well as in a variety of visual and game machines, without a need for a backlight, and also relates to such reflective liquid crystal display devices incorporating a touch panel arranged therefrom.

BACKGROUND ART

Liquid crystal display devices, being characterized by their thinness and light weight, have successfully found commercial applications as color display devices. Among these color liquid crystal display devices, transmissive liquid crystal display devices provided with a light source for illumination from behind are in particularly widespread use, and are adopted for an increasingly wider variety of applications because of the above-mentioned features.

In contrast to the transmission liquid crystal display device, the reflective liquid crystal display device does not require a backlight for display, and therefore can reduce the power consumption of the light source. The exclusion of the backlight further characterizes the reflective liquid crystal display device by allowing it to be more compact and lightweight.

In other words, in comparison to conventional transmissive liquid crystal display, the reflective liquid crystal display device can lower the power consumption, and be suitably used in equipment which needs to be lightweight and thin. For example, if the equipment with the reflective liquid crystal display device is designed while retaining conventional operation time, the reflective liquid crystal display device can not only cut down on the backlight space and weight, but consumes less power, and becomes capable of running on a smaller battery, making it possible to further reduce the size and weight. If the equipment with the reflective liquid crystal display device is manufactured while retaining conventional size or weight, use of a larger battery is expected to increase operation time dramatically.

In addition, as to display contrast properties, the light emitting display device, such as the CRT, degrades greatly in contrast ratio when used outdoors during the daytime. Even the transmissive liquid crystal display device subjected to a low reflection treatment inevitably suffers similarly from greatly decreased contrast ratios when used in ambient light, such as direct sunlight, that is excessively strong compared to display light.

In contrast, with the reflective liquid crystal display device, the display light obtained is proportional to the amount of ambient light, which is an especially suitable feature for application in a personal digital tool, a digital still camera, a portable camcorder, and other devices that are often used outdoors.

When considering these potential application fields, the reflective color liquid crystal display device appears very promising; however, a relatively low contrast ratio and reflectance, as well as insufficient performances in multi-color, high precision, and moving picture display, have so far been obstacles in realizing commercially viable reflective color liquid crystal display device.

The following description will explain the reflective liquid crystal display device in further detail. The conventional twisted nematic (TN) type liquid crystal element includes two linear polarizer plates (hereinafter, will be simply referred to as polarizer plates), and therefore boasts an excellent contrast ratio and viewing angle dependency property; however, the reflectance is inevitably low. In addition, since the liquid crystal modulation layer is separated from the light reflective layer by a distance equivalent to the thickness of a substrate, etc., there occurs parallax due to a disparity between incoming and outgoing optical paths of illumination light. Therefore, especially in a typical arrangement used for transmissive liquid crystal display devices where a single liquid crystal modulation layer is combined with a color filter that includes a separate subpixel for each color element, provided that light does not travel parallel to the normal to the substrate, ambient light enters and exits after reflection through different color subpixels. This causes moire and other undesirable phenomena, rendering the transmissive liquid crystal display device unsuited for high resolution, high precision, color display use.

For these reasons, no reflective color display device using this display mode has so far been commercialized.

Meanwhile, Guest-Host type liquid crystal elements (hereinafter, will be abbreviated as GH) have been developed that uses no or only one polarizer plate and includes liquid crystalline material doped with dyestuff. However, the GH type liquid crystal element is not highly reliable due to the addition of the dye, and the low dichroic ratio of the dye cannot produce a high contrast ratio.

Among these problems, the insufficient contrast level in particular causes serious degradation in color purity and creates a need to incorporate a color filter of high color purity in a color display device using a color filter. This entails a problem of reduced brightness caused by the color filter of high color purity, and cancels to some degree the advantage of this mode that high brightness is achieved by use of no polarizer plates.

On these backgrounds, research and development is under way to successfully manufacture a liquid crystal display element in a mode in which a single polarizer plate is used (hereinafter, will be referred to as a single polarizer plate mode), which is highly promising to realize a high resolution and high contrast display.

Japanese Laid-Open Patent Application No. 55-48733/1980 (Tokukaisho 55-48733) discloses such an example of a liquid crystal display element of a reflective TN mode (45°-twisted type) using a single polarizer plate and a quarter-wave plate.

With this liquid crystal display device, black and white display is performed, using a 45°-twisted liquid crystal layer and controlling the electric field applied thereacross, by realizing two states, in one of which the plane of polarization of incoming linearly polarized incident light is parallel to the optical axis of the quarter-wave plate and in the other of which the plane of polarization forms 45° with the optical axis of the quarter wave plate. The liquid crystal cell is structured to include a polarizer, a 45°-twisted liquid crystal cell, a quarter-wave plate, and a reflector plate, when viewed from the side at which light enters.

Further, U.S. Pat. No. 4,701,028 (Clerc et al.) discloses a liquid crystal display device of a reflective-type, homeotropic alignment mode wherein a combination of a single polarizer plate, a quarter-wave plate, and a perpendicularly aligned liquid crystal cell is used.

Meanwhile, the inventors of the present application filed an application for a reflective-type, parallel alignment mode wherein a combination of a single polarizer plate, a homogeneous alignment liquid crystal cell, and an optical retardation compensation plate is used (see Japanese Laid-Open Patent Application No. 6-167708/1994 (Tokukaihei 6-167708)).

This reflective liquid crystal display device includes a liquid crystal cell constituted by a homogeneously-aligned liquid crystal layer, a reflector plate (disposed inside the liquid crystal cell beneath the liquid crystal layer), a polarizer plate (disposed on the liquid crystal cell), and a single optical retardation compensator plate (placed between the liquid crystal cell and the polarizer plate). Further, according to this display mode, throughout the total length of the optical path, i.e., the incoming optical path and the outgoing optical path, light passes through the polarizer plate only twice and through the transparent electrode where light is inevitably absorbed on a glass substrate (top substrate) of the liquid crystal cell also only twice. Therefore, a high reflectance can be obtained by means of a reflective liquid crystal display device of this structure.

Further, Japanese Laid-Open Patent Application No. 2-236523/1990 (Tokukaihei 2-236523) discloses an arrangement in which a twisted nematic liquid crystal layer is interposed between a reflector plate (disposed inside a liquid crystal cell) and a single polarizer plate.

Further, Fourth Asian Symposium on Information Display (Chung-Kuang Wei et al., Proceedings of The Fourth Asian Symposium on Information Display, 1997, page 25; hereinafter will be abbreviated as ASID 97) discloses an arrangement wherein 90°-twisted nematic liquid crystal is interposed between a reflector plate disposed inside the cell and a combination of a quarter-wave plate and a polarizer plate which realizes a broad band display.

In addition, Japanese Laid-Open Patent Application No. 4-116515/1992 (Tokukaihei 4-116515) discloses a liquid crystal display device wherein incident circularly polarized light is used for display. In addition, as a method of obtaining circularly polarized light in a broad band of spectrum, Pancharatnam teaches the use of a plurality of optical retardation compensator plates in Proc. Ind. Acad. Sci. Vol. XLI, No.4, Sec.A, page 130, 1955.

The description below will explain display principles of a single polarizer plate mode employed in ASID 97 and in the Japanese Laid-Open Patent Applications No. 6-167708/1994, No. 2-236523/1990, and 4-116515/1992.

The polarizer plate disposed on the side where light enters serves to pass only one of the linearly polarized light components of the incoming and outgoing polarized light and absorb the other linearly polarized light component. The polarization state of the incoming light that has passed through the polarizer plate is then changed by an optical retardation compensator plate, such as a quarter-wave plate (in the cases of Japanese Laid-Open Patent Application No. 6-167708/1994 and ASID 97), or remains unchanged (in the case of Japanese Laid-Open Patent Application No. 2-236523/1990), and the light enters the liquid crystal layer. The polarization state is changed further as the light passes through the liquid crystal layer, before the light reaches a reflector plate.

Further, the light that has reached the reflector plate changes its polarization state in the reverse sequence to that of the incoming light: the light passes through the liquid crystal layer, the quarter-wave plate, etc. Consequently, the ratio of the linearly polarized light component in a transmission direction of the polarizer plate to the light obtained here will decide the total reflectance of the liquid crystal layer. In other words, the liquid crystal display element appears brightest when the outgoing light, immediately before passing through the polarizer plate, is linearly polarized in the transmission direction of the polarizer plate, and darkest when linearly polarized in the absorptive direction of the polarizer plate.

It is known that the necessary and sufficient condition for the light which enters and leaves the liquid crystal display device perpendicularly to the device to realize such a bright state is that the light be linearly polarized in an arbitrary direction on the reflector plate, and that for it to realize such a dark state is that the light be circularly polarized either right handed or left handed on the reflector plate.

Meanwhile, a touch panel, as well as a conventional keyboard, is a very useful input means incorporated in a personal digital tool. This is especially true in inputting such languages including Japanese that keyboard inputs need to be converted; with increasing information processing capability and newly developed software, the touch panel, which used to serve simply as a pointing device, now more typically plays a greater role as an input device such as a pen-based handwriting input device.

To realize this particular input method, the input device is disposed to overlap the front of the display device. However, since the reflective liquid crystal display device uses reflected light for display, the means to reduce reflection provided to the touch panel should not interrupt display image produced by the underlying reflective liquid crystal display device. For example, Japanese Laid-Open Patent Application No. 5-127822/1993 (Tokukaihei 5-127822) discloses that a touch panel, a quarter-wave plate, and a polarizer plate are stacked together to reduce reflection.

Among the aforementioned conventional techniques, the liquid crystal display device disclosed in Japanese Laid-Open Patent Application No. 55-48733/1980 is not suitable for a high resolution, high precision display, because despite the need to provide a quarter-wave plate between a liquid crystal layer and a reflector plate, it is difficult essentially to form a reflective film inside the liquid crystal cell.

In addition, the liquid crystal display device that operates in the homeotropic alignment mode disclosed in U.S. Pat. No. 4,701,028 has following problems. The homeotropic alignment, especially the inclined homeotropic alignment, is extremely difficult to control, and the control requires such a complex arrangement that is not suitable for mass production. Another shortcoming of the homeotropic alignment is its slow response.

In addition, coloring occurs with the aforementioned reflective-type parallel alignment mode due to small unevenness of the liquid crystal cell and the optical retardation compensator plate. The conventional arrangements, as discussed here, are likely to suffer from coloring in a dark state and failure to realize black and white display.

In addition, the arrangements disclosed in Japanese Laid-Open Patent Application No. 2-236523/1990 and Japanese Laid-Open Patent Application No. 4-116515/1992, although being capable of increasing the reflection in a bright state in comparison to the arrangement using two polarizer plates, still fail to realize a good black display due to great wavelength dependency of transmittance in a dark state.

In addition, ASID 97, although disclosing a display mode that enables a black and white display, does not disclose anything about the arrangement of the quarter-wave plate which is, described in this literature, to be fabricated for a broad band of spectrum.

In addition, according to a report made by Pancharatnam, three optical retardation compensator plates are required to obtain good circularly polarized light, which is not practical. In addition, detailed studies are yet to be made to combine this with liquid crystal display devices.

In contrast, the touch-panel-incorporating reflective liquid crystal display device, although its performance as a reflective liquid crystal display device has reached to a stage where it can be commercialized, still suffers from extremely poor visibility when used in a combination with a touch panel.

This is because, in the reflective display device, a single light source plays dual roles to cause reflection at the touch panel and to serve as a display light source for the display device, and decrease in visibility when used in a combination with a touch panel cannot be solved by removing the light that radiates from a light source (for example, a ceiling light) which cause reflection at the touch panel, or changing the direction of the light. This is a stark contrast to the transmissive liquid crystal display device and other light-emitting types of display devices with which this solution produces good results. A conclusion drawn from here is that the solution to the poor visibility is a key to a successful commercialization of the display device, as well as to that of a practical, low power consuming personal digital tool.

In addition, the arrangement of the touch panel disclosed in Japanese Laid-Open Patent Application No. 5-127822/1993 is effective in preventing reflection by means of the function of the quarter-wave plate; however, a typical quarter-wave plate is effective in preventing reflection only with respect to a particular wavelength in the visible range, and unavoidably less effective with respect to wavelengths that are immediately higher or lower than those particular wavelengths. Further, the brightness of a display is determined by a component of the polarized light that has travelled through the underlying display device, the component being in a transmission direction of a circular polarizer that is obtained as a combination of such a quarter-wave plate with a polarizer plate.

More specifically, when the underlying display device has substantially no polarization dependence (e.g., a white-Taylar type Guest-Host liquid crystal display device including dyestuffs added to its 360°-twisted liquid crystal), the reflection efficiency is, at maximum, half that of a display device having the same arrangement except that no touch panel is provided due to the transmittance of the polarizer plate placed on the front of the touch panel. Also, as another example, when the underlying display device utilizes linearly polarized light for a display (e.g., a TN or STN type liquid crystal display device including a polarizer plate further interposed in the space between the touch panel and the liquid crystal cell), the reflection efficiency is, at maximum, half that of a display device having the same arrangement except that no touch panel is provided. Further, in the last example, since the retardation caused by the quarter-wave plate depends on the wavelength of light, and the quarter-wave plate is sandwiched by polarizer plates, which causes tonal changes. In either case, brightness is insufficient, and is not suited for use in a combination with a reflective liquid crystal display device to which brightness improving means such as background light cannot be applied.

From what is laid above, it can be said that the touch panel described in Japanese Laid-Open Patent Application No. 5-127822 needs to be upgraded in its reflection preventing function. Additionally, the Laid-Open Patent Application does not disclose a suitable arrangement to utilize the daylight that has entered the touch panel for the reflective liquid crystal display device.

DISCLOSURE OF THE INVENTION

The present invention has objects to solve the aforementioned problems in a reflective liquid crystal display device of a single polarizer plate mode which can realize a high resolution display, and thereby to offer a reflective liquid crystal display device that boasts excellent visibility with a high contrast ratio and a capability to perform a color display, and to offer, through application of the reflective liquid crystal display device, a reflective liquid crystal display device incorporating a touch panel which maintains an enough level of display quality with a pressure sensitive input device being installed.

To achieve the foregoing objects, a reflective liquid crystal display device in accordance with the invention as defined in this application includes:

a liquid crystal layer sandwiched between a first substrate having a light reflexibility and a second substrate having a light transmissibility, the liquid crystal layer being composed of twist-aligned nematic liquid crystal having a positive dielectric anisotropy; and circularly polarizing means, including a linear polarizer plate (hereinafter, will be simply referred to as polarizer plate), for selectively passing either right handed or left handed circularly polarized light out of natural light, wherein the first substrate, the liquid crystal layer, and the circularly polarizing means are stacked in this order to form at least a part of the reflective liquid crystal display device, the circularly polarizing means is disposed so that a major surface of the circularly polarizing means is on a liquid crystal layer side, the circularly polarized light exiting the circularly polarizing means through the major surface when natural light enters the circularly polarizing means, the liquid crystal in the liquid crystal layer has a birefringence difference, which, if multiplied by a thickness of the liquid crystal layer, produces a product of not less than 150 nm and not more than 350 nm, and the liquid crystal layer has a twist angle in a range of 45° to 100°.

The reflective liquid crystal display device is a result of research and efforts by the inventors of the present invention. The inventors of the present invention have diligently worked on various reflective liquid crystal display devices of a single polarizer plate mode which can be arranged to be free from parallax, realize a high resolution display, and be electrically switchable between different polarization states on the reflector plate required to achieve a bright state and a dark state. As a result, the inventors of the present invention have found that by arranging a reflective liquid crystal display device so as to include circularly polarizing means and thereby produce a dark state in a state where a voltage is applied across the liquid crystal layer, a satisfactory dark state can be achieved without a need for high level precision in manufacturing processes of the liquid crystal layer.

The inventors of the present invention have further found that by thus designing the liquid crystal layer adopted in a reflective liquid crystal display device including circularly polarizing means that produces such a polarization state and realizes a satisfactory bright state in a low voltage state, the manufacture of the reflective liquid crystal display device is facilitated compared to the aforementioned conventional technologies.

In other words, according to the arrangement above, by adopting the circularly polarizing means and the liquid crystal layer and configuring the same as stipulated above, problems with conventional arrangements can be solved and a reflective liquid crystal display device with excellent display properties can be realized.

In addition, in the reflective liquid crystal display device, preferably, the circularly polarizing means includes: a first optical retardation compensator plate having a retardation in a substrate normal direction set to not less than 100 nm and not more than 180 nm; a second optical retardation compensator plate having a retardation in a substrate normal direction set to not less than 200 nm and not more than 360 nm; and a linear polarizer plate, the first optical retardation compensator plate, the second optical retardation compensator plate, and the linear polarizer plate being stacked in this order when viewed from the liquid crystal layer, and $|2 \times \theta 2 - \theta 1|$ has a value not less than 35° and not more than 55°, where $\theta 1$ represents an angle formed by a slow axis of the first optical retardation compensator plate and either a transmission axis or an absorption axis of the linear polarizer plate, and $\theta 2$ represents an angle formed by a slow axis of the second optical retardation compensator plate and either the transmission axis or the absorption axis of the linear polarizer plate.

The inventors of the present invention have found that the preferred arrangement, when incorporated into the polarizer plate and the optical retardation compensator plate, enables the aforementioned polarization state to be obtained by means of the circularly polarizing means. With thus arranged circularly polarizing means, the light practically in the visible wavelength range of spectrum can be circularly polarized. Note that the transmission and absorption axes of the polarizer plate are mutually perpendicular.

In addition, in the reflective liquid crystal display device, preferably, the twist angle of the liquid crystal layer is in a range from 60° to 100°, the product of the birefringence difference of the liquid crystal in the liquid crystal layer and the thickness of the liquid crystal layer is not less than 250 nm and not more than 330 nm, and either the transmission axis or the absorption axis of the polarizer plate forms an angle, $\theta 3$, of not less than 20° and not more than 70°, or not less than 110° and not more than 150° with an alignment direction of the liquid crystal molecules in a close proximity of the second substrate.

According to this arrangement, since the product of the birefringence difference of the liquid crystal in the liquid crystal layer and the thickness of the liquid crystal layer is great, more choices are available as materials for the liquid crystal and the thickness of the liquid crystal layer can be easily controlled, facilitating the manufacture of the device. Additionally, by setting $\theta 3$ as above, a high quality reflective liquid crystal display device with suppressed contrast, coloring in a white display, and coloring in a black display can be obtained.

In addition, in the reflective liquid crystal display device, preferably, the first substrate having a light reflexibility includes a light reflective film, and the light reflective film has smooth and continuously changing concavities and convexities, and is made of a conductive material.

According to the arrangement, a diffuse reflector plate can be obtained that causes no unnecessary scattering and has no agitating function (light depolarizing function) to polarized light like a flat specular surface so as not to interfere with the reflectance modulation method whereby the reflective liquid crystal display device carries out a high resolution display. The obtained reflection property is effective by far, in comparison to a device including a non-diffusive, specular reflector plate and a scattering plate that is installed in front of a display device. In addition, since the light reflective film is made of a conductive material, the light reflective film doubles also as an electrode to apply voltage across the liquid crystal layer in collaboration with the transparent electrode of the second substrate.

Further, preferably, the concavities and convexities of the light reflective film have a direction dependent property that varies according to a direction on a substrate plane.

The preferred arrangement is a result of our finding that the mean cycle of the concavities and convexities provided on the light reflective film characterize the diffusive reflection property, and more specifically, enables the reflectance of illumination light that travels from a particular direction and is reflected in a particular direction to be increased, by uniformly setting the mean convex and concave cycle in any given direction on a plane of the reflector plate so that incident light is uniformly diffused, and modifying the cycle for a particular direction on the plane. The arrangement is especially effective when incorporated in a reflective liquid crystal display device in accordance with the invention as defined in this application which realizes a satisfactory dark state in comparison to Guest-Host mode, enabling even a brighter reflective liquid crystal display device to be obtained.

In addition, in the reflective liquid crystal display device, preferably, a single third optical retardation compensator plate or a plurality of the same is(are) provided between the circularly polarizing means and the liquid crystal layer to cancel a residual phase difference of the liquid crystal layer.

The preferred arrangement is made to eliminate residual phase difference, i.e., a light polarization modification function, that slightly remains in accordance with the component of the alignment of the liquid crystal that is parallel to the substrate, when the voltage applied across the liquid crystal layer has limitations and a maximum voltage is applied across the liquid crystal layer only to achieve a dark display. By canceling the residual phase difference by means of the third optical retardation compensator plate, a satisfactory black display is achieved at a practically maximum voltage. In addition, the same effects can be achieved by modifying the retardation of the second optical retardation compensator plate.

In addition, in the reflective liquid crystal display device, preferably, either the third optical retardation compensator plate or at least one of the third optical retardation compensator plates provided between the circularly polarizing means and the liquid crystal layer has an inclined optical axis, or a three-dimensionally aligned optical axis having therein a continuously varying inclined direction.

In a method to achieve a satisfactory dark display at a maximum value of an actual driving voltage and hence obtain a satisfactory display, cancelling the residual birefringence of the liquid crystal in a state where a substantial voltage is applied across the liquid crystal layer is effective, and to do this, it is possible to expand the viewing angle by expanding a viewing angle range in such a manner to satisfactorily cancel the residual birefringence of the liquid crystal layer.

To achieve this, in this arrangement, either the third optical retardation compensator plate or at least one of the third optical retardation compensator plates is designed with the three-dimensional configuration of the alignment of the liquid crystal taken into consideration. This enables a reflective liquid crystal display device having more satisfactory display properties to be obtained.

In addition, in the reflective liquid crystal display device, preferably, the first and second optical retardation compensator plates have such ratios of a refractive index anisotropy, $\Delta n(450)$, with respect to light having a wavelength of 450 nm, a refractive index anisotropy, $\Delta n(650)$, with respect to light having a wavelength of 650 nm, and a refractive index anisotropy, $\Delta n(550)$, with respect to light having a wavelength of 550 nm that satisfy $1 \leq \Delta n(450)/\Delta n(550) \leq 1.06$ and $0.95 \leq \Delta n(650)/\Delta n(550) \leq 1$ respectively (the first arrangement), and more preferably, $1 \leq \Delta n(450)/\Delta n(550) \leq 1.007$ and $0.987 \leq \Delta n(650)/\Delta n(550) \leq 1$ respectively (the second arrangement).

According to the first arrangement, a highly practicable contrast ratio of 10:1 or larger can be achieved although there occur slight coloring in a bright state required of the reflective liquid crystal display device and reduction in contrast due to improvement of the reflectance in a dark state. Further, according to the second arrangement, a contrast ratio of 15:1 or larger can be achieved while successfully reducing coloring further in comparison to the first arrangement.

In addition, in the reflective liquid crystal display device, preferably, the twist angle of the liquid crystal layer is in a range of not less than 65° and not more than 90°, the product of the birefringence difference of the liquid crystal in the liquid crystal layer and the thickness of the liquid crystal layer is not less than 250 nm and not more than 300 nm, and either the transmission axis or the absorption axis of the polarizer plate forms an angle, $\theta 3$, of not less than 110° and not more than 150° with an alignment direction of the liquid crystal molecules in a close proximity of the second substrate (in contact with the second substrate).

According to the arrangement, the voltage to drive the liquid crystal layer can be further reduced, and a satisfactory white display can be achieved as well.

In addition, in the reflective liquid crystal display device, preferably, either the transmission axis or the absorption axis of the polarizer plate forms an angle, $\theta 3$, of not less than 110° and not more than 150° with an alignment direction of the liquid crystal molecules in a close proximity of the second substrate, and a viewing direction is set to a direction on a plane that, is defined by a normal to a display surface and a direction 90° off the alignment direction of the liquid crystal molecules in a close proximity of the second substrate.

Similarly, in the reflective liquid crystal display device, preferably, either the transmission axis or the absorption axis of the polarizer plate forms an angle, $\theta 3$, of not less than 20° and not more than 70° with an alignment direction of the liquid crystal molecules in a close proximity of the second substrate, and a viewing direction is set to a direction on a plane that is defined by a normal to a display surface and the alignment direction of the liquid crystal molecules in a close proximity of the second substrate.

According to the arrangement, by thus setting the viewing direction, a satisfactory visibility can be ensured. To put it differently, a satisfactory visibility can be obtained by setting $\theta 3$ according to the viewing direction of the viewer. In addition, a satisfactory visibility can be obtained also by disposing, for example, a member for setting the viewing direction of the viewer on the display surface.

In addition, in the reflective liquid crystal display device, preferably, either the transmission axis or the absorption axis of the polarizer plate forms an angle, $\theta 3$, of not less than 110° and not more than 150° with an alignment direction of the liquid crystal molecules in a close proximity of the second substrate, a viewing direction is set to a direction on a plane that is defined by a normal to a display surface and a direction 90° off the alignment direction of the liquid crystal molecules in a close proximity of the second substrate, and the viewing direction is set to be on a plane that is defined by the normal to the display surface and a direction on a substrate plane in which the concavities and convexities of the light reflective film have a shorter mean cycle than in other directions.

Similarly, in the reflective liquid crystal display device, preferably, either the transmission axis or the absorption axis of the polarizer plate forms an angle, $\theta 3$, of not less than 20° and not more than 70° with an alignment direction of the liquid crystal molecules in a close proximity of the second substrate, a viewing direction is set to a direction on a plane that is defined by a normal to a display surface and the alignment direction of the liquid crystal molecules in a close proximity of the second substrate, and the viewing direction is set to be on a plane that is defined by the normal to the display surface and a direction on a substrate plane in which the concavities and convexities of the light reflective film have a shorter mean cycle than in other directions.

According to the arrangement, a particularly excellent visibility can be obtained by further setting the direction in which the light reflective film, that is a diffuse reflector plate, is bright to the satisfactory direction described above. Note that the direction in which the diffuse reflector plate is bright, although being variable typically depending on the illumination direction and the direction of the viewer, can be accommodated satisfactorily under a variety of illumination conditions.

In addition, in the reflective liquid crystal display device, preferably, either the transmission axis or the absorption axis of the polarizer plate forms an angle, $\theta 3$, of not less than 40° and not more than 60° with an alignment direction of the liquid crystal molecules in a close proximity of the second substrate, and the liquid crystal molecules in a close proximity of the second substrate form an angle $\theta 4$ with a direction on a plane that is defined by a viewing direction and a normal to a display surface, the angle $\theta 4$ being set to not less than 0° and not more than 30°, or not less than 180° and not more than 210°.

According to the arrangement, by thus setting the viewing direction, a satisfactory visibility can be ensured. To put it differently, a satisfactory visibility can be obtained by setting $\theta 3$ and $\theta 4$ according to the viewing direction of the viewer. In addition, a satisfactory visibility can be obtained also by disposing, for example, a member for setting the viewing direction of the viewer on the display surface.

In addition, a reflective liquid crystal display device incorporating a touch panel in accordance with the invention as defined in this application is a reflective liquid crystal display device incorporating a touch panel that comprises the reflective liquid crystal display device in accordance with the invention wherein a planar pressure sensitive element for detecting an external pressure is sandwiched with a layer-shaped empty space between the circularly polarizing means and the second substrate.

In the reflective liquid crystal display device in accordance with the invention as defined in this application, since the light is substantially circularly polarized after passing the circularly polarizing means, or the polarizer plate and the two optical retardation compensator plates, even if the light is reflected at the reflector plate in such a manner to contain no disturbance in the polarization state, the reflected light is absorbed by the polarizer plate before exiting the device. Therefore, reflected light does not degrade visibility with a pressure sensitive-type input device (touch panel) that is useful as an input device for a portable device.

Additional objects, advantages and novel features of the invention will be set forth in part in the description which follows, and in part will become apparent to those skilled in the art upon examination of the following taken in conjunction with the accompanying drawing or may be learned by practice of the invention.

BRIEF DESCRIPTION OF THE DRAWINGS

FIG. 15 is a table showing a result of a visual observation of the reflective liquid crystal display of Example 7 by changing θ4 value.

BEST MODES FOR CARRYING OUT THE INVENTION

Referring to examples and embodiments, the following description will discuss the present invention in far more detail and the present invention is by no means limited by the discussion.

First Embodiment of the Invention

Referring to drawings, the following description will discuss an embodiment in accordance with the present invention.

Figure 1:
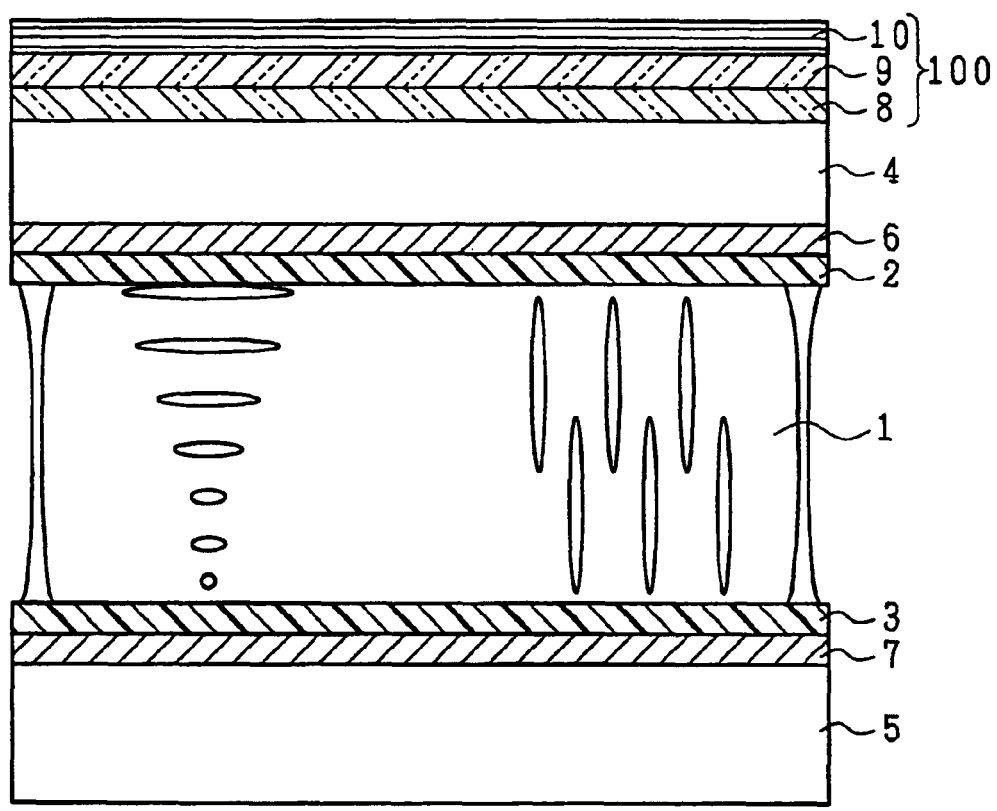
FIG. 1 is a cross-sectional view schematically showing a structure of a major part of a reflective liquid crystal display device of an embodiment in accordance with the present invention.

FIG. 1 is a cross-sectional view schematically showing a structure of a major part of a reflective liquid crystal display device of an example in accordance with the present invention. As can be seen from FIG. 1, the reflective liquid crystal display device includes a liquid crystal layer 1 that contains twisted nematic liquid crystal having a positive dielectric anisotropy, sandwiched between a substrate 4 on which an alignment-processed alignment layer 2 is formed and a substrate 5 on which a similarly alignment-processed alignment layer 3 is formed. Further, on the lower substrate 5, there is disposed a light reflective film 7; preferably, the reflecting surface of the light reflective film 7 has such smooth concavities and convexities that preserve the polarization throughout the reflection of light. More preferably, the smooth concavities and convexities are such that the concavity and convexity cycle varies according to the azimuth direction on the reflecting surface of the light reflective film 7.

On the upper substrate 4, there is provided a transparent electrode 6. The light reflective film 7 on the lower substrate 5 is formed from a conductive material and doubles as an electrode. Voltage is applied across the liquid crystal layer 1 through the transparent electrode 6 and the light reflective film 7. As means for applying a voltage to the thus arranged electrode pair, an active switching element may be used; however, there are no limitations in particular. Note that if a member that does not serve as an electrode is employed as the light reflective film 7, an electrode should be provided to the side on which the substrate 5 is disposed.

Further, on a display surface of the liquid crystal drive cell thus arranged from the substrates 4 and 5 and the liquid crystal layer 1, the display surface being on the side where the substrate 4 is disposed, there is provided circularly polarizing means 100 for filtering natural light and selectively passing either right handed or left handed circularly polarized light. In the present example, the circularly polarizing means 100 is constituted by an optical retardation compensator plate 8, an optical retardation compensator plate 9, and a polarizer plate 10 stacked in this sequence on the display surface on the side where the substrate 4 is disposed side.

The following description will discuss optical properties and functions of these optical elements, i.e., the optical retardation compensator plate 8, the optical retardation compensator plate 9, and the polarizer plate 10.

The reflective liquid crystal display device of the present embodiment allows illumination light, such as external light, to enter the liquid crystal layer 1 through the polarizer plate 10, and is viewed from the side of the polarizer plate 10 through which the illumination light enters. The polarizer plate 10 selectively passes only a linearly polarized light component in a particular direction, and the optical retardation compensator plate 9 and the optical retardation compensator plate 8 change the polarization state of the incoming linearly polarized light component.

Here, the incoming light, after having passed through the optical retardation compensator plate 8, is substantially circularly polarized under the conditions that the retardation is not smaller than 100 nm and not greater than 180 nm in the substrate normal direction of the optical retardation compensator plate 8 and not smaller than 200 nm and not greater than 360 nm in the substrate normal direction of the optical retardation compensator plate 9, and the value of $|2\times\theta 2-\theta 1|$ is not smaller than 35° and not larger than 55°, where $\theta 1$ is the angle formed by the slow axis of the optical retardation compensator plate 8 and either the transmission axis or the absorption axis of the polarizer plate 10 and $\theta 2$ is the angle formed by the slow axis of the second optical retardation compensator plate 9 and either the transmission axis or the absorption axis of the polarizer plate 10. In such an event, whether the light in circularly polarization is right handed or left handed depends on the configuration of these three optical elements (i.e., the optical retardation compensator plate 8, the optical retardation compensator plate 9, and the polarizer plate 10).

Figure 2:
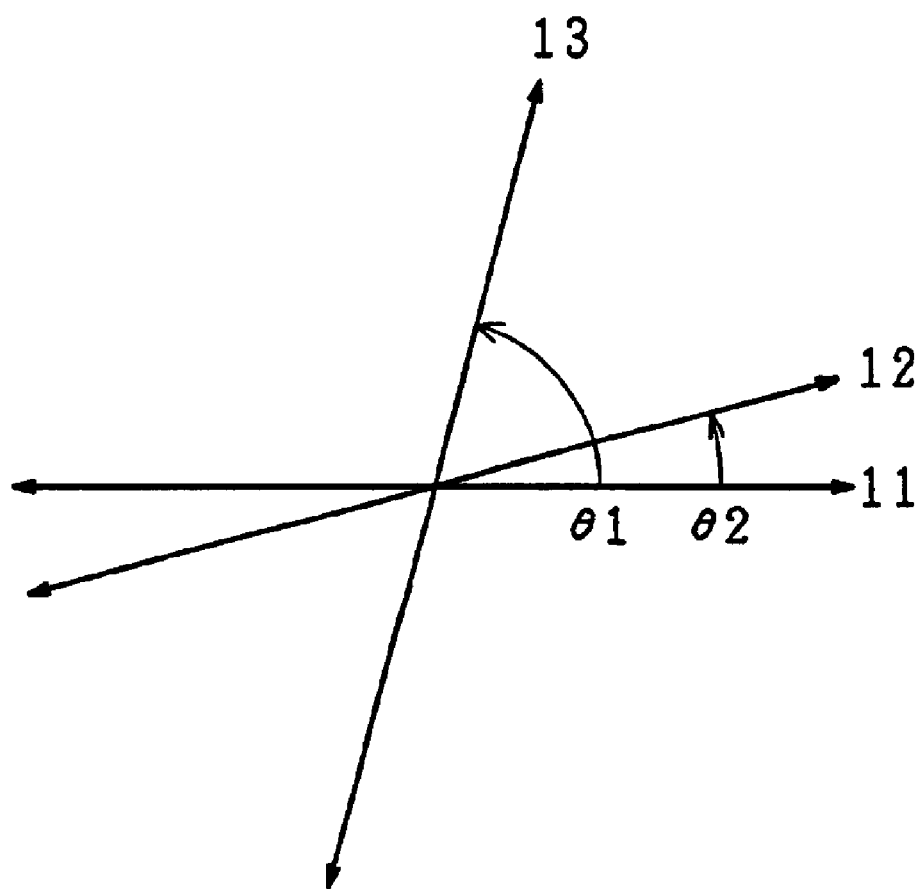
FIG. 2 is a drawing showing a directional configuration of a polarizer plate and two optical retardation compensator plates of an embodiment.

To further illustrate this, a detailed description will be given below by reference to FIG. 2 which shows a configuration example. It should be noted, however, that in this example the reflective liquid crystal display device is viewed from the direction in which light enters. Incident light, which enters the liquid crystal display device, passes through the polarizer plate 10, the optical retardation compensator plate 9, and the optical retardation compensator plate 8, and therefore becomes substantially right handed circularly polarization, if the three optical elements are configured as shown in FIG. 2, or more specifically, if the three optical elements are configured so as to satisfy $\theta 1=75°$ and $\theta 2=15°$, where 11 represents the transmission axis of the polarizer plate 10, 13 represents the slow axis of the optical retardation compensator plate 8, 12 represents the slow axis of the optical retardation compensator plate 9, $\theta 1$ represents the angle formed by the transmission axis 11 of the polarizer plate 10 and the slow axis 13 of the optical retardation compensator plate 8, and $\theta 2$ represents the angle formed by the transmission axis 11 of the polarizer plate 10 and the slow axis 12 of the optical retardation compensator plate 9.

Further, the incident light, which enters the liquid crystal layer 1, changes its polarization state by means of a polarized light conversion function of a twisted birefringent medium (liquid crystal) in the liquid crystal layer 1 that aligns according to an applied voltage, and reaches the reflector plate. In such an event, the polarization state on the light reflective film 7 varies depending on the alignment of the liquid crystal molecules.

First, the dark state will be explained. If the liquid crystal molecules, upon the application of voltage, align parallel to the gradient direction of the applied voltage, and has no polarized light conversion function on the light travelling parallel to the normal to the device, the incoming circularly polarized light reaches the light reflective film 7 while allowing no changes in the polarization thereof, and a dark state is achieved. By establishing a dark state across the whole visible range, a black display is achieved.

The inventors of the present invention have found that to prepare a polarization state similar to this one virtually across the visible range, the following conditions need to be fulfilled. The optical retardation compensator plate 8 needs to have such a property to provide the light in the main visible range of 400 nm to 700 nm with a phase difference that is equivalent to a quarter wavelength, e.g., to provide the light having a wavelength of 550 nm with a retardation of 100 nm to 180 nm. Further, the optical retardation compensator plate 9 needs to have such a property to provide the light in the same main visible range with a phase difference that is equivalent to half the wavelength, e.g., to provide the light having a wavelength of 550 nm with a retardation of 200 nm to 360 nm.

Further, according to the configuration of the polarizer plate 10 and the optical retardation compensator plates 8 and 9 shown in FIG. 2, since $\theta 1=75°$ and $\theta 2=15°$ as mentioned earlier, $|2\times\theta 2-\theta 1|=45°$, and the following equation is satisfied:

$$35° \leq |2\times\theta 2-\theta 1| \leq 55° \quad (1)$$

Although obviously the values of $\theta 1$ and $\theta 2$ may be changed as long as this equation is satisfied, the specific values are preferably determined by a combination of dispersion of the birefringence of the two optical retardation compensator plates 8 and 9 used. In addition, the value of $|2\times\theta 2-\theta 1|$ may vary in a 20° range according to the angle setting stipulated in Equation (1), and the preferable value within this range further varies depending on the polarized light conversion function of the liquid crystal layer 1 in a case where a voltage is applied across the liquid crystal layer 1. In other words, the configuration is preferably specified so that light is circularly polarized on the light reflective film 7 while taking birefringence at the optical retardation compensator plates 8 and 9 and the liquid crystal layer 1 into consideration. In such an event, the polarized light conversion function of the liquid crystal layer 1, when a voltage is substantially applied across the liquid crystal layer 1, does not critically depend on precision in the manufacture of the liquid crystal layer 1, the liquid crystal layer 1 can be thereby easily fabricated and manufactured.

Next, the function of the bright state will be explained. A bright state can be achieved by altering the substantially circularly polarized incident light into a linearly polarized light on the light reflective film 7 with the optical retardation compensator plates 8 and 9 that are configured so as to fulfill aforementioned Equation (1); In other words, irrespective of whether the light having wavelengths in the visible area is linearly polarized in directions that vary depending on the wavelengths or linearly polarized light in the same direction irrespective of the wavelengths, a similarly bright state can be achieved.

This renders it important to realize a liquid crystal layer 1 having such an optical function that the incoming light to the liquid crystal layer 1, which is substantially circularly polarized to realize the aforementioned dark state, becomes polarized linearly in arbitrary directions in a visible wavelength range.

Taking the electric drive which facilitates the fabrication and manufacture of the liquid crystal layer 1 into consideration, since the dark state is achieved in a voltage applied state, the bright state needs to be realized either in a non-voltage applied state or in a state where the alignment of the liquid crystal molecules changes with voltage, however, in a greatly different manner from the changes in a dark state.

The inventors of the present invention have diligently worked and successfully found a range across which to realize a practically sufficient function of a bright state, in other words, a range across which to ensure sufficient brightness in the visible range of spectrum and to enable development of liquid crystal composition that is suitable to liquid crystal display devices that can be readily manufactured with high yields.

Specific conditions to achieve that is to set the twist angle of the twisted nematic liquid crystal in the liquid crystal layer 1 to not smaller than 45° and not greater than 100°, and to set the product, $\Delta nd$, of the birefringence difference $\Delta n$ of the liquid crystal in the liquid crystal layer 1 and the thickness $\underline{d}$ of the liquid crystal layer 1 to not smaller than 150 nm and not greater than 350 nm.

Here, more preferably, the twist angle is set to not smaller than 60° and not greater than 100°, and the product, $\Delta nd$, of the birefringence difference $\Delta n$ of the liquid crystal in the liquid crystal layer 1 and the thickness $\underline{d}$ of the liquid crystal layer 1 to not smaller than 250 nm and not greater than 300 nm. Even more preferably, the twist angle is set to not smaller than 65° and not greater than 90°, and the product, $\Delta nd$, of the birefringence difference $\Delta n$ of the liquid crystal in the liquid crystal layer 1 and the thickness $\underline{d}$ of the liquid crystal layer 1 to not smaller than 250 nm and not greater than 300 nm. Even under such a condition in fabrication of the liquid crystal display device that the thickness of the liquid crystal layer 1 is set to 4.5 $\mu$m for example, the even more preferable range conditions can be fulfilled with a practical liquid crystal material that includes a liquid crystal layer 1 of which $\Delta n$ is approximately 0.0667, allowing a highly practical liquid crystal display device to be manufactured.

Specific examples will be discussed in the following in accordance with the present embodiment.

EXAMPLE 1

First, as Example 1, the description below will explain an evaluation of specifications of the liquid crystal layer by means of calculation, that are required to specifically design the liquid crystal layer with the optical functions thereof being taken into consideration. For optimum design of the liquid crystal layer, the evaluation function given by Equation (2) is used to evaluate specifications of the liquid crystal layer:

$$f = 1 - s_3^2 \quad (2)$$

Here, $s_3$ is a Stokes parameter to specify a polarization state, more specifically, a Stokes parameter regarding the polarization state of the light that has passed through the liquid crystal layer only once on the reflecting surface. Note that the Stokes parameter used here is normalized.

When the intensity of light is normalized, the polarization state of the perfectly polarized light of which the polarization state can be described by a Stokes parameter having three components: $s_1$ and $s_2$ represent the respective linearly polarized light components of which the vibration surfaces differ from each other by 45°, while $s_3$ denotes the circularly polarized light component. $s_1$ $s_2$, $s_3$ are not less than −1 and not more than 1: among them, $s_3$ equals ±1 for circularly polarized light, 0 for linearly polarized light, and a value between these two values for elliptically polarized light.

In other words, the evaluation function f produces three values according to the polarization state on the reflecting surface: f=0 for circularly polarized light, 0<f<1 for elliptically polarized light, and f=1 for linearly polarized light, irrespective of the handedness of polarized light as a result of the squaring of $s_3$.

It has been confirmed by an analysis conducted by the inventors of the present invention that supposing that light enters, any given birefringence medium sandwiched between a single polarizer plate and a reflecting surface that reflects as a specular surface from the polarizer plate side, the reflected light is completely absorbed by the polarizer plate through which the light has passed upon entering in the case of f=0 (circularly polarized light) on the reflector plate, and can pass through the polarizer plate without being absorbed in the case of f=1. When the evaluation function f produces a value between these two values, the reflected light is partially absorbed by the polarizer plate, and the rest of the reflected light passes through the polarizer plate, resulting in a display with an intermediate reflectance.

Further, it has been found that the evaluation function f is directly proportional to the reflectance of such a reflective liquid crystal display device with a single polarizer plate that reflects incident light at the reflector plate, and that the reflectance of the single polarizer plate mode can be evaluated. Therefore, by using the evaluation function f, it is possible to predict both whether or not satisfactory brightness can be obtained in the bright display and whether or not a satisfactory dark state can be obtained.

As seen from the above, the evaluation function f can be used to predict display performance, and the inventors of the present invention have worked to find a liquid crystal display mode whereby the single polarizer plate mode is expected to show best performance. A specific scheme will be explained in the description below.

First, a consideration is given to mass productivity in the fabrication of liquid crystal display devices. A special attention is paid to maintaining precision of the thickness of the liquid crystal layer, because the thickness determines optical properties of the liquid crystal display device and the maintenance of precision greatly affects productivity.

As a method of maintaining the thickness of the liquid crystal layer, a method of providing spherical spacers fabricated to have a single diameter and disposed between the substrates sandwiching the liquid crystal layer would result in an excellent balance between precision and practical performance. However, even with this method being employed, requirement for high precision in mass production leads to a rise in mass production costs. As can be understood from this, it is important for industrial purposes to develop a method that does not require precision in the thickness of the liquid crystal layer.

It is also important to consider characteristics of human visual sense with respect to display quality of the fabricated liquid crystal display device. It is known regarding human visual sense that the perceived brightness is not in direct proportion to the actual intensity of light that stimulates the retina of an eyeball, but rather shows a non-linear characteristic. More specifically, the same variations in the light intensity from a display device feels like a small variation in brightness (when the background presents a strong stimulation) or a great variation in brightness (when the background presents a weak stimulation), depending on the strength of stimulation presented simultaneously to the retina. With the non-linear characteristic of visual sense being taken in consideration, it would be understood that the same level of irregularity in reflectance could degrade display quality further when that happens to a dark display than to a bright display.

As can be understood from the above description, if there exist two states, one with a relatively large irregularity in reflectance and the other with a relatively small irregularity in reflectance, the state with a relatively small irregularity in reflectance is preferably assigned to dark display, and the state with a relatively large irregularity in reflectance to bright display, so as to enable the fabrication of liquid crystal display elements of satisfactory display quality.

Further, when the polarized light conversion function is lost by applying a substantial voltage across the liquid crystal layer, irregularity in thickness of the liquid crystal layer is less likely to result in a great variation in the polarized light conversion function.

Taking the above three items above, it could be understood that satisfactory display can be achieved by assigning, to dark display, an alignment state wherein a substantial voltage is applied. In other words, it is preferable to assign, to bright display, a state wherein no voltage is applied across the liquid crystal, and also to assign, to dark display, a state wherein a voltage is applied across the liquid crystal, that is, to adopt a so-called normally white operations.

Next, on the basis of the evaluation function f, the description below will explain the specifications of optical retardation compensator plate and of the liquid crystal layer portion to realize these specifications.

First, in a case where a substantial voltage is applied across the liquid crystal layer, the liquid crystal layer does not have a polarized light conversion function. The optical retardation compensator plate is required to have a property to change light so that light has passed through the liquid crystal layer and reached the reflector plate to become circularly polarized light on the reflector plate. Here, the handedness of the circularly polarized light is either right handed or left handed.

The aforementioned specifications regarding the optical retardation compensator plate enables this property to be obtained across a wide band of spectrum. In such an event, since the polarized light conversion function of the liquid crystal has been lost, the evaluation function f equals 0 and a satisfactory dark state occurs.

In contrast, in a case where no voltage is applied across the liquid crystal layer, in order to examine conditions to obtain sufficient reflective brightness, it is necessary to evaluate the evaluation function f with the optical retardation compensator plate specified as above to produce circularly polarized light. The inventors of the present invention have obtained an evaluation function f for such an alignment that the liquid crystal layer is uniformly twisted, in a state where no voltage is applied across the liquid crystal layer. As a result, it has been found, from analytic calculation of $s_3$ using Jones Matrix method, that when circularly polarized light enters the liquid crystal, the evaluation function f is given by Equation (3).

$$f = 1 - \left\{1 - 2\phi_{ret}^2 \left(\text{sinc}\sqrt{\phi_{ret}^2 + \phi_{tw}^2}\right)^2\right\}^2 \tag{3}$$

-continued $$\phi_{ret} = \pi \frac{\Delta nd}{\lambda}$$

$$\text{sinc} X = \frac{\sin X}{X}$$

$\phi_{nv}$: Twist angle between the upper and lower substrates

Figure 3:
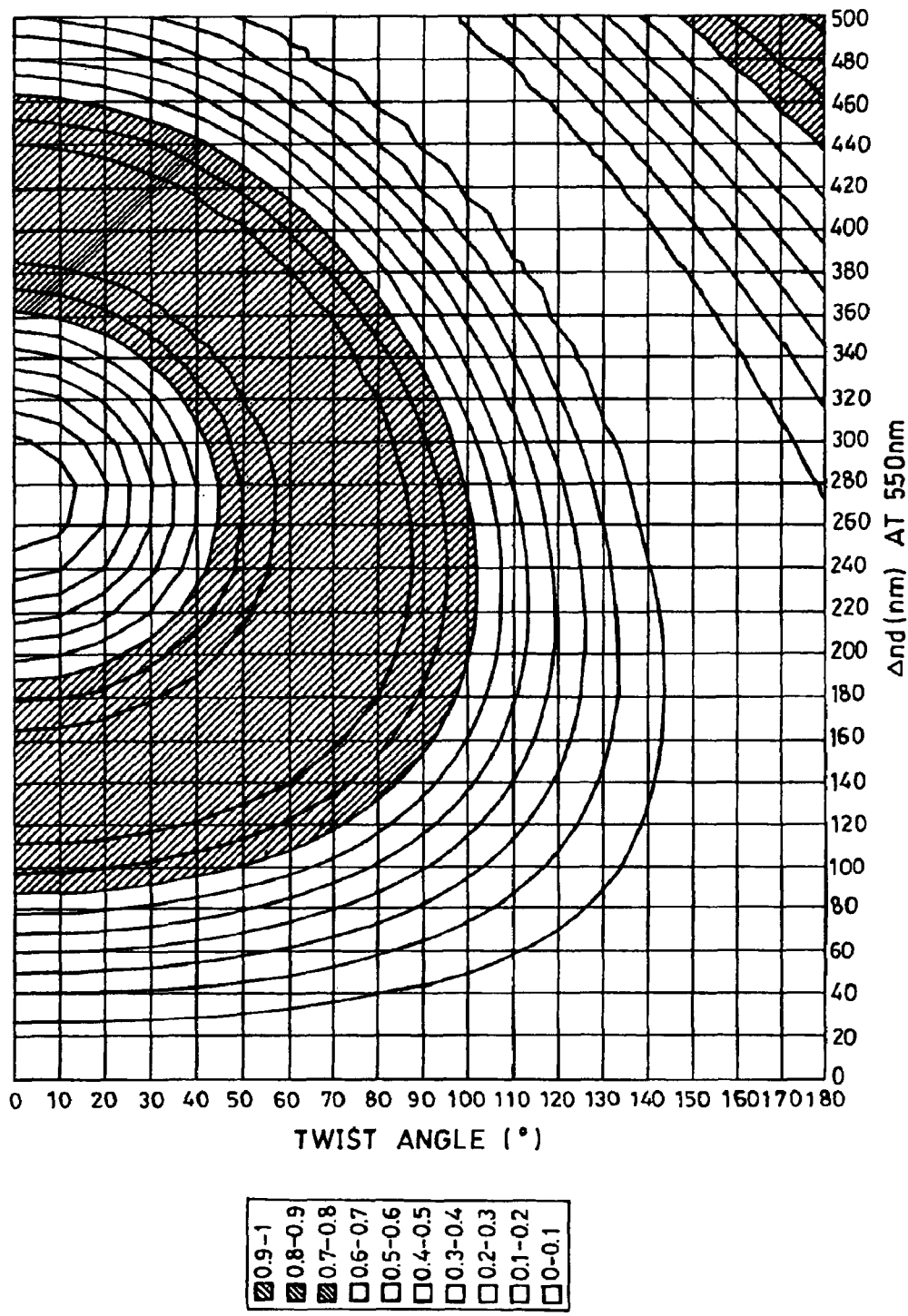
FIG. 3 is a graph showing a contour drawn by plotting values obtained from calculation of an evaluation function with respect to 550 nm monochromatic light, the evaluation function being used for predicting the reflectance of a reflective liquid crystal display device of Example 1.

FIG. 3 shows, as a contour plot, values of the evaluation function f at a wavelength that produces the highest visual sensitivity ($\lambda$=550 nm) against $\Delta$nd and the twist angle of the liquid crystal layer, which are design parameters thereof. Note that since the function f is an even function, values of the function f are shown only for positive values of the twist angle $\phi_{nv}$; however, needless to say, the actual twist direction of the alignment of the liquid crystal may be either right handed or left handed.

FIG. 3 only shows values for a single wavelength (550 nm). The same method of evaluation can be used for wavelengths in a visible range, i.e., from 380 nm to 780 nm. The application of the method to incident light having wavelengths other than 550 nm only requires changes in $\Delta$n and $\lambda$ among other variables of the evaluation function f.

The consideration of effects on human vision that vary depending on the wavelength as detailed above and the calculation of an overlapping integral with the function f on assumptions of the visual sensitivity and a standard illumination light source enables more precise optimization. Specifically, it is useful to substitute the visual sensitivity curve ($y_{BAR}(\lambda)$ of the color matching function of CIE1931) and the spectrum density $S_{D65}$ ($\lambda$) of a $D_{65}$ standard light source into aforementioned Equation $$f_{vis} = k \int_{380}^{780} \bar{y}(\lambda) S_{D65}(\lambda) f(\lambda) d\lambda \qquad (4)$$

$$k = 1 \bigg/ \int_{380}^{780} \bar{y}(\lambda) S_{D65}(\lambda) d\lambda$$

Here, f ($\lambda$), being obtained from calculation of Equation (3), clearly shows that the function is dependent to the wavelength $\lambda$.

Figure 4:
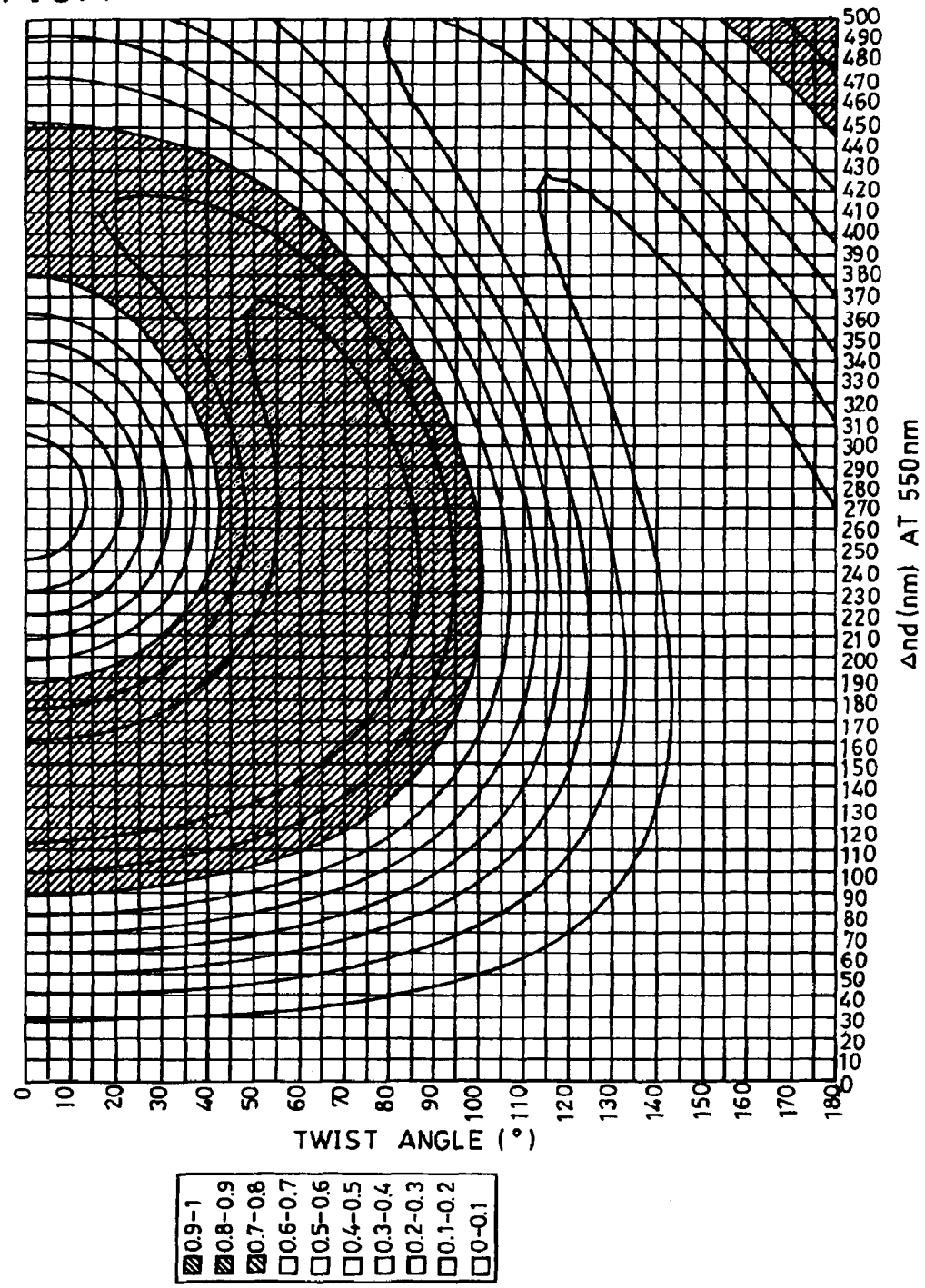
FIG. 4 is a graph showing a contour drawn by plotting values obtained from calculation of an evaluation function taking a visual sensitivity into consideration, the evaluation function being used for predicting the reflectance of a reflective liquid crystal display device of Example 1.

Thus defined $f_{vis}$ is calculated for $\Delta$nd and the twist angle in the same manner as in FIG. 3, and shown in FIG. 4. Here, the calculation is done taking the dispersion of $\Delta$n into consideration, and $\Delta$nd on the axis of ordinates shows values for the light having a wavelength of 550 nm.

Figure 5:
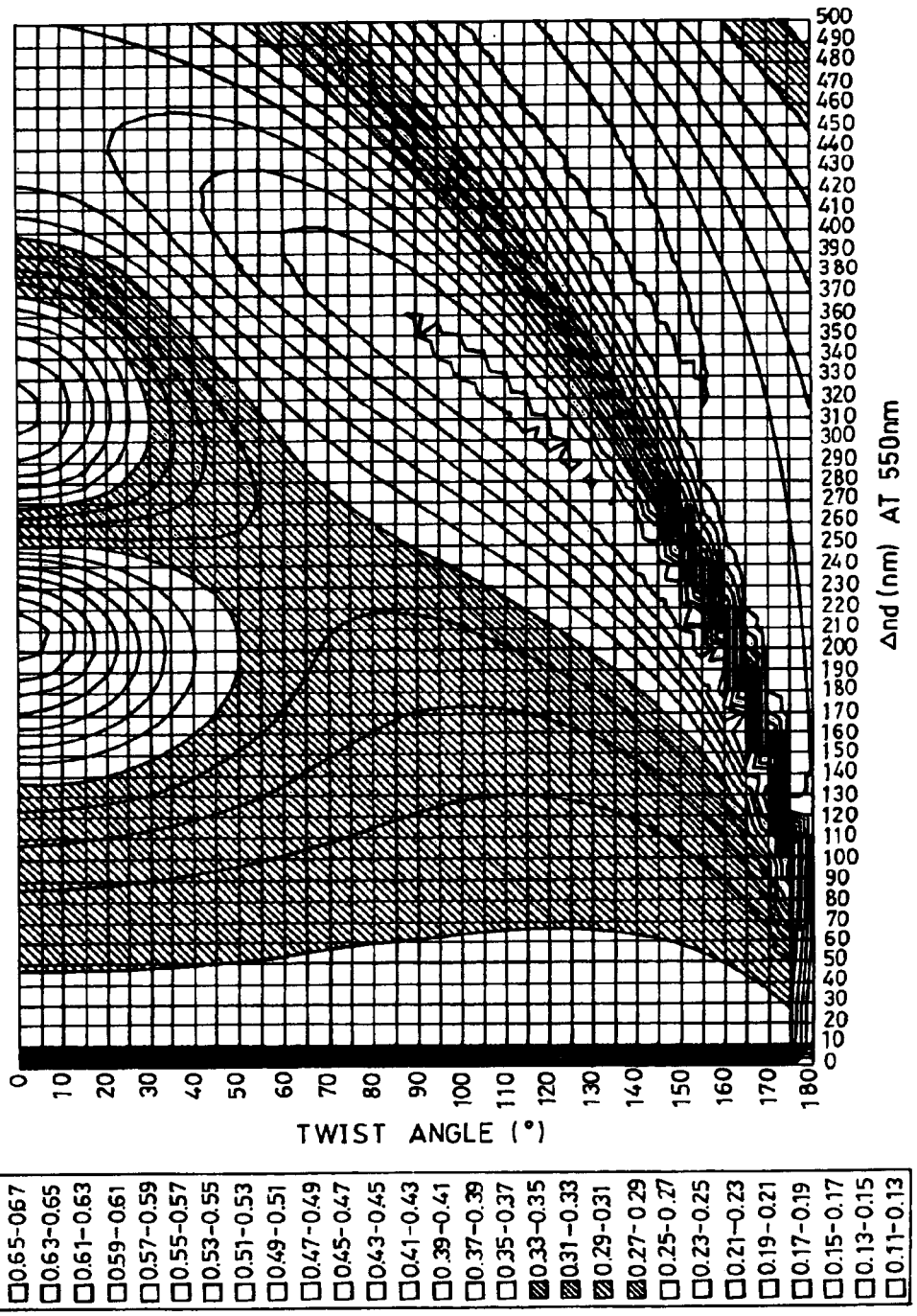
FIG. 5 is a graph showing a contour drawn by plotting values obtained from calculation of an evaluation function and values of an x-coordinate of CIE1931 standard colorimetric system obtained from calculation of a $D_{65}$ standard light source spectrum, the evaluation function being used, for predicting the reflectance of a reflective liquid crystal display device of Example 1.
Figure 6:
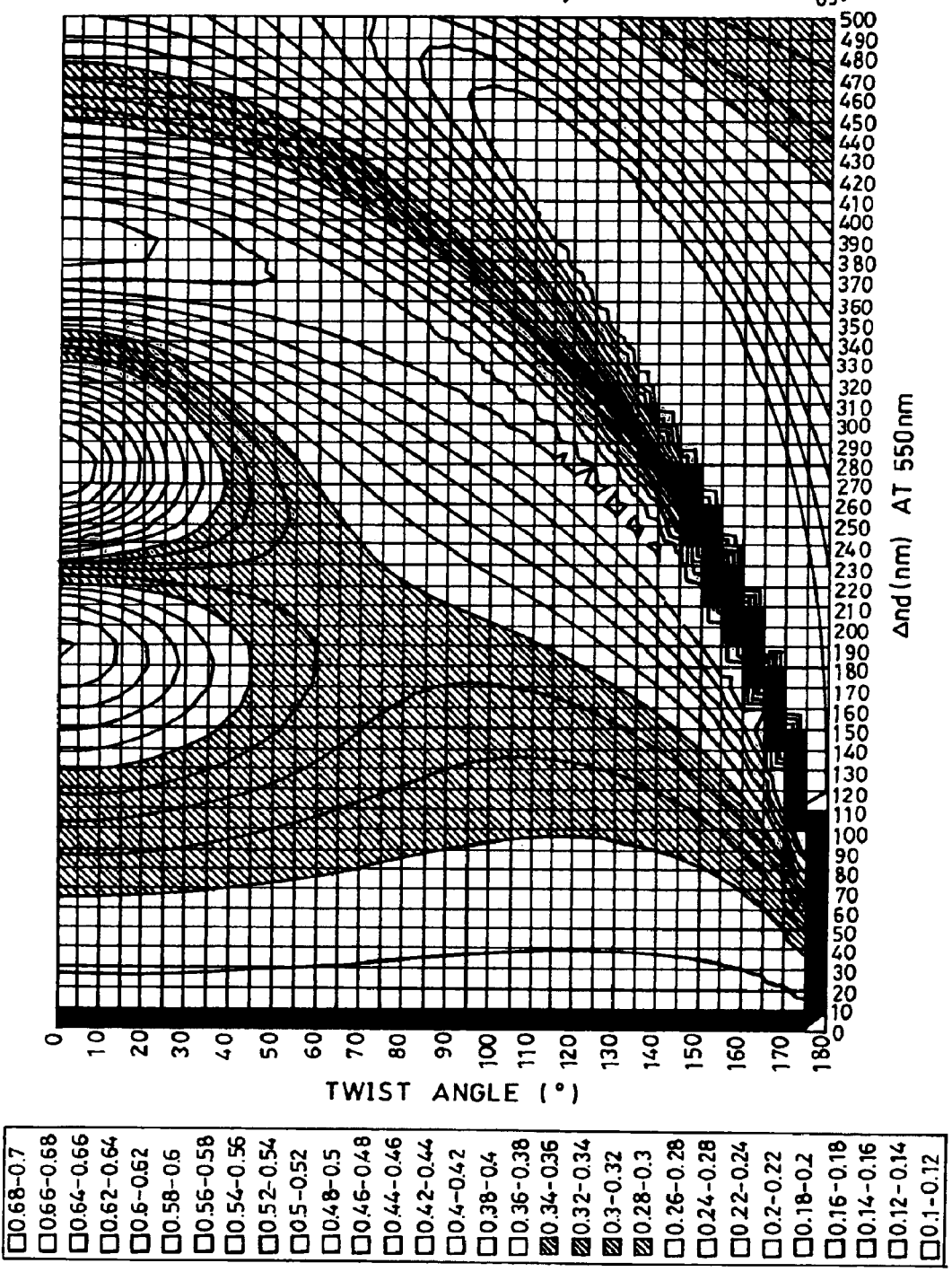
FIG. 6 is a graph showing a contour drawn by plotting values obtained from calculation of an evaluation function and values of a y-coordinate of CIE1931 standard colorimetric system obtained from calculation of a $D_{65}$ standard light source spectrum, the evaluation function being used for predicting the reflectance of a reflective liquid crystal display device of Example 1.

Further, since the evaluation function f given by Equation (2) shows values that are in direct proportion to the reflectance of a display, by changing the color matching function $y_{BAR}$ ($\lambda$) of Equation (4) to $x_{BAR}$ ($\lambda$) or $z_{BAR}$ ($\lambda$) that are similarly specified in CIE1931, it becomes possible to calculate chromaticity. Hence, the chromaticity (x, y) at the $D_{65}$ light source is calculated for the same parameters as in FIG. 4. The resultant x and y values are shown in FIGS. 5 and 6 respectively.

Figure 7:
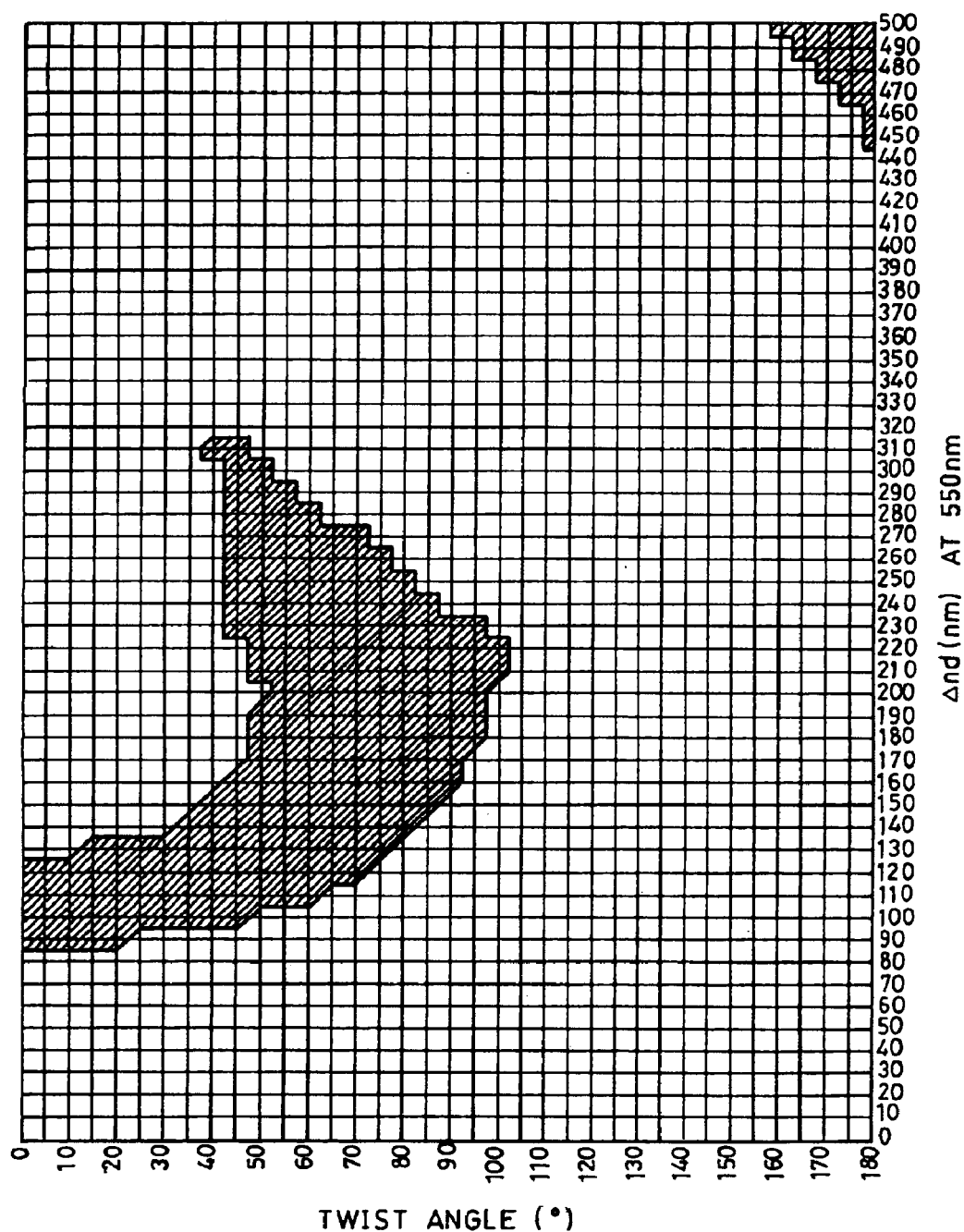
FIG. 7 is a drawing showing a region where both good white balance and brightness can be obtained from FIG. 4, FIG. 5, and FIG. 6.

With all these taken into consideration, conditions are specified to produce a sufficient luminous reflectance ($f_{vis}$ is 0.7 or higher) and satisfactory hue in a white display (x is not less than 0.27 and not more than 0.35, and y is not less than 0.28 and not more than 0.36), and a suitable $\Delta$nd and range of twist color are obtained. Results are shown in FIG. 7.

In this manner, the ranges of parameters of a liquid crystal layer are obtained which are required to realize sufficient brightness and hue. However, the specifications of the liquid crystal layer further include a limitation as a result of specification of the thickness of the liquid crystal layer of the liquid crystal material. Therefore, not every part of the hatched range in FIG. 7 would be suitable for practical purposes. In addition, satisfactory conditions can be found slightly out of the range too. A further description will be given regarding this.

It is known that an optical property, $\Delta$n, of the liquid crystal material and a temperature range in which the liquid crystal material functions properly has a certain correlation. Specifically, the liquid crystal material for actual use, typically being adjusted to have necessary properties by blending with some compositions, will have a narrower temperature range to obtain nematic phase when $\Delta$n decreases as a result of a change in the blend ratio. In such a case, it is difficult to dramatically narrow the operational and preservable temperature ranges of the liquid crystal display device. That is, in view of the temperature range to stably obtain a nematic phase, $\Delta$n of the liquid crystal material has a lower limit. For these reasons, $\Delta$n at room temperature, although depending on necessary temperature range, etc., is required to be approximately not less than 0.05, preferably not less than 0.065.

In addition, the thickness of the liquid crystal layer has limitations due to the rate of defective products that are caused during the fabrication process of the liquid crystal display device by undesirable dust and the like, and also due to level differences in fabricating elements for driving the liquid crystal, flatness of the substrate used, etc. Further, when the liquid crystal layer is adopted in a part of an arrangement in accordance with the invention as defined in this application, the concavities and convexities of a concave and convex diffuse reflector plate that is located near the liquid crystal layer adds to the limitations.

For transmissive liquid crystal display devices, the thickness of the liquid crystal layer is set to approximately 5 $\mu$m and manufacturing technology has been well established for such an arrangement. To dramatically reduce the thickness of the liquid crystal layer further would be extremely difficult and not practical. Therefore, the liquid crystal layer should be fabricated so as to have a thickness of approximately not less than 3 $\mu$m, preferably not less than 4 $\mu$m.

From those viewpoints laid out above, it is useful to set $\Delta$nd, that is the product of the refractive index difference, $\Delta$n, of the liquid crystal and the thickness, d, of the liquid crystal layer, to not less than 150 nm, preferably to not less than 260 nm.

Further, in actual liquid crystal of a liquid crystal display device which is in a driven state, a voltage that is more than a close proximity of the threshold value of the liquid crystal which shows threshold value characteristics is applied for driving the liquid crystal in many cases. In such an event, the liquid crystal, across which a voltage near the threshold value is applied, somewhat inclines in comparison to the state where no voltage is applied, and the refractive index difference in the substrate normal direction in the somewhat inclining state appears in an actual display.

As can be understood from this, $\Delta$n determined by the liquid crystal material may take a value approximately 10% larger than effective $\Delta$n with respect to the inclined liquid crystal. Note that since it is possible to carry out a display at the threshold value or lower of the liquid crystal, appropriately this change in the value of $\Delta$nd is not applied to the lower limit of $\Delta$nd.

As detailed above, the inventors of the present invention have found that from the specific calculation using actual specifications of the liquid crystal layer, it is useful in the reflective liquid crystal display device in the single polarizer plate mode to set $\Delta$nd to not less than 150 nm, with 350 nm being the upper limit thereof, and to set the twist angle of the liquid crystal to 45° to 100°.

EXAMPLE 2

In Example 2, reflective liquid crystal display devices structured as in aforementioned FIG. 1 were fabricated with parameters listed in table 1 to obtain five Samples #2a through #2f.

TABLE 1

| Sample Parameter | #2a | #2b | #2c | #2d | #2e | #2f |
|---|---|---|---|---|---|---|
| Δnd | 260 | 330 | 120 | 380 | 260 | 260 |
| θ3 (°) | 40 | 40 | 40 | 40 | 55 | 20 |
| Twist Angle (°) | 70 | 70 | 70 | 70 | 40 | 110 |
| θ1 (°) | 75 | 75 | 75 | 75 | 75 | 75 |
| Retardation Caused by Optical Retardation Compensator Plate 8 | 135 | 135 | 135 | 135 | 135 | 135 |
| θ2 (°) | 15 | 15 | 15 | 15 | 15 | 15 |
| Retardation Caused by Optical Retardation Compensator Plate 9 | 270 | 270 | 270 | 270 | 270 | 270 |

Display results of Samples are shown roughly in Table 2.

TABLE 2

| Sample Voltage | #2a | #2b | #2c | #2d | #2e | #2f |
|---|---|---|---|---|---|---|
| 0 | White Display | Yellowish White Display | Gray | Orangish White Display | Reddish White Display | Gray |
| Vth | White Display | White Display | Gray | Yellowish White Display | Yellowish White Display | Gray |
| 1.5 × Vth | Gray | Gray | Dark Gray | White Display | White Display | Dark Gray |
| 2.0 × Vth | Dark Gray | Dark Gray | Dark Gray | Gray | Gray | Black |
| 3.0 × Vth | Black | Black | Black | Dark Gray | Dark Gray | Black |

Note that Vth refers to threshold voltage values where change in the alignment of the liquid crystal layer 1 is observed with each sample, and takes different values due to Δnd that is set to different values.

As shown in the above, as for Samples #2a and #2b whose parameters fell in the range of the reflective liquid crystal display device in accordance with the present invention, a white display changed into a black display when the voltage changed from the actually used voltage, i.e., Vth to 3.0×Vth. In contrast, as for Samples #2c through #2f whose parameters did not fall in the range of the reflective liquid crystal display device in accordance with the present invention, the display was dark (Samples #2c and #2f), or colored (Samples #2d and #2e).

Those display results shown in Table 2 show that such large changes in properties that happened to Samples #2a through #2f were not observed if only the specified relative angle, θ3, formed with the alignment direction of the liquid crystal is changed without changing the relative angles, θ1 and θ2, between the polarizer plate 10 and the optical retardation compensator plates 8 and 9, and confirm rather the dependency on the specifications of the liquid crystal layer 1.

In addition, similar displays as shown in Table 2 were observed with all combinations: for example, such specifications that the light polarized circularly in reverse handedness enters the liquid crystal (i.e., θ1 and θ2 simultaneously increased by 90°, or both θ1 and θ2 altered in sign) and such specifications to obtain the light polarized circularly in the same direction (i.e., both θ1 and θ2 changed in sign and increased by 90°).

The above description shows that by specifying the liquid crystal layer 1 so that the product of the birefringence difference of the liquid crystal in the liquid crystal layer 1 and the thickness of the liquid crystal layer is not less than 150 nm and not more than 350 nm, and the twist angle of the liquid crystal layer is in a range of 45° to 100°, a satisfactory display can be realized in the limited range.

Following Examples 3 and 4 show optimization examples in which the inventors of the present invention examined conditions to achieve more satisfactory display.

EXAMPLE 3

As Example 3, a reflective liquid crystal display device will be described that includes a liquid crystal layer of which the twist angle of the twisted nematic liquid crystal is set to 90° and two optical retardation compensator plates have retardation of 135 nm and 270 nm respectively.

In Example 3, a reflective liquid crystal display device structured as shown in aforementioned FIG. 1 was fabricated. The light reflective film 7 on a substrate 5 was made of aluminum and served as a light reflective electrode. In addition, the liquid crystal drive cell was a 90° twisted liquid crystal layer 1 that was adjusted to have a thickness of 4.2 μm after the introduction of liquid crystal, the introduced liquid crystal material used here having the same liquid crystal physical properties (dielectric anisotropy, elasticity, viscosity, nematic temperature range, and voltage retaining property) as the liquid crystal used in a typical TFT transmissive liquid crystal display device only except Δn which was adjusted to 0.065. Here, the product of the thickness of the liquid crystal layer 1 and the birefringence difference of the liquid crystal was set to 273 nm.

Figure 8:
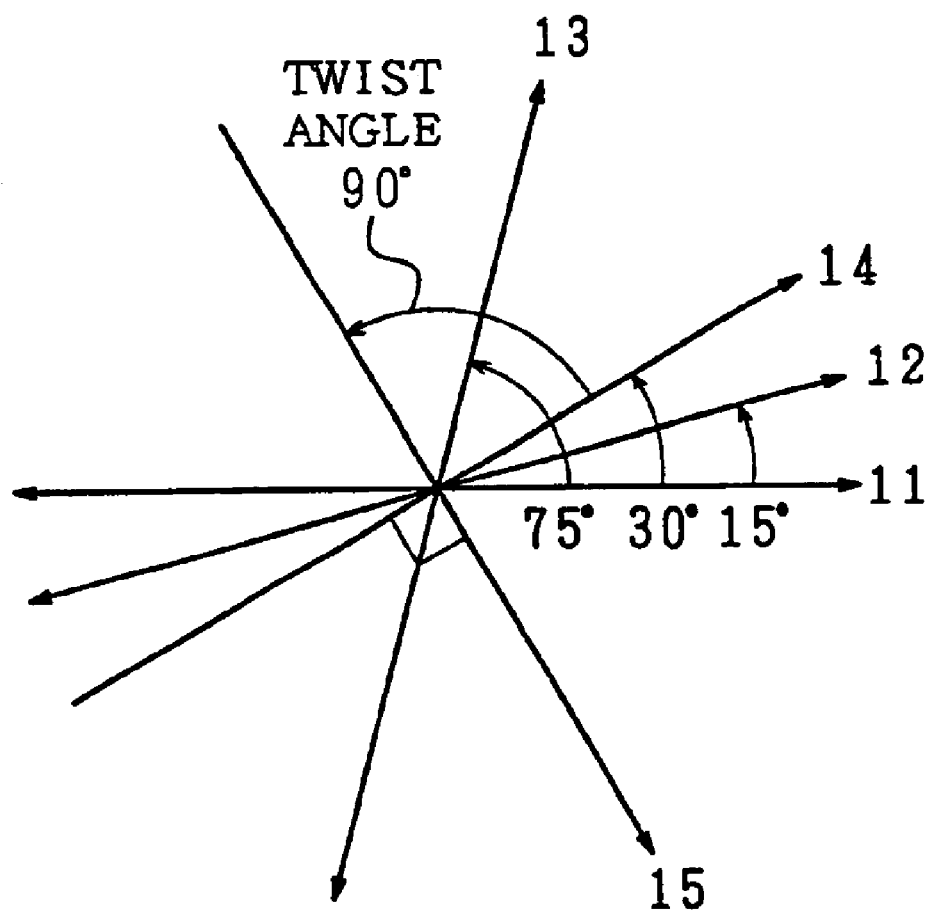
FIG. 8 is a drawing showing a directional configuration of a polarizer plate and two optical retardation compensator plates of a reflective liquid crystal display device of Example 3.

In the present example, the polarizer plate 10, the optical retardation compensator plate 8, and the optical retardation compensator plate 9 were configured as shown in FIG. 8. Note in FIG. 8 that 11 refers to the transmission axis direction of the polarizer plate 10, 12 refers to the slow axis direction of the optical retardation compensator plate 9, 13 refers to the slow axis direction of the optical retardation compensator plate 8, 14 refers to the direction of the alignment of the liquid crystal molecules that are in contact with the alignment layer 2 formed on a substrate 4, i.e., that are in a close proximity of the alignment layer 2, and 15 refers to the direction of the alignment of the liquid crystal molecules that are in contact with the alignment layer 3 formed on a substrate 5, i.e., that are in a close proximity of the alignment layer 3, and also that the figure is viewed from the direction of the incident light on the liquid crystal display device.

Further, the positional relationship, as shown in FIG. 8, stipulates that the angle, θ1, formed by the transmission axis direction 11 of the polarizer plate 10 and the slow axis direction 13 of the optical retardation compensator plate 8 was set to 75°, the angle, θ2, formed by the transmission axis direction 11 of the polarizer plate 10 and the slow axis direction 12 of the optical retardation compensator plate 9 was set to 15°, and the angle, θ3, formed by the alignment direction 14 of the liquid crystal molecules on the substrate 4 and the transmission axis direction 11 of the polarizer plate 10 was set to 30°.

The optical retardation compensator plate 8 and the optical retardation compensator plate 9 were both formed from an oriented film made of polyvinylalcohol; the optical retardation compensator plate 8 introduced a phase difference controlled to 130 nm to 140 nm to the light having a wavelength of 550 nm that traveled therethrough in a normal direction, and the optical retardation compensator plate 9 introduced a phase difference controlled to 265 nm to 275 nm to the same kind of light.

The optical retardation compensator plates 8 and 9 were configured in such a manner to enhance the optical properties of the fabricated liquid crystal display device in the front direction; however, their configuration, including the liquid crystal layer 1, may be changed while considering characteristics in observation from an oblique direction. For example, either or each of the optical retardation compensator plates 8 and 9 may be replaced with a biaxial optical retardation compensator plate, so as to alter the phase differences introduced to the light passing in an oblique direction by the optical retardation compensator plates 8 and 9 while satisfying conditions on the settings of the angles in accordance with the present example as shown in FIG. 8. In addition, needless to say, the settings of the angles may be altered within the range given by aforementioned Equation (1).

Further, as the polarizer plate 10, a polarizer plate was used that included an AR layer made up of multi-layered dielectric films and showed a transmittance of 45% when measured in a single piece.

Figure 9:
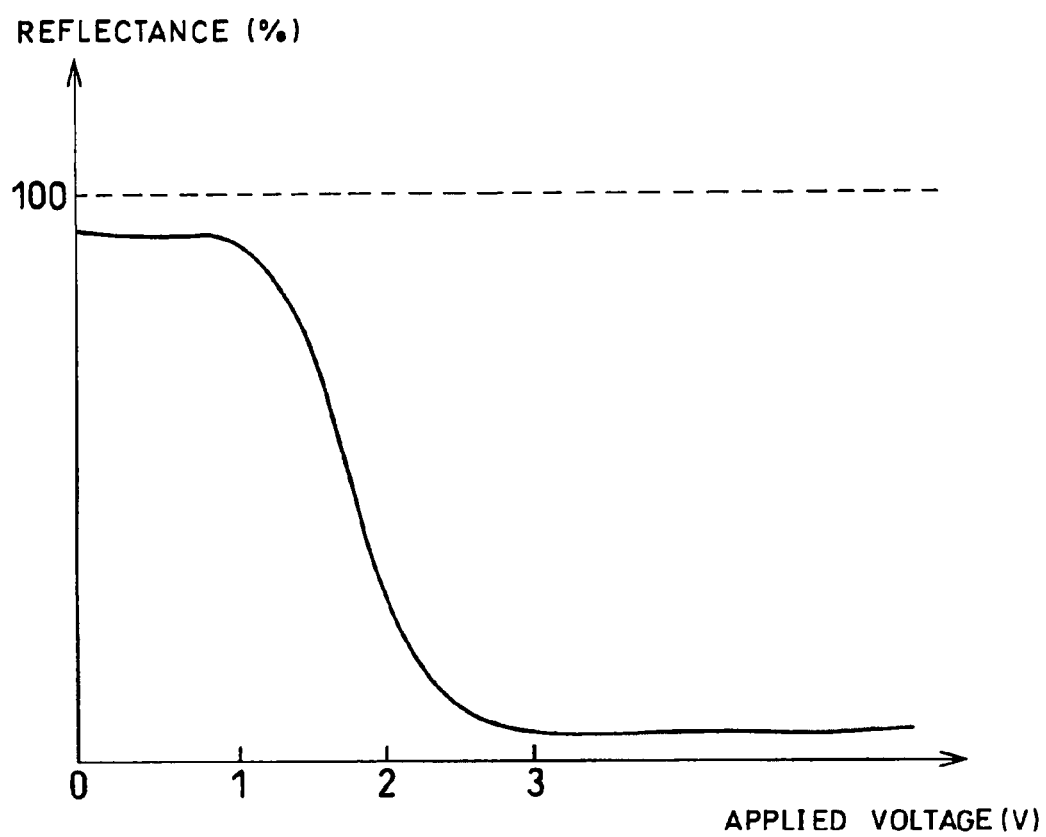
FIG. 9 is a drawing showing, in terms of measurements, a voltage dependency of reflectance of the reflective liquid crystal display device of Example 3.
Figure 10:
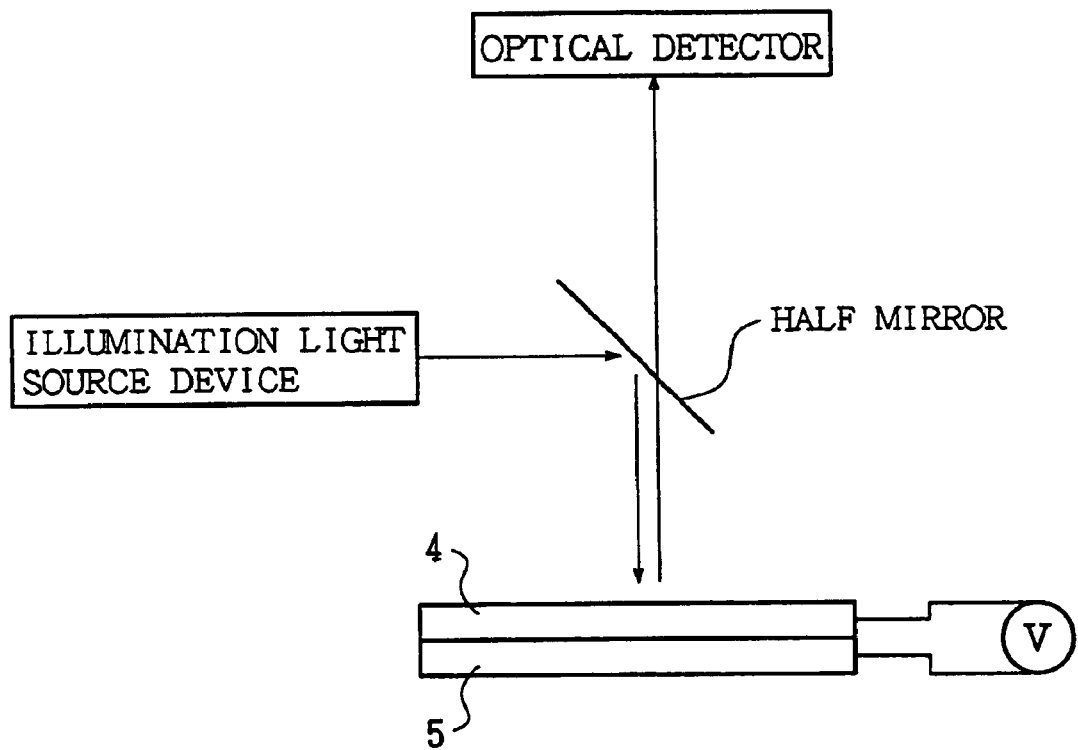
FIG. 10 is a conception drawing showing a configuration of an optical measuring system with which the voltage dependency of reflectance is measured on the reflective liquid crystal display device of Example 3.

A graph is shown in FIG. 9 illustrating a voltage dependency of reflectance of the reflective liquid crystal display device arranged in the aforementioned manner. The reflectance was measured, as shown in FIG. 10, in a driven state where voltage was applied across the reflective liquid crystal display device in accordance with the present example, using an optical detector detecting the light that radiated from an illumination light source device, travelled via a half mirror to enter on the side where the substrate 4 is disposed, and reflected at the light reflective film disposed on a substrate 5. Further, in FIG. 9, the reflectance at 100% represents a measurement on the same liquid crystal display device as that of the present example, except that it includes no optical retardation compensator plates, but only the same polarizer plates as those in the device on which measurement is conducted as above, in a state where liquid crystal is not filled. In addition, luminous reflectance (Y values) is employed as the reflectance.

As can be seen from the measurement results shown in FIG. 9, a high reflectance was obtained at a drive voltage as low as about 1V or even lower.

EXAMPLE 4

As Example 4, a reflective liquid crystal display device will be described that includes a liquid crystal layer of which the twist angle of the twisted nematic liquid crystal is set to 70° and two optical retardation compensator plates have retardation of 135 nm and 270 nm respectively.

In Example 4, a reflective liquid crystal display device structured as shown in aforementioned FIG. 1 was fabricated. The light reflective film 7 on a substrate 5 was made of aluminum and served as a light reflective electrode. In addition, the liquid crystal drive cell was a 70° twisted liquid crystal layer 1 that was adjusted to have a thickness of 4.5 µm (Sample #4a) or 4.2 µm (Sample #4b) after the introduction of liquid crystal, the introduced liquid crystal material used here having the same liquid crystal physical properties (dielectric anisotropy, elasticity, viscosity, nematic temperature range, and voltage retaining property) as the liquid crystal used in a typical TFT transmissive liquid crystal display device only except Δn which was adjusted to 0.06. Here, the product of the thickness of the liquid crystal layer 1 and the birefringence difference of the liquid crystal was set to 270 nm (Sample #4a) or 250 nm (Sample #4b).

Figure 11:
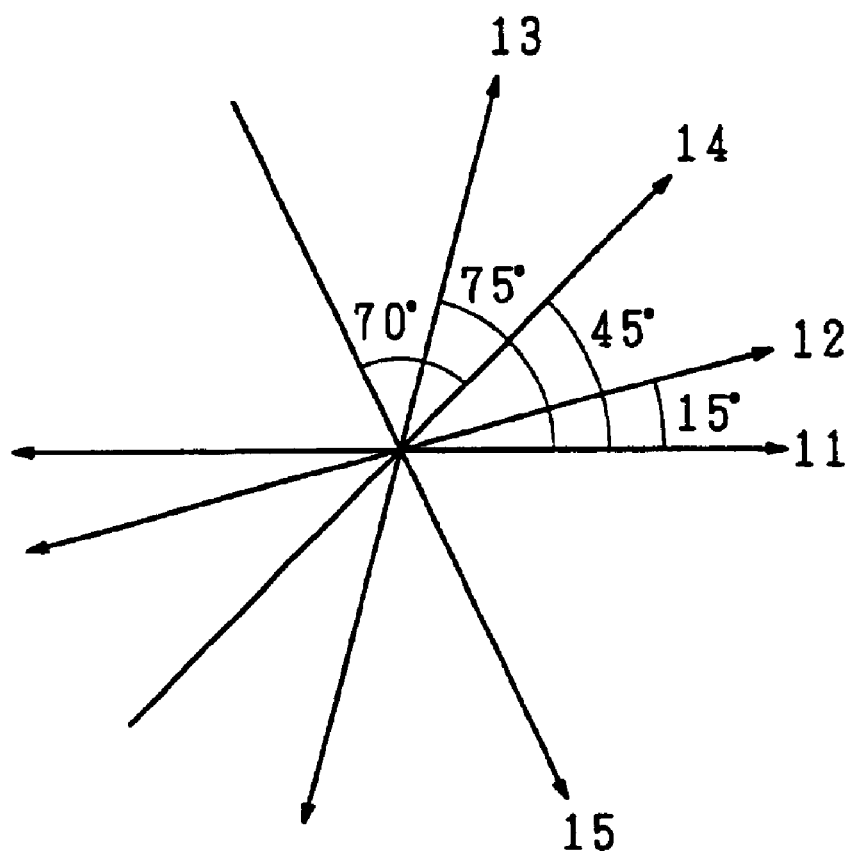
FIG. 11 is a drawing showing a directional configuration of a polarizer plate and two optical retardation compensator plates of a reflective liquid crystal display device of Example 4.

In the present example, the polarizer plate 10, the optical retardation compensator plate 8, and the optical retardation compensator plate 9 were configured as shown in FIG. 11. Note in FIG. 11 that 11 refers to the transmission axis direction of the polarizer plate, 12 refers to the slow axis direction of the optical retardation compensator plate 9, 13 refers to the slow axis direction of the optical retardation compensator plate 8, 14 refers to the direction of the alignment of the liquid crystal molecules that are in contact with the alignment layer 2 formed on a substrate 4, i.e., that are in a close proximity of the alignment layer 2, and 15 refers to the direction of the alignment of the liquid crystal molecules that are in contact with the alignment layer 3 formed on a substrate 5, i.e., that are in a close proximity of the alignment layer 3, and also that the figure is viewed from the direction of the incident light on the liquid crystal display device.

Further, the positional relationship, as shown in FIG. 11, stipulates that the angle, $\theta 1$, formed by the transmission axis direction 11 of the polarizer plate 10 and the slow axis direction 13 of the optical retardation compensator plate 8 was set to 75°, the angle, $\theta 2$, formed by the transmission axis direction 11 of the polarizer plate 10 and the slow axis direction 12 of the optical retardation compensator plate. 9 was set to 15°, and the angle, $\theta 3$, formed by the alignment direction 14 of the liquid crystal molecules on the substrate 4 and the transmission axis direction 11 of the polarizer plate 10 was set to 45°.

The optical retardation compensator plate 8 and the optical retardation compensator plate 9 were both formed from an oriented film made of polyvinylalcohol; the optical retardation compensator plate 8 introduced a phase difference controlled to 130 nm to 140 nm to the light having a wavelength of 550 nm that travelled therethrough in a normal direction, and the optical retardation compensator plate 9 introduced a phase difference controlled to 265 nm to 275 nm to the same kind of light.

The optical retardation compensator plates 8 and 9 were configured in such a manner to enhance the optical properties of the fabricated liquid crystal display device in the front direction; however, their configuration, including the liquid crystal layer 1, may be changed while considering characteristics in observation from an oblique direction. For example, either or each of the optical retardation compensator plates 8 and 9 may be replaced with a biaxial optical retardation compensator plate, so as to alter the phase differences introduced to the light passing in an oblique direction by the optical retardation compensator plates 8 and 9 while satisfying conditions on the settings of the angles in accordance with the present example as shown in FIG. 11. In addition, needless to say, the settings of the angles may be altered within the range given by aforementioned Equation (1).

Further, as the polarizer plate 10, a polarizer plate was used that included an AR layer made up of multi-layered dielectric films and showed a transmittance of 45% when measured in a single piece.

The reflectance of the reflective liquid crystal display device arranged in the aforementioned manner showed the same voltage dependency as that illustrated in the graph in aforementioned FIG. 9. As can be seen from these results, a high reflectance was obtained at a drive voltage as low as about 1V or even lower. Note that the reflectance was measured, shown in FIG. 10, using the same optical measuring system as in aforementioned Example 3 and also that the reflectance at 100% was set in the same manner as in aforementioned Example 3.

In addition, Table 3 shows contrast, coloring in white, and coloring in black for a variety of angles, θ3, formed by the transmission axis of the polarizer plate 10 and the alignment direction of the liquid crystal in a close proximity of the upper substrate 4.

contact with the alignment layer 2 formed on a substrate 4, i.e., that are in a close proximity of the alignment layer 2, and 15 refers to the direction of the alignment of the liquid crystal molecules that are in contact with the alignment layer 3 formed on a substrate 5, i.e., that are in a close proximity

TABLE 3

| θ3/ degree | Sample #4a | | | | Sample #4b | | | |
|---|---|---|---|---|---|---|---|---|
| | Contrast | Coloring In White | Coloring In Black | Overall Evaluation | Contrast | Coloring In White | Coloring In Black | Overall Evaluation |
| 0 | x | x | x | x | Δ | Δ | x | x |
| 10 | Δ | Δ | x | x | ○ | ○ | x | x |
| 20 | Δ | Δ | Δ | Δ | ○ | ○ | Δ | Δ |
| 30 | Δ | Δ | ○ | Δ | ○ | ○ | ○ | ○ |
| 40 | ○ | ○ | ○ | ○ | ○ | ○ | ○ | ○ |
| 50 | ○ | ○ | ○ | ○ | ○ | ○ | ○ | ○ |
| 60 | ○ | ○ | ○ | ○ | ○ | ○ | ○ | ○ |
| 70 | ○ | ○ | Δ | Δ | ○ | ○ | Δ | Δ |
| 80 | ○ | ○ | x | x | ○ | ○ | x | x |
| 90 | ○ | ○ | x | x | ○ | ○ | x | x |
| 100 | Δ | Δ | x | x | ○ | ○ | x | x |
| 110 | Δ | Δ | Δ | Δ | ○ | ○ | Δ | Δ |
| 120 | Δ | Δ | Δ | Δ | ○ | ○ | Δ | Δ |
| 130 | x | x | ○ | x | Δ | Δ | ○ | Δ |
| 140 | x | x | Δ | x | Δ | Δ | Δ | Δ |
| 150 | x | x | Δ | x | Δ | Δ | Δ | Δ |
| 160 | x | x | x | x | Δ | Δ | x | x |
| 170 | x | x | x | x | Δ | Δ | x | x |

(In Table, ○ is for excellent, Δ for good and x for unsuitable for use)

As can be confirmed by these results, a reflective liquid crystal display device could be realized with high display quality by setting θ3 to not less than 20° and not more than 70° or not less than 110° and not more than 150°.

EXAMPLE 5

As Example 5, a reflective liquid crystal display device will be described that includes a liquid crystal layer of which the twist angle of the twisted nematic liquid crystal is set to 70° and two optical retardation compensator plates have retardation of 135 nm and 270 nm respectively.

In Example 5, a reflective liquid crystal display device structured as shown in aforementioned FIG. 1 was fabricated. The light reflective film 7 on a substrate 5 was made of aluminum and served as a light reflective electrode. In addition, the liquid crystal drive cell was a 70° twisted liquid crystal layer 1 that was adjusted to have a thickness of 4.5 μm after the introduction of liquid crystal, the introduced liquid crystal material used here having the same liquid crystal physical properties (dielectric anisotropy, elasticity, viscosity, temperature properties, and voltage retaining property) as the liquid crystal used in a typical TFT transmissive liquid crystal display device only except Δn which was adjusted to 0.0667. Here, the product of the thickness of the liquid crystal layer 1 and the birefringence difference of the liquid crystal was set to 300 nm.

Figure 12:
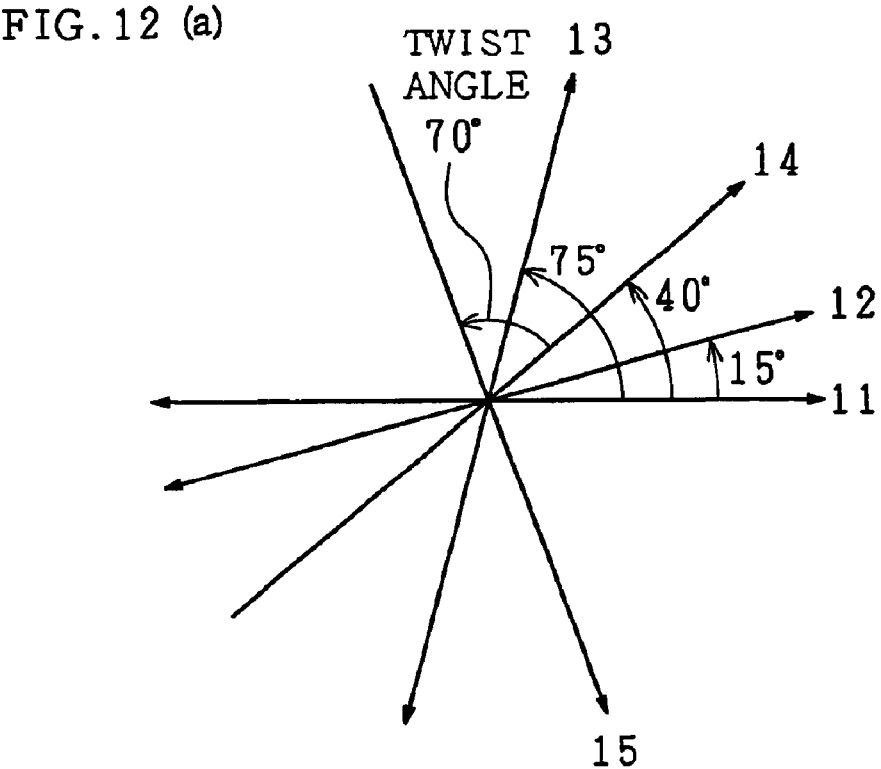
FIG. 12(a) and FIG. 12(b), referring to Samples #5a and #5b, respectively, of a reflective liquid crystal display device of Example 5, are drawings showing a directional configuration of a polarizer plate, two optical retardation compensator plates, and the alignment of liquid crystal in a liquid crystal layer.
Figure 12:
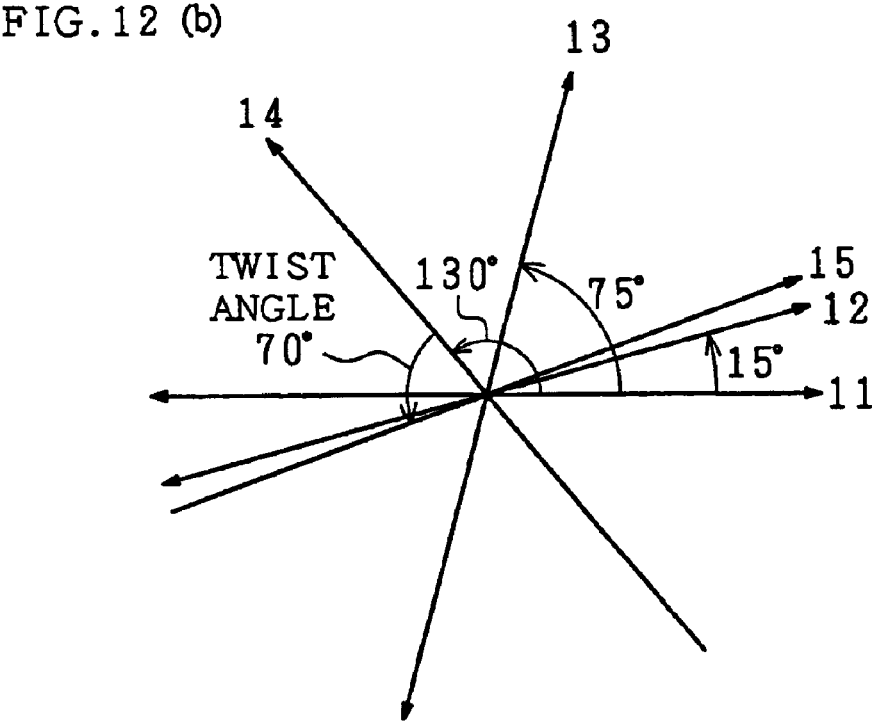

In the present example, the polarizer plate 10, the optical retardation compensator plate 8, and the optical retardation compensator plate 9 were configured in two kinds as shown in FIGS. 12(*a*) and 12(*b*), and two kinds of samples were fabricated accordingly. Note in FIGS. 12(*a*) and 12(*b*) that, similarly to aforementioned FIG. 8, 11 refers to the transmission axis direction of the polarizer plate 10, 12 refers to the slow axis direction of the optical retardation compensator plate 9, 13 refers to the slow axis direction of the optical retardation compensator plate 8, 14 refers to the direction of the alignment of the liquid crystal molecules that are in of the alignment layer 3, and also that the figure is viewed from the direction of the incident light on the liquid crystal display device.

Further, the positional relationship of one of the samples, as shown in FIG. 12(*a*), stipulates that the angle, θ1, formed by the transmission axis direction 11 of the polarizer plate 10 and the slow axis direction 13 of the optical retardation compensator plate 8 was set to 75°, the angle, θ2, formed by the transmission axis direction 11 of the polarizer plate 10 and the slow axis direction 12 of the optical retardation compensator plate 9 was set to 15°, and the angle, θ3, formed by the alignment direction 14 of the liquid crystal molecules on the substrate 4 and the transmission axis direction 11 of the polarizer plate 10 was set to 40°. This sample will be called Sample #5a.

The positional relationship of the other sample, as shown in FIG. 12(*b*), stipulates that the angle, θ1, formed by the transmission axis direction 11 of the polarizer plate 10 and the slow axis direction 13 of the optical retardation compensator plate 8 was set to 75°, the angle, θ2, formed by the transmission axis direction 11 of the polarizer plate 10 and the slow axis direction 12 of the optical retardation compensator plate 9 was set to 15°, and the angle, θ3, formed by the alignment direction 14 of the liquid crystal molecules on the substrate 4 and the transmission axis direction 11 of the polarizer plate 10 was set to 130°. This sample will be called Sample #5b. As a result, Samples #5a and #5b differed from each other in θ3 and shared common θ1 and θ2.

Note that as to these Samples #5a and #5b, similarly to aforementioned Example 3, the optical retardation compensator plate 8 and the optical retardation compensator plate 9 were both formed from an oriented film made of polyvinylalcohol; the optical retardation compensator plate 8 introduced a phase difference controlled to 130 nm to 140 nm to the light having a wavelength of 550 nm that travelled therethrough in a normal direction, and the optical retardation compensator plate 9 introduced a phase difference controlled to 265 nm to 275 nm to the same kind of light. In addition, as the polarizer plate 10, a polarizer plate was used that included an AR layer made up of multi-layered dielectric films and showed a transmittance of 45% when measured in a single piece.

Figure 13:
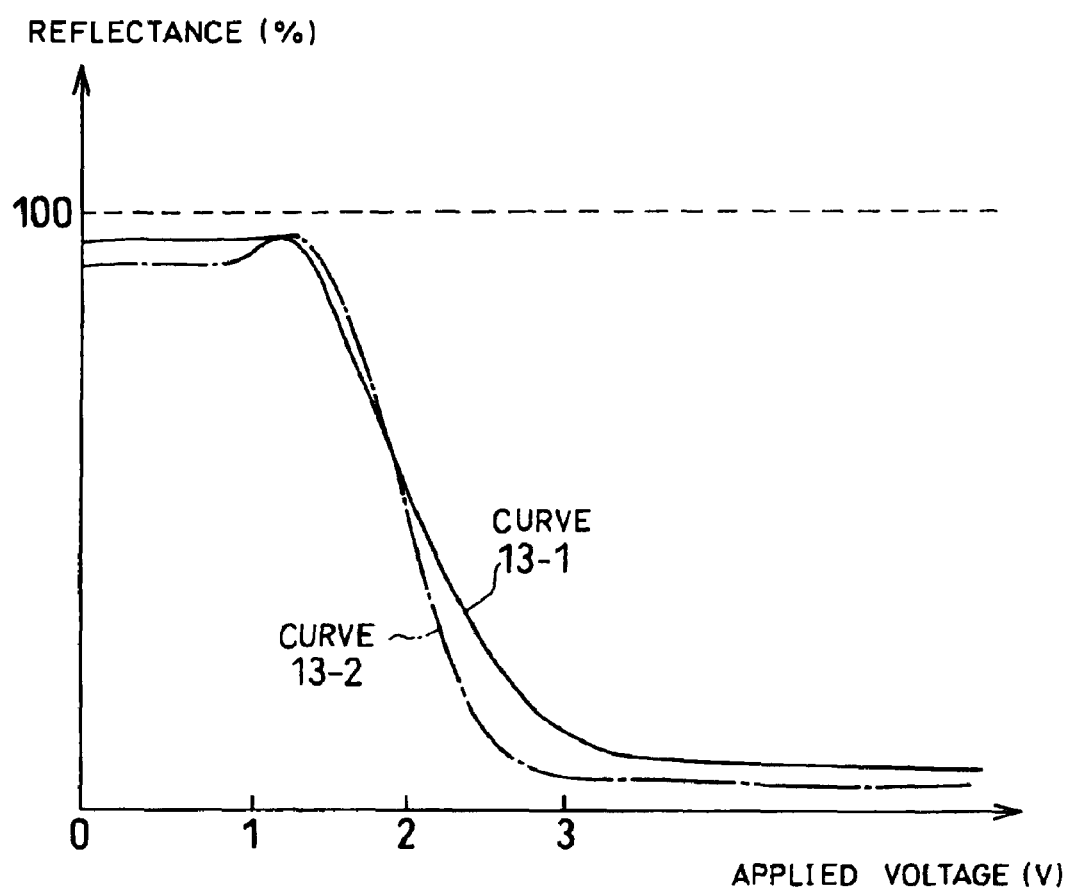
FIG. 13 is a drawing showing, in terms of measurements, a voltage dependency of reflectance of a reflective liquid crystal display device of Example 5.

A graph is shown in FIG. 13 illustrating voltage dependencies of reflectance of the reflective liquid crystal display devices (Sample #5a and #5b) arranged in the aforementioned manner. In FIG. 13, the curve 13-1 represents measurement results of Sample #5a, and the curve 13-2 those of Sample #5b. Note that the reflectance was measured, as shown in FIG. 10, using the same optical measuring system as in aforementioned Example 3 and also that the reflectance at 100° was set in the same manner as in aforementioned Example 3. As can be understood from the measurements shown in FIG. 13, a high reflectance was obtained at a drive voltage as low as about 1.5V or even lower; a comparison of the two curves shows that a higher reflectance was obtained with Sample #5a represented by the curve 13-1.

In addition, Table 4 shows results of the examination of voltage versus reflectance property on the reflective liquid crystal display devices (Samples #5a and #5b) of Example 5 as detailed here and the reflective liquid crystal display device of aforementioned Example 3.

TABLE 4

|  | Brightness in Bright State | Contrast Ratio |
| --- | --- | --- |
| Example 3 | 90% | 10 |
| Example 5 (Sample #5a) | 95% | 8 |
| Example 5 (Sample #5b) | 95% | 15 |

As understood from Table 4, in either case, a sufficient reflectance and contrast ratio was achieved in a bright state; the reflective liquid crystal display devices were satisfactory in visual observation too.

Note that in Table 4 the contrast ratio is defined as the quotient obtained by dividing the reflectance in the bright state by the reflectance in the dark state. Here, the voltage that produces the highest reflectance for each example was used as the voltage applied in the bright state, while the voltage applied in the dark state was set to 3V.

EXAMPLE 6

As Example 6, a reflective liquid crystal display device will be described that was fabricated following the same conditions as in those in aforementioned Example 4. Optical properties were measured on the reflective liquid crystal display device with different combinations of $\Delta n(450)/\Delta n(550)$ and $\Delta n(650)/\Delta n(550)$, i.e., (1, 1), (1.003, 0.993), (1.007, 0.987), (1.01, 0.98), (1.03, 0.96), (1.06, 0.95), and (1.1, 0.93), and the results are shown in Table 5. Note that $\Delta n(450)/\Delta n(550)$ and $\Delta n(650)/\Delta n(550)$ represent the ratios of the refractive index anisotropies, $\Delta n(450)$ and $\Delta n(650)$, of the optical retardation compensator plate 8 and the optical retardation compensator plate 9 with respect to light having a wavelength of 450 nm and with respect to light having a wavelength of 650 nm respectively to the refractive index anisotropy, $\Delta n(550)$, of the optical retardation compensator plate 8 and the optical retardation compensator plate 9 with respect to light having a wavelength of 550 nm.

TABLE 5

| $\Delta n(450)/\Delta n(550)$ | $\Delta n(650)/\Delta n(550)$ | Properties |
| --- | --- | --- |
| 1 | 1 | ○ |
| 1.003 | 0.993 | ○ |
| 1.007 | 0.987 | ○ |
| 1.01 | 0.98 | Δ |
| 1.03 | 0.96 | Δ |
| 1.06 | 0.95 | Δ |
| 1.1 | 0.93 | x |

(In Table, ○ is for excellent, Δ for good, and x for unsuitable for use)

These results confirm that a reflective liquid crystal display device display could be made with high display quality by such settings to satisfy the relationships:

$1 \leq \Delta n(450)/\Delta n(550) \leq 1.06$, and $0.95 \leq \Delta n(650)/\Delta n(550) \leq 1$, and with even higher display quality by such settings to satisfy the relationships:

$1 \leq \Delta n(450)/\Delta n(550) \leq 1.007$, and $0.987 \leq \Delta n(650)/\Delta n(550) \leq 1$.

EXAMPLE 7

Figure 14:
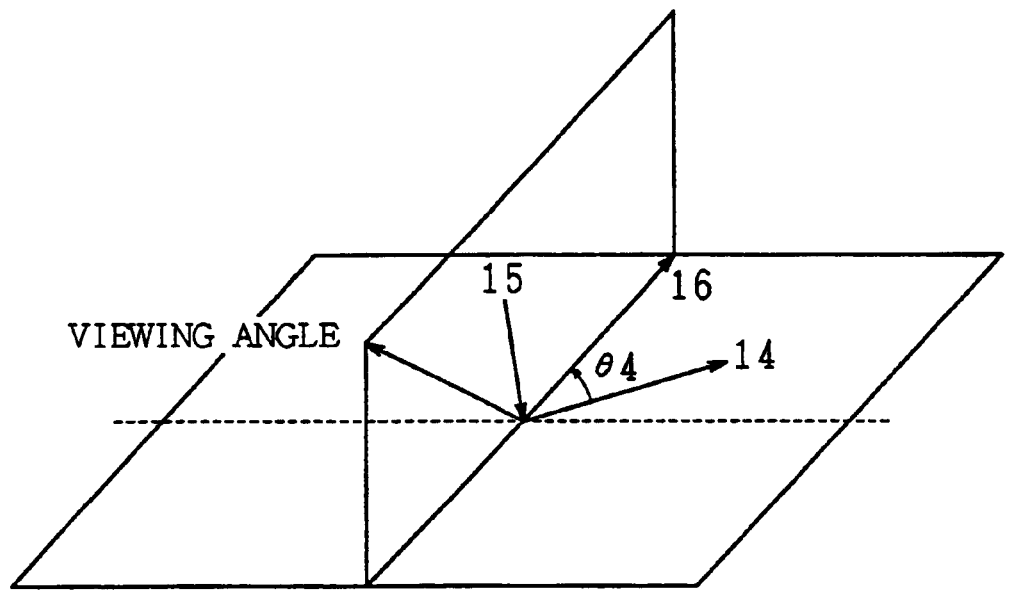
FIG. 14 is a drawing showing a directional configuration of the alignment of liquid crystal in a close proximity of an upper substrate of Example 7 and a plane that is parallel to a viewing direction.

As Example 7, a reflective liquid crystal display device will be described that was fabricated following the same conditions as in those in aforementioned Example 4. Brightness, contrast, coloring were measured, and overall evaluation was made on the reflective liquid crystal display by altering the angle, θ4, formed by a direction 16 on the plane defined by the viewing direction and the normal to the display surface shown in FIG. 14 and the direction 14 of the liquid crystal molecules in a close proximity of the second substrate, and the results are shown in FIG. 15. The results confirm that a reflective liquid crystal display device was obtained with high display quality, in particular, substantially excellent brightness, contrast, and parallax from the achromatic axis by setting θ4 to not less than 0° and not more than 30° or not less than 180° and not more than 210°.

EXAMPLE 8

As Example 8, the following description will explain an example using a light reflective film having smooth concavities and convexities and an active matrix driving system.

Figure 16:
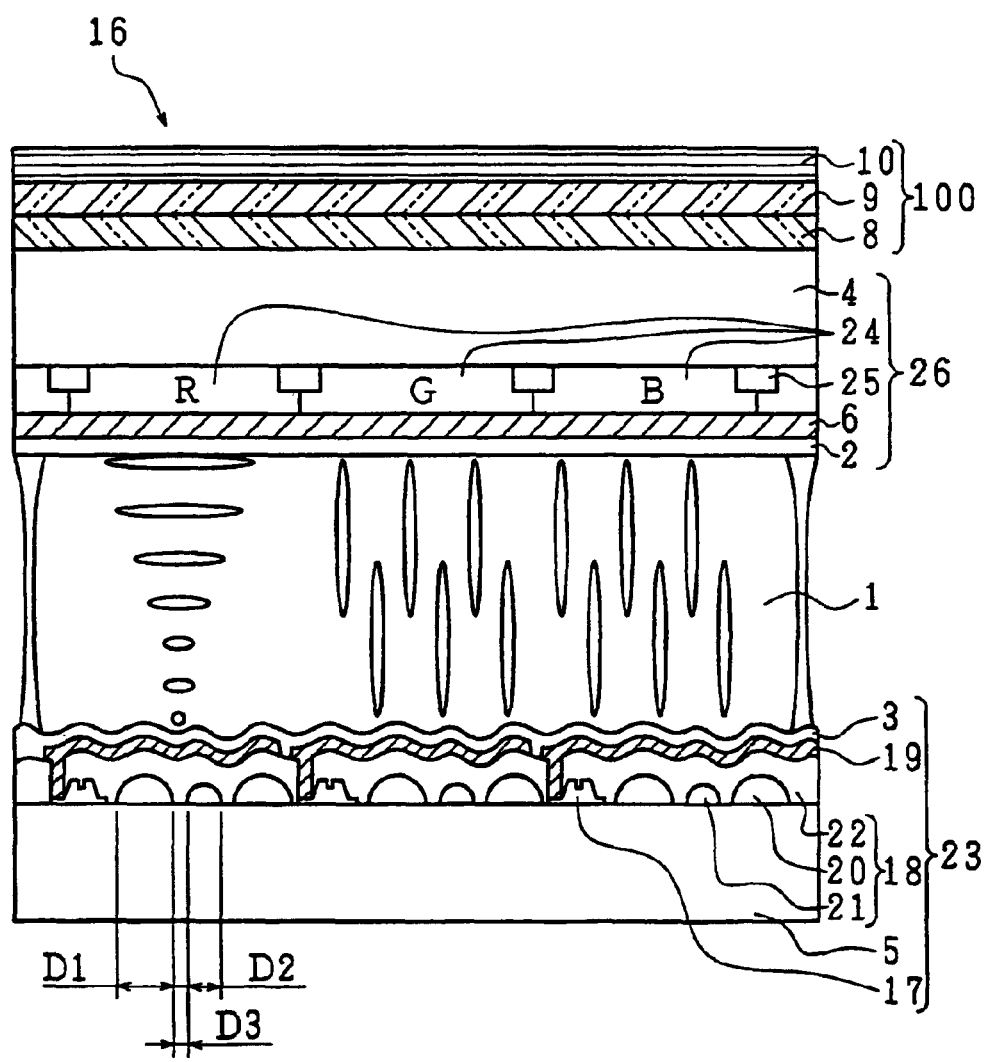
FIG. 16 is a cross-sectional view schematically showing a structure of a major part of a reflective liquid crystal display device of Example 8.

FIG. 16 is a cross-sectional view showing a structure of a major part of a reflective liquid crystal display device of Example 8. As shown in FIG. 16, the reflective liquid crystal display device 16 included a first substrate 5 and a second substrate 4 that was made of transparent glass and further includes as an active switching element an TFT element 17 formed on each pixel on the first substrate 5. On the TFT element 17 and drive wires (not shown) were formed an interlayer insulating film 18. The drain terminal (not shown) of the TFT element 17 was electrically connected to a light reflective pixel electrode 19 via a contact hole. On the light reflective pixel electrode 19 was formed an alignment layer 3 with a 100 nm thickness.

Here, the light reflective pixel electrode 19 was made of conductive metal, such as aluminum, nickel, chromium, silver, and an alloy including one or more of these metals, and was light reflective. Further, as to the shape, the light reflective pixel electrode 19 had smooth concavities and convexities at a portion where there was provided no contact hole so as to prevent the metallic reflecting surface from serving as a specular surface.

Next, a method of forming the light reflective pixel electrode 19 will be explained in detail.

Relatively large protrusions 20 and relatively small protrusions 21 were made in great numbers from photosensitive resin material on the surface of the substrate 5 on which the TFT elements 17 and the drive wires (not shown) had been fabricated in advance. The relatively large protrusions 20 and relatively small protrusions 21 were formed in great numbers in a circular shape using photolithography technique so as to have bottom diameters of D1 and D2 respectively (see FIG. 16). The D1 and D2 were set to 5 μm and 3 μm respectively for example. In addition, the interval, D3, between the protrusions was set to 2 μm or greater. In addition, the heights of the protrusions, which were controllable during fabrication of the film from photosensitive resin material, was set to 1.5 μm in the present example, and the heads of the protrusions were made smooth in exposure and baking processes that followed.

Subsequently to this, the protrusions 20 and 21 were covered, and a planarization layer 22 was formed from a similar photosensitive resin material to plug the flat portion between the protrusions 20 and 21. Hence, the surface of the planarization layer 22, being affected by the protrusions 20 and 21, had a smoothly curved surface, that was the required target shape. Note that the protrusion and the planarization layer 22 were not fabricated in the contact hole portion.

Through the fabrication of the TFT element substrate 23 having such a structure, a reflective liquid crystal display device that had a high so-called aperture ratio and was therefore bright was obtained wherein no parallax existed because the light reflective pixel electrode 19 doubled as a reflector plate and was disposed near the liquid crystal layer 1, and no light, having passed through the liquid crystal layer 1 and reflected at the light reflective pixel electrode 19, was damaged by the TFT element 17 and the element drive wires (not shown) portion.

In contrast, the other substrate, which was used in combination with the TFT element substrate 23, included a highly bright color filter 24 in accordance with a reflective mode. The color filter 24 was provided with a black matrix 25 that prevented color mixture between the pixels and leakage of reflected light in a dark display caused by no-voltage applied portions between pixel electrodes and electric field disturbance.

The black matrix 25, even if being made from an inexpensive metal film for example, did not reflect light to degrade visibility, since the incident light, which was already substantially circularly polarized, was reflected at the black matrix 25, and then absorbed again by the polarizer plate upon exiting, due to the function of the optical retardation compensator plate. Note that the black matrix 25, if being further subjected to a low reflection process, was more preferable to be used for a high contrast display.

Opposite electrodes 6 were formed, on the color filter 24 in such a manner to oppositely face the light reflective pixel electrode 19, with a 140 nm thickness and a desired pattern to drive the TFT elements, by mask depositing ITO (Indium Tin Oxide) as a transparent electrode 6 using a sputtering technique. Then an alignment layer 2 was formed further thereon, which completed the process to fabricate a color filter substrate 26.

Note that even if the transparent electrode 6 had a thickness other than 140 nm, since part of incident light that was reflected without reaching the liquid crystal layer 1 due to interference effects by the thickness of the transparent electrode 6 was absorbed by the optical retardation compensator plates 8 and 9 and the polarizer plate 10, there were no adverse effects on a dark state, and visibility did not deteriorate.

In addition, the color filter 24 used here was suitably designed to produce brightness that was suited for high contrast display mode using a polarizer plate, and the color filter substrate 26 had a transmittance of 50% at Y value with the black matrix 25 having an aperture ratio of 90%.

The TFT element substrate 23 and the color filter substrate 26 prepared in this manner were subjected to an alignment layer treatment through rubbing, a process to dispose plastic spacers (not shown) for maintaining the thickness of the liquid crystal layer 1, and a process to dispose a sealing material along edges, and thereafter were aligned with each other so as to oppositely face each other, and sealed through curing under pressure, so as to prepare a liquid crystal cell into which liquid crystal would be filled. Further, in the liquid crystal layer 1, liquid crystal material having a positive dielectric anisotropy $\Delta\in$ was introduced using vacuum filling. Hereinafter, the direction around the liquid crystal display device would be described as viewed by a viewer who oppositely faced the device, with the upward direction being defined as the 12 o'clock direction in reference to a clock face.

On a side of the color filter substrate 26, opposite to the liquid crystal layer 1, were disposed optical retardation compensator plates 8 and 9 that were formed from an oriented film made of polyvinylalcohol. A polarizer plate 10 was disposed further on the optical retardation compensator plates 8 and 9.

Figure 17:
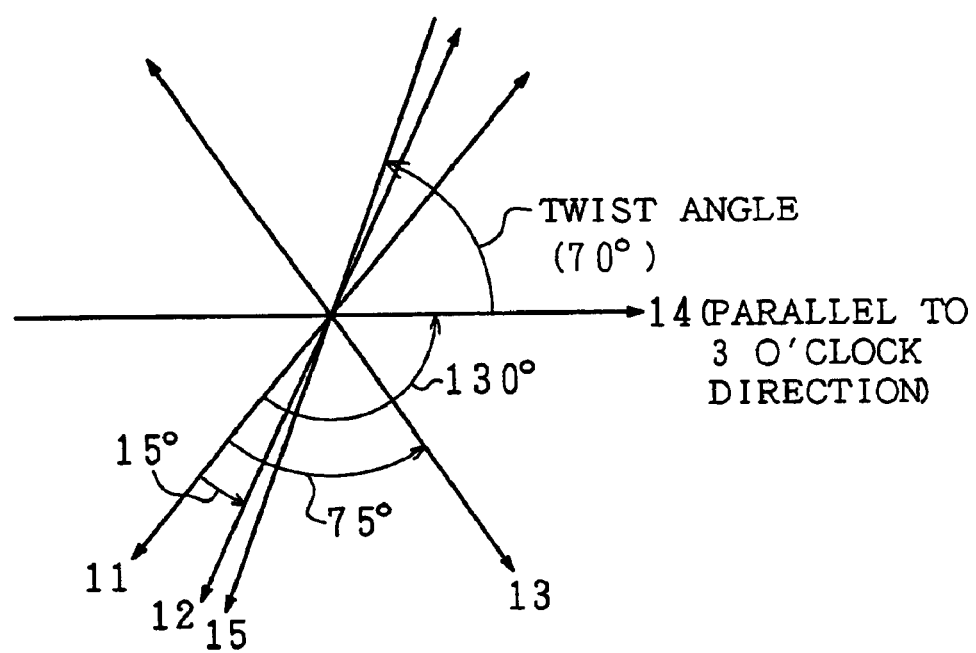
FIG. 17 is a drawing showing a directional configuration of a polarizer plate, two optical retardation compensator plates, and the alignment of liquid crystal in a liquid crystal layer of the reflective liquid crystal display device of Example 8.

In the present example, the polarizer plate 10, the optical retardation compensator plate 8, and the optical retardation compensator plate 9, which constituted the circular polarizer plate 100, were configured as shown in FIG. 17. Note in FIG. 17 that 11 refers to the transmission axis direction of the polarizer plate 10, 12 refers to the slow axis direction of the optical retardation compensator plate 9, 13 refers to the slow axis direction of the optical retardation compensator plate 8, 14 refers to the direction of the alignment of the liquid crystal molecules that are in contact with an alignment layer 2 formed on the color filter substrate 26, i.e., that are in a close proximity of the alignment layer 2, and 15 refers to the direction of the alignment of the liquid crystal molecules that are in contact with an alignment layer 3 formed on the TFT element substrate 23, i.e., that are in a close proximity of the alignment layer 3. Here, the alignment layer 2 on the color filter substrate 26 is fabricated so that the alignment processing direction 14 is in the 3 o'clock direction relative to the device.

Further, the positional relationship, as shown in FIG. 17, stipulates that the angle, $\theta 1$, formed by the transmission axis direction 11 of the polarizer plate 10 and the slow axis direction 13 of the optical retardation compensator plate 8 was set to 75°, the angle, $\theta 2$, formed by the transmission axis direction 11 of the polarizer plate 10 and the slow axis direction 12 of the optical retardation compensator plate 9 was set to 15°, and the angle, $\theta 3$, formed by the alignment direction 14 of the liquid crystal molecules on the color filter substrate 26 and the transmission axis direction 11 of the polarizer plate 10 was set to 130°.

In addition, the liquid crystal layer 1 used here was adjusted to have a thickness of 4.0 to 5.0 μm after the introduction of liquid crystal material, the liquid crystal used here had a $\Delta n$ of 0.0667, the product of the thickness of the liquid crystal layer and the birefringence difference was set to substantially 300 nm. The thickness of the liquid crystal layer 1 differed depending on the place due to the concave and convex surface of the light reflective pixel electrode 19.

Further, a drive circuit was mounted around the liquid crystal display fabricated in the above manner to complete the process of fabricate a reflective liquid crystal display device.

In the reflective liquid crystal display device of the present example, since the light reflective pixel electrode 19 was located near the liquid crystal layer 1, there was no parallax being produced, and a satisfactorily high resolution display was realized. Those concavities and convexities provided to the light reflective pixel electrode 19 prevented the viewer from being reflected in the device, thereby realizing a satisfactory white display. Further, since nothing was disposed in front of the liquid crystal display device to randomly reflect incident light, the liquid crystal display device showed a satisfactory dark state. For these reasons, the liquid crystal display device achieved a high contrast ratio display.

In addition, since a highly bright color filter 24 was used, even when a polarizer plate was used, sufficient brightness could be ensured, the reflectance was low in the dark state, and color purity did not deteriorate because of the simultaneous viewing of the light reflected on color elements selected to this dark state and the light reflected on the color elements selected to a bright state. This allowed a highly satisfactory color reproduction without damaging the color reproduction range of the color filter 24 despite the poor saturation of the highly bright color filter 24.

In addition, since the voltage applied across the pixels were set to an intermediate state between a dark state and a bright state, there were no problems in producing gray scales. Therefore, there were no problems in reproducing half tones with the colors of the color filter 24. In addition, it was confirmed that in actual driving the response speed posed no problems in reproducing moving pictures.

As mentioned above, a reflective liquid crystal display device could be obtained, using a practicable fabrication method, that could display half-tones and moving pictures while maintaining a satisfactory color reproduction range.

EXAMPLE 9

As Example 9, a reflective liquid crystal display device will be described that is an example to enhance brightness through the fabrication of a concave and convex light reflective film having an in-plane anisotropy and to specify the direction in which the inclined viewing angle of the liquid crystal layer is satisfactory to a direction in which the brightness is high.

In Example 9, the light reflective pixel electrode 19 of the reflective liquid crystal display device was fabricated to have concavities and convexities according to a pattern different from that in Example 8, so that the concavities and convexities varied depending on the direction on the plane on which the reflective electrodes were formed.

Figure 18:
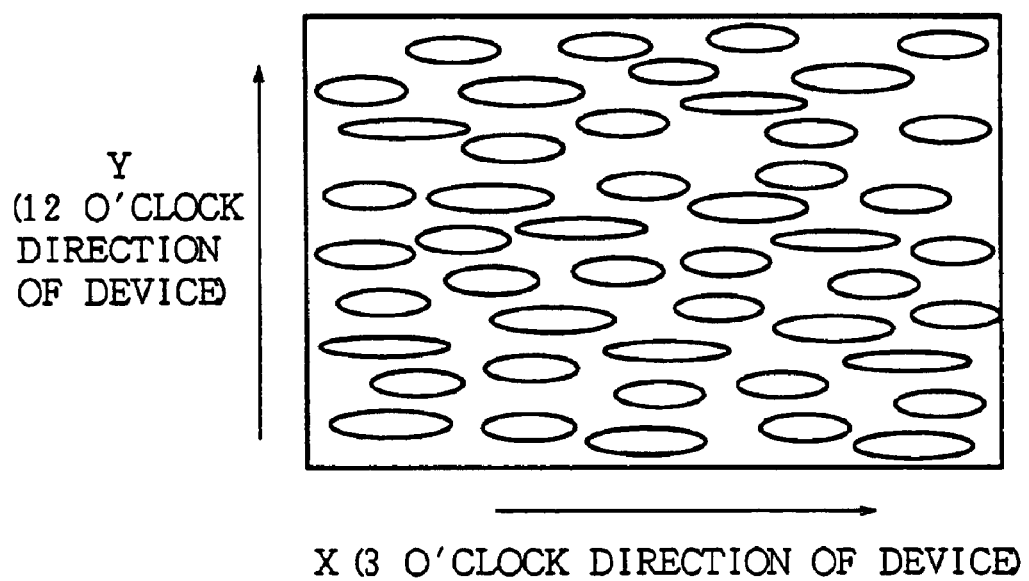
FIG. 18 is an enlarged plan view partially showing concavities and convexities on a light reflector plate employed in a reflective liquid crystal display device of Example 9.
Figure 19:
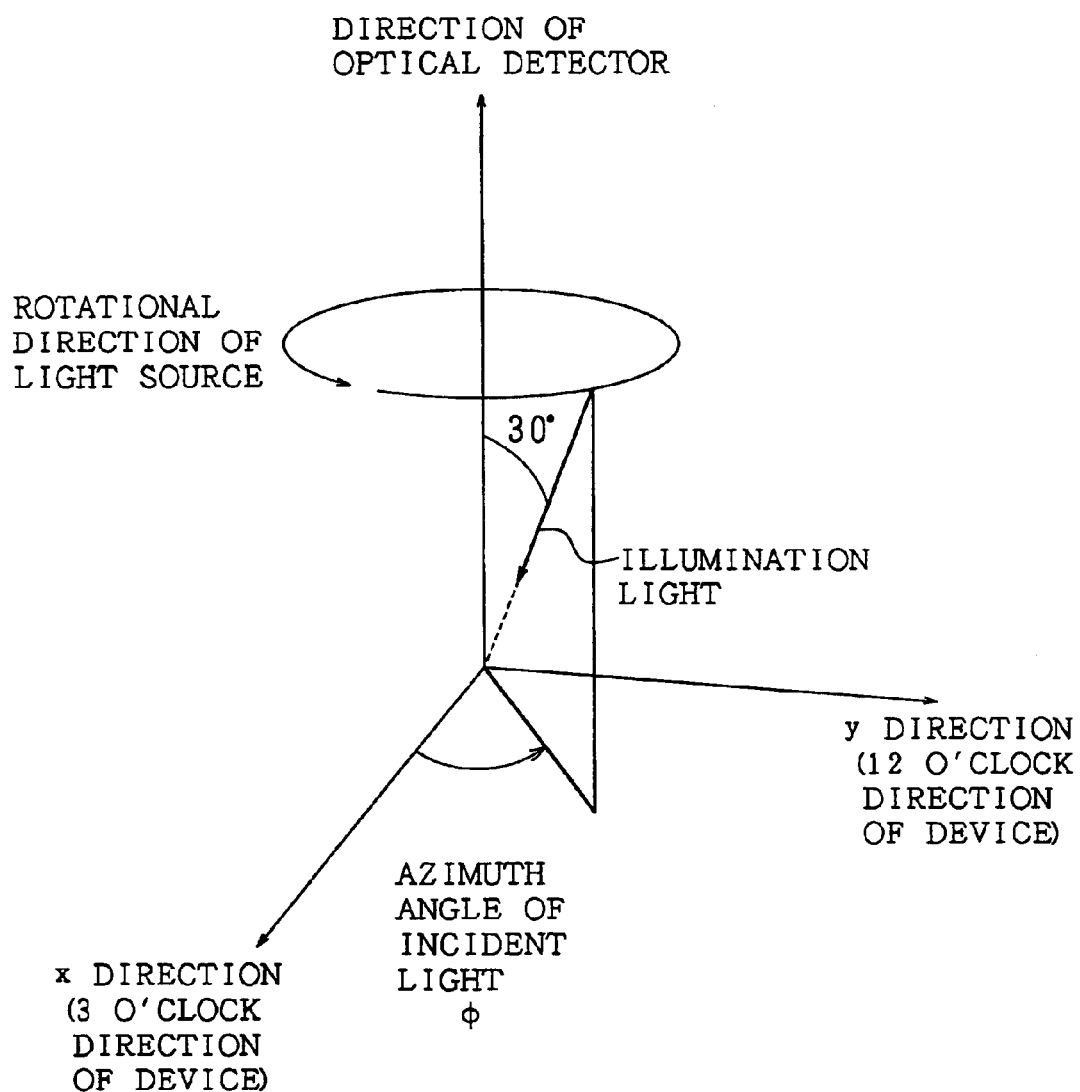
FIG. 19 is a conception drawing showing a direction in which the reflection property is measured on a reflective electrode (a light reflector plate) of Example 9 using an optical measuring system.

In the present example, a pattern was formed that satisfied the aforementioned conditions, as shown in the major-part-showing enlarged plan view constituting FIG. 18, wherein the convexities were not circular, but elliptical, and had properties that are dependent to directions. Reflection property was measured on a light reflector plate constituted only by a light reflective film having such concavities and convexities, using a measuring system shown in FIG. 19. To be more specific, as shown in FIG. 19, illumination light was directed to enter from a 30° oblique direction, and the intensity of reflected light was measured in the normal direction to the light reflector plate surface by rotating the light source to detect reflective anisotropy.

Figure 20:
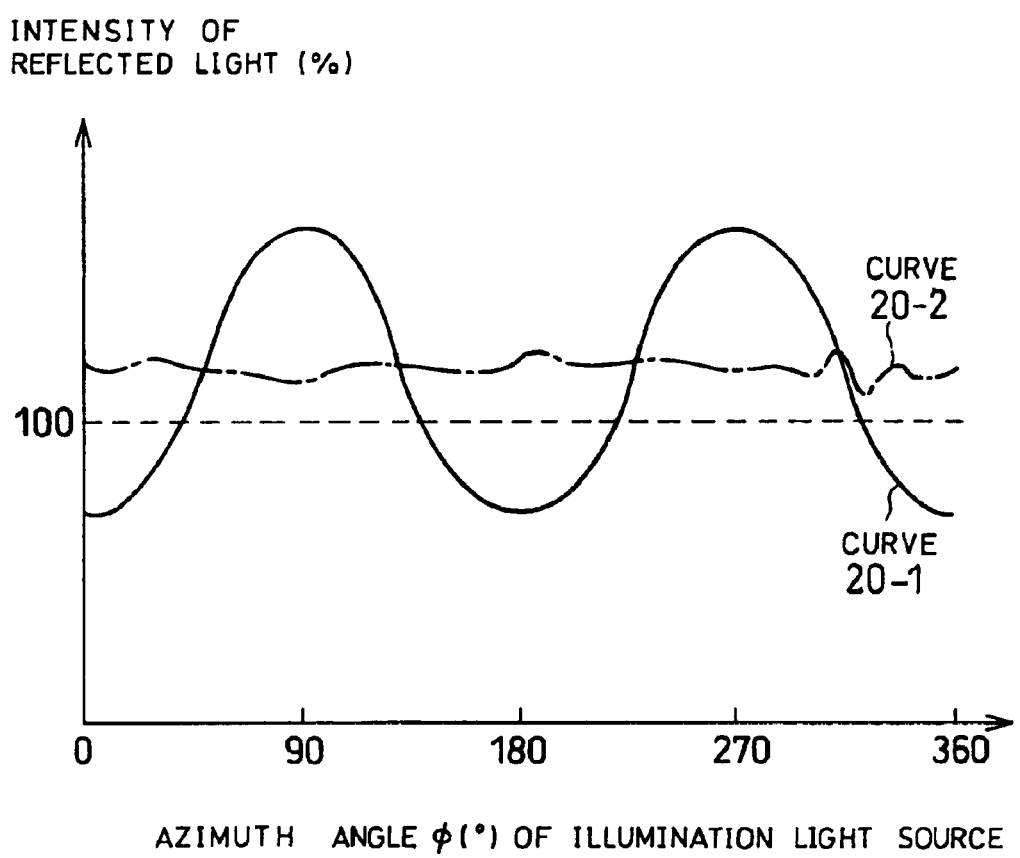
FIG. 20 is a drawing showing measurements of the reflection property on the reflective electrode (the light reflector plate) of Example 9 using the measuring system shown in FIG. 19.

The results, shown in FIG. 20, confirm that the light from a particular direction was efficiently guided toward the front of the liquid crystal display device. It should be noted, however, that considering that the refractive index of the liquid crystal material was greatly different from that of air, immersion oil (matching oil) having a refractive index of 1.516 was dropped on the light reflector plate surface and a transparent glass was attached thereonto for measurement. In addition, measured values were subjected to a conversion so that 100% would represent the value obtained when measurement was made in the same manner on a perfect reflecting diffuser (standard white board) made of MgO. In FIG. 20, the curve 20-1 represents measured and then converted values for the anisotropic diffuse reflector plate of the present example, and the curve 20-2 represents measured and then converted values for a diffuse reflector plate similar to that used in Example 8.

The results are shown in FIG. 20. With the curve 20-1 representing such a reflector plate of the present example that the concavities and convexities are formed at a mean cycle that varies according to the direction on the reflector plate surface, the reflective brightness (reflected light intensity) changes greatly with a change in the incident direction, $\phi$, of illumination light. In contrast, with the curve 20-2 representing such a reflector plate (Example 8) that the concavities and convexities are formed isotropically, the reflective brightness (reflected light intensity) does not change greatly with a change in the incident direction, $\phi$, of illumination light.

From these results, the inventors of the present invention have found that the direction dependent property (anisotropy), where the mean concavity and convexity cycle varies according to the direction on the reflector plate surface as can be seen with the reflector plate used in the present example, is useful means to increase reflective brightness. Further, in FIG. 20 the directions $\phi=90°$ and $270°$ in which the mean cycle of the concavities and convexities is short; it has been thus confirmed that illumination light from a direction in which the mean cycle is short has high reflective brightness.

Four kinds of samples were fabricated by forming alignment films 2 and 3 in the same manner as in Example 8 on a TFT element substrate 23 having a light reflector plate characterized by these features and on a color filter substrate 26 fabricated in the same manner as in Example 8, and then subjecting the substrates 23 and 26 to an alignment layer treatment (the twist angle 70°).

The samples differed from each other in the configuration of the polarizer plate 10, the optical retardation compensator plate 8, and the optical retardation compensator plate 9, as shown in FIGS. 21(a) to 21(d). Note in FIGS. 21(a) to 21(d) that, similarly to aforementioned FIG. 17, 11 refers to the transmission axis direction of the polarizer plate 10, 12 refers to the slow axis direction of the optical retardation compensator plate 9, 13 refers to the slow axis direction of the optical retardation compensator plate 8, 14 refers to the direction of the alignment of the liquid crystal molecules that are in contact with an alignment layer 2 formed on the color filter substrate 26, i.e., that are in a close proximity of the alignment layer 2, and 15 refers to the direction of the alignment of the liquid crystal molecules that are in contact with an alignment layer 3 formed on the TFT element substrate 23, i.e., that are in a close proximity of the alignment layer 3. These figures are viewed from the direction in which light enters the liquid crystal display device.

Figure 21:
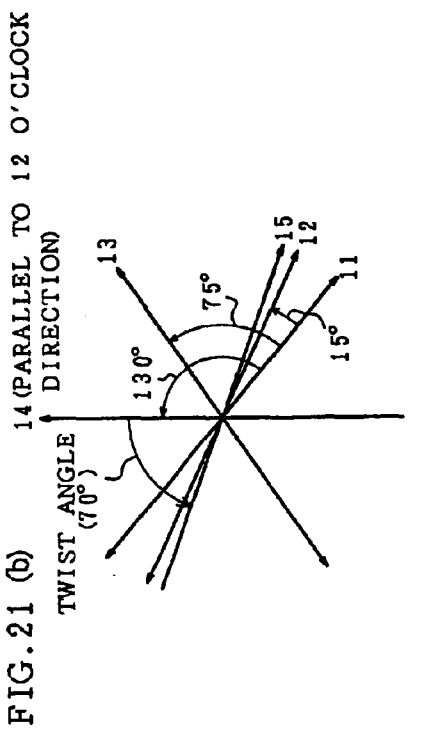
FIG. 21(a) through FIG. 21(d), referring to Samples #9a, #9b, and #9c, respectively, of the reflective liquid crystal display device of Example 9, are drawings showing a directional configuration of a polarizer plate, two optical retardation compensator plates, and the alignment of liquid crystal in a liquid crystal layer.
Figure 21:
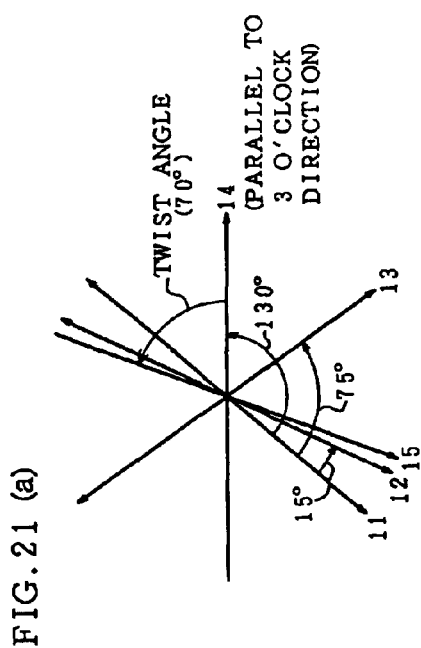
Figure 21:
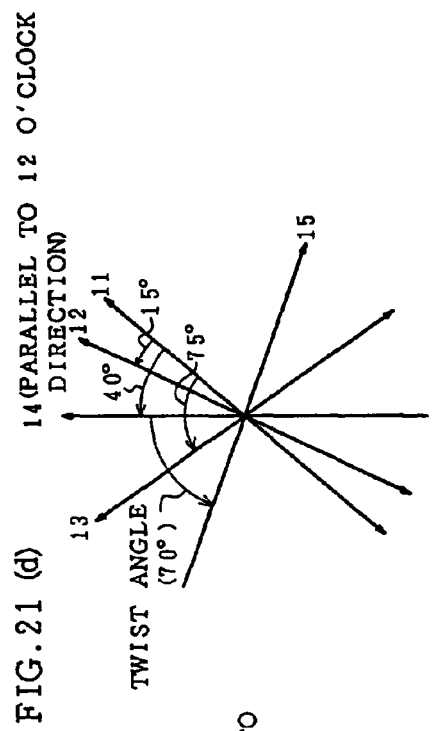
Figure 21:
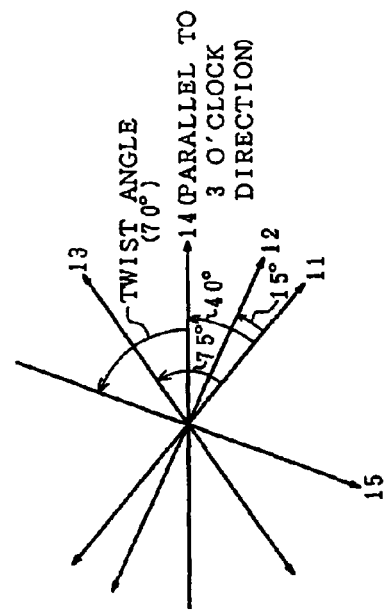

In other words, as to a sample shown in FIG. 21(a), the positional relationship stipulates that the angle, θ1, formed by the transmission axis direction 11 of the polarizer plate 10 and the slow axis direction 13 of the optical retardation compensator plate 8 was set to 75°, the angle, θ2, formed by the transmission axis direction 11 of the polarizer plate 10 and the slow axis direction 12 of the optical retardation compensator plate 9 was set to 15°, and the angle, θ3, formed by the alignment direction 14 of the liquid crystal molecules on the color filter substrate 26 and the transmission axis direction 11 of the polarizer plate 10 was set to 130°. This sample will be referred to as Sample #9a (the same as Example 8). Note that the alignment direction 14 of the liquid crystal molecules on the color filter substrate 26 was set parallel to the 3 o'clock direction.

Further, as to a sample shown in FIG. 21(b), the positional relationship stipulates that the angle, θ1, formed by the transmission axis direction 11 of the polarizer plate 10 and the slow axis direction 13 of the optical retardation compensator plate 8 was set to 75°, the angle, θ2, formed by the transmission axis direction 11 of the polarizer plate 10 and the slow axis direction 12 of the optical retardation compensator plate 9 was set to 15°, and the angle, θ3, formed by the alignment direction 14 of the liquid crystal molecules on the color filter substrate 26 and the transmission axis direction 11 of the polarizer plate 10 was set to 130°. This sample will be referred to as Sample #9b. Note that the alignment direction 14 of the liquid crystal molecules on the color filter substrate 26 was set parallel to the 12 o'clock direction.

Further, as to a sample shown in FIG. 21(c), the positional relationship stipulates that the angle, θ1, formed by the transmission axis direction 11 of the polarizer plate 10 and the slow axis direction 13 of the optical retardation compensator plate 8 was set to 75°, the angle, θ2, formed by the transmission axis direction 11 of the polarizer plate 10 and the slow axis direction 12 of the optical retardation compensator plate 9 was set to 15°, and the angle, θ3, formed by the alignment direction 14 of the liquid crystal molecules on the color filter substrate 26 and the transmission axis direction 11 of the polarizer plate 10 was set to 40°. This sample will be referred to as Sample #9c. Note that the alignment direction 14 of the liquid crystal molecules on the color filter substrate 26 was set parallel to the 3 o'clock direction.

Further, as to a sample shown in FIG. 21(d), the positional relationship stipulates that the angle, θ1, formed by the transmission axis direction 11 of the polarizer plate 10 and the slow axis direction 13 of the optical retardation compensator plate 8 was set to 75°, the angle, θ2, formed by the transmission axis direction 11 of the polarizer plate 10 and the slow axis direction 12 of the optical retardation compensator plate 9 was set to 15°, and the angle, θ3, formed by the alignment direction 14 of the liquid crystal molecules on the color filter substrate 26 and the transmission axis direction 11 of the polarizer plate 10 was set to 40°. This sample will be referred to as Sample #9d. Note that the alignment direction 14 of the liquid crystal molecules on the color filter substrate 26 was set parallel to the 12 o'clock direction.

Note that the samples were fabricated in the same manner as in aforementioned Example 8, except the process in which concave and convex patterns were fabricated on the light reflector plates.

Visual observation of these sample reflective liquid crystal display devices that included the light reflector plates having such concavities and convexities revealed that a display was realized with a higher brightness with Samples #9a to #9d than with foregoing Example 8 when viewed from the front direction, and also revealed that anisotropic concavities and convexities enhanced brightness. In such an event, reflective brightness was high when illumination light entered in the 12 o'clock direction or the 6 o'clock direction. Further, brightness was similarly high when the devices were illuminated from the front direction and viewed from the oblique 12 or 6 o'clock direction.

Further, the sample liquid crystal display devices were illuminated from the front direction with incident illumination light and viewed from various oblique angles that were 45° off the front direction; Samples #9a and #9d achieved a satisfactory display in the 6 and 12 o'clock directions that were oblique directions in which reflective brightness was high, and also achieved a satisfactory contrast in display in the same directions, whereas when viewed from an oblique viewing direction in which brightness was high, the samples did not seemingly show any particular inclination-induced changes in the display. In contrast, observation revealed that Samples #9b and #9c degraded the contrast ratios in display when viewed from the 6 or 12 o'clock direction in which brightness was high.

This shows that the viewing angle direction in which the liquid crystal display modulation layer (the liquid crystal layer 1) showed excellent visibility varied according to the three different values of θ3. In addition, Samples #9a and #9d, wherein the direction to give satisfactory visibility coincided with the direction in which the anisotropic concavities and convexities of the light reflector plate yielded high brightness, realized a high quality display featuring the high contrast ratio of the polarizer plate, the optical retardation compensator plate, and the liquid crystal modulation layer (the liquid crystal layer) in accordance with the present invention.

Note that the direction of the anisotropic concavities and convexities of the light reflector plate employed in the present example may be set differently according to principal ambient conditions in which the liquid crystal display device in accordance with the present invention is actually used; in such a case, needless to say, in order to obtain the same effects, the angles formed by the alignment of the liquid crystal, the polarizer plate, and the optical retardation compensator plate should be set so that the direction giving satisfactory oblique viewing angle properties coincides with the direction yielding high brightness.

EXAMPLE 10

Next, as Example 10, the following description will explain an example of a reflective liquid crystal display device incorporating a touch panel as information input means installed in a personal digital tool, which is a major application field of the reflective liquid crystal display device in accordance with the present invention.

Figure 22:
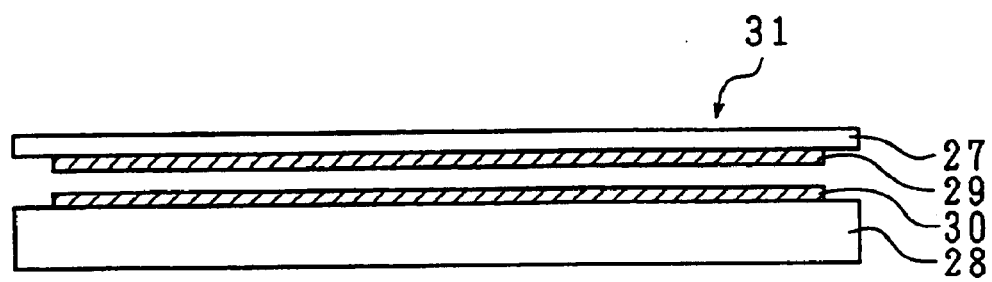
FIG. 22 is a cross-sectional view schematically showing a structure of a major part of a touch panel employed in a reflective liquid crystal display device incorporating a touch panel of Example 10.

First, a reference is made to FIG. 22 constituted by a cross-sectional view schematically showing a major part of an arrangement of a touch panel used in the present example. As shown in FIG. 22, the touch panel 31 was a planar pressure sensitive element including a supporting substrate 28 on which a transparent electrode 30 was formed for detecting a pressed position and a movable substrate 27 on which a transparent electrode 29 was formed for detecting a pressed position, the transparent electrodes 29 and 30 being disposed so as to oppositely face each other with an air gap sandwiched therebetween. Note that both the movable substrate 27 and the supporting substrate 28 used here had no birefringence.

Figure 23:
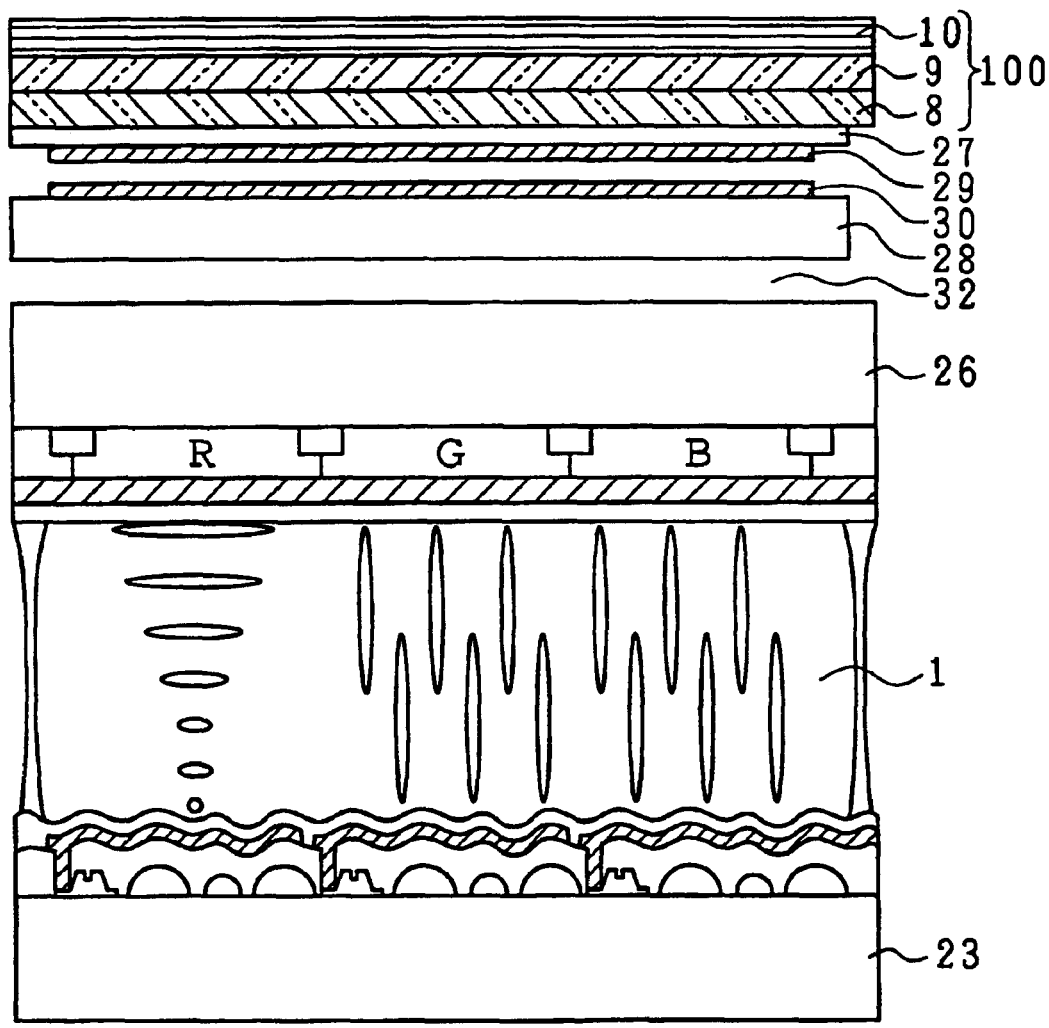
FIG. 23 is a cross-sectional view schematically showing a structure of a major part of the reflective liquid crystal display device incorporating a touch panel of Example 10.

A major part of the structure of the present example is schematically shown in a cross-sectional view constituting FIG. 23. As shown in FIG. 23, a reflective liquid crystal display device incorporating a touch panel of the present example included an optical retardation compensator plate 8, an optical retardation compensator plate 9, and a polarizer plate 10 being attached onto the movable substrate 27 of the touch panel 31, and all these were disposed on the display surface side of a liquid crystal drive cell having the same structure as the liquid crystal display device of aforementioned Example 8 except that no polarizer plate 10 and no optical retardation compensator plates 8 and 9 were attached.

In such an event, the alignment direction of the liquid crystal layer 1, the polarizer plate 10, and the optical retardation compensator plates 8 and 9 were configured in the same manner as in aforementioned FIG. 17 (Example 8), and further, the same arrangement was done except the touch panel. Note that an air gap 32 was provided so as to maintain the distance between the supporting substrate 28 of the touch panel and the color filter substrate 26 of the reflective liquid crystal display device and to thereby produce a pressure propagation prevention effect, the pressure on the touch panel being prevented from propagating to a color filter substrate 26, without using a pressure buffering member which otherwise would have added to the weight of the device.

Figure 24:
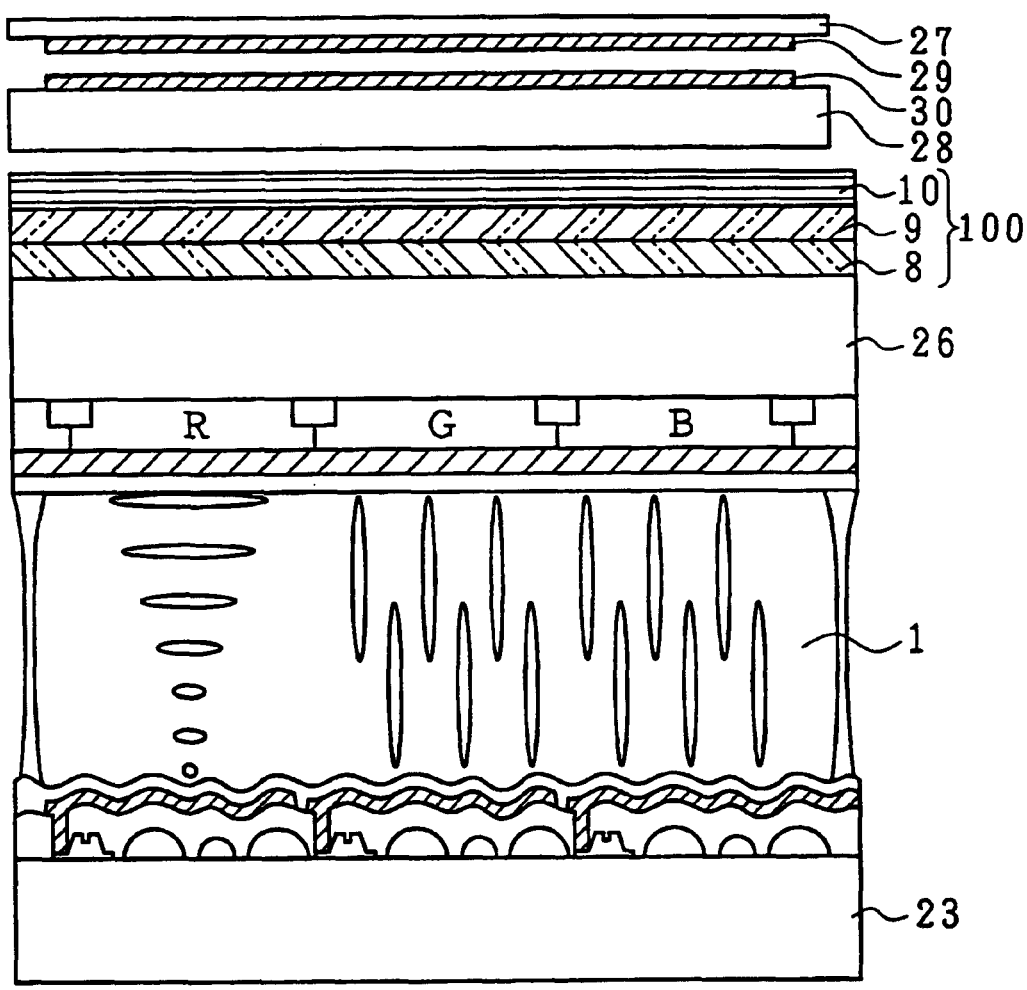
FIG. 24 is a cross-sectional view schematically showing a structure of a major part of the reflective liquid crystal display device incorporating a touch panel of a comparative example.

In addition, as a comparative example, a reflective liquid crystal display device incorporating a touch panel was fabricated including a structure whose major part is shown in a cross-sectional view constituting FIG. 24. In other words, the structure of the comparative example was equivalent to the touch panel 31 shown in FIG. 22 being disposed on the polarizer plate 10 of the liquid crystal display device having the structure of aforementioned Example 8. Therefore, the only difference between the present example and the comparative example was the relative position of the touch panel 31.

Next, comparison was made between the present example and the comparative example. First, as to the comparative example, the light component reflected at the touch panel was directly viewed, thereby greatly degrading visibility. That reflected light included the light reflected due to the gap sandwiched between the touch panel supporting substrate 28 and the polarizer plate 10 as well as the light reflected due to the gap sandwiched between the transparent electrodes 29 and 30.

In contrast, as to the present example, no reflected light component, such as that occurred with the comparative example, was observed; a very satisfactory display was observed similarly to the case where no touch panel is used (Example 8). Further as to the present example, unlike the comparative example, no light was observed to be reflected due to the gap sandwiched between the transparent electrodes 29 and 30.

Further, no reflection was observed either at the interface between the air gap 32 for preventing pressure propagation and the touch panel supporting substrate 28 nor at the interface between the touch panel supporting substrate 28 and the color filter substrate 26 of the liquid crystal display device. Therefore, according to Example 10, a reflective liquid crystal display device incorporating an input device (touch panel) was realized that was lightweight because of the lack of need for a pressure buffering member, and effectively utilized, for display, a circularly polarized state of light created by reflection preventive means of the input device.

In addition, a more convenient and lightweight arrangement was feasible, if, to mention briefly, the movable substrate 27 of the touch panel 31 was omitted, and the transparent electrode 29 was directly disposed on the liquid crystal layer side of the optical retardation compensator plate 8.

[Second Embodiment of the Invention]

Referring to drawings, the following description will explain another embodiment in accordance with the present invention. For convenience, members of the present embodiment that have the same function as members of the previous embodiment are indicated by the same reference numerals and description thereof is omitted.

So far, the description has discussed examples wherein as to the case when substantially high voltage is applied across the liquid crystal layer, the liquid crystal layer has no polarized light conversion function, and satisfactory property is obtained in such approximation. However, considering that the voltage applied across the liquid crystal has practical limitations, optimization in detail is more effective.

To be more specific, referring to aforementioned FIG. 1, a black display is achieved when the voltage applied across the liquid crystal is at its maximum value; the liquid crystal here does not entirely align in the substrate normal direction, and a consideration should be given to the component parallel to the substrates 4 and 5 remaining in the alignment of the liquid crystal. Conditions for a dark display with this taken into consideration are, similarly to cases above, that in a state where a practically maximum voltage is applied across the liquid crystal, the incident light entering the polarizer plate 10 be circularly polarized after passing both the optical retardation compensator plates 8 and 9 and the liquid crystal layer 1.

In this state, since a practically maximum voltage is applied across the liquid crystal 1, the liquid crystal display device is in a state where no polarized light conversion function is produced. However, there remains a little polarized light conversion function (hereinafter, will be referred to as a residual phase difference) in accordance with the component of the alignment of the liquid crystal that is parallel to the substrate. By slightly modifying the previous conditions for the optical retardation compensator plates 8 and 9 to conform to this, a satisfactory dark display is achieved at practically maximum voltage.

In contrast, conditions to realize a satisfactory bright display using the optical retardation compensator plates 8 and 9 and the alignment of the liquid crystal layer 1 that are optimized so as to achieve a satisfactory dark display in the above manner are similarly that the polarization state on the surface of the reflector plate 3 be linearly polarized. However, design parameters for the liquid crystal layer 1 to satisfy those conditions are still decided on the same assumption that such a sufficiently high voltage can be applied that the residual birefringence of the liquid crystal becomes ignorable.

In other words, in a case where the optical retardation compensator plates 8 and 9 are used that are slightly modified in accordance with the residual phase difference of the liquid crystal, the specifications for the liquid crystal layer 1 do not greatly differ from those before the modification, and are predicable from the previous specifications.

Figure 25:
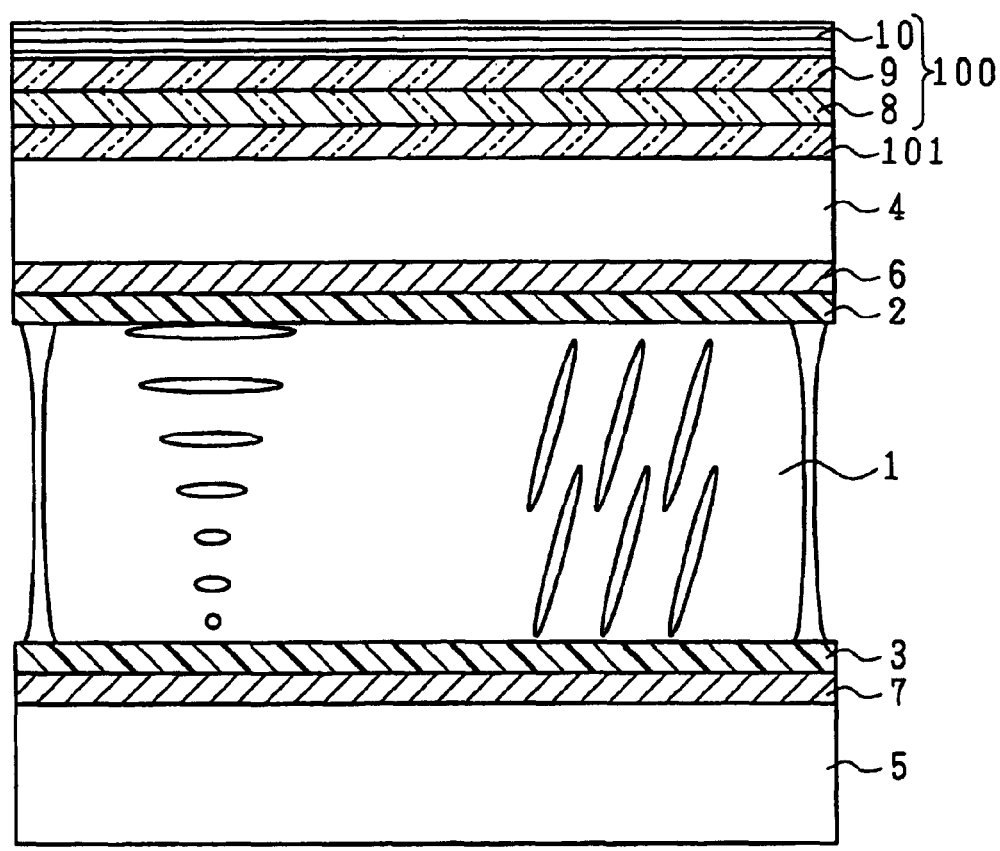
FIG. 25 is a cross-sectional view schematically showing a structure of a major part of the reflective liquid crystal display device of another embodiment in accordance with the present invention.
Figure 26:
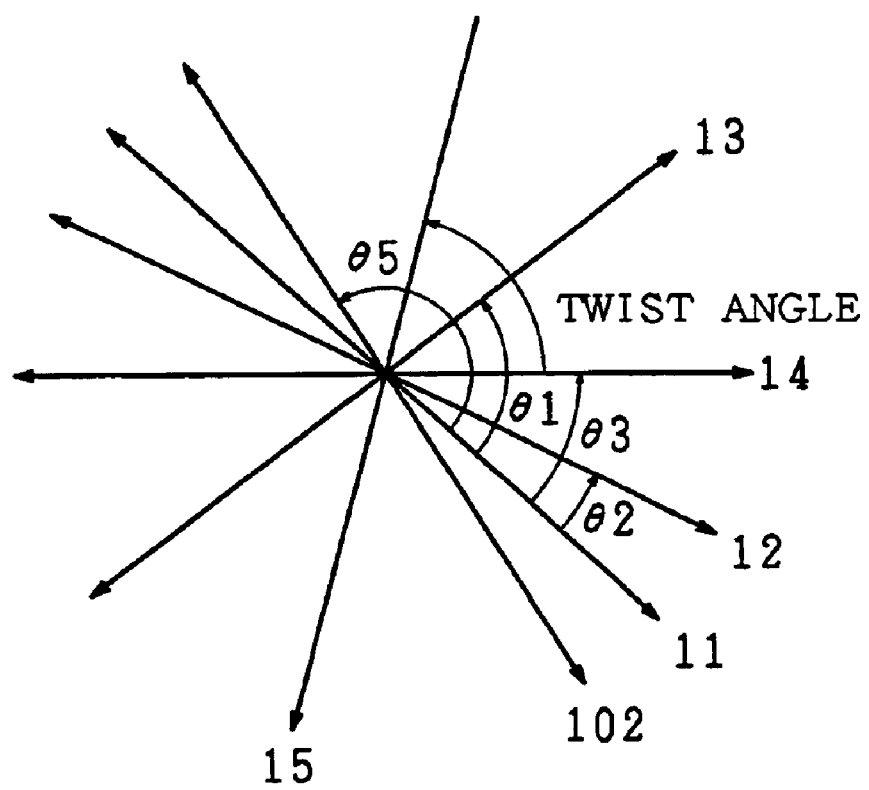
FIG. 26 is a drawing showing a directional configuration of a polarizer plate and two optical retardation compensator plates of another embodiment.

FIG. 25 shows schematically an arrangement of a reflective liquid crystal display device of the present example. As shown in FIG. 25, the reflective liquid crystal display device, including the arrangement of the reflective liquid crystal display device of aforementioned Embodiment 1, is arranged to have a third optical retardation compensator plate 101 between the substrate 4 and the optical retardation compensator plate 8 of the circular polarizer plate 100 to cancel the residual phase difference of the liquid crystal layer 1. FIG. 26 shows a configuration example of the three optical retardation compensator plates 8, 9, and 101 in the reflective liquid crystal display device.

As to the direction of the slow axis of the residual phase difference of the liquid crystal layer 1, if the twist angle of the liquid crystal layer 1 is set to about 70°, which is approximately the middle value of the setting range for the twist angle in accordance with the present invention, there remains a birefringence component of the slow axis which is parallel to the alignment direction of the liquid crystal between the centers of the substrates 4 and 5 of the liquid crystal layer 1. To cancel this, an optical retardation compensator plate having a slow axis in a direction perpendicular to the alignment of the liquid crystal is appropriately disposed as the third optical retardation compensator plate 101. Although depending on the maximum voltage applied across the liquid crystal, the residual phase difference of the liquid crystal layer 1 can be cancelled if the magnitude of retardation is set to approximately 10 to 50 nm.

Next, the following description further discusses a method of achieving a satisfactory display by improving the viewing angle characteristic with the reflective liquid crystal display device shown in FIG. 25.

In the reflective liquid crystal display device shown in FIG. 25, a satisfactory dark display is achieved at a maximum value of an actual driving voltage; according to a method whereby a satisfactory display is obtained in this manner, in a state where a sufficient voltage is applied across the liquid crystal layer 1, the cancellation of the residual birefringence of the liquid crystal is effective.

Therefore, the viewing angle becomes expandable by expanding such a viewing angle range that the residual birefringence of the liquid crystal layer 1 can be satisfactorily cancel. In order to achieve this, the use of an optical retardation compensator plate is effective with the three-dimensional configuration of the alignment of liquid crystal being taken into consideration.

Figure 27:
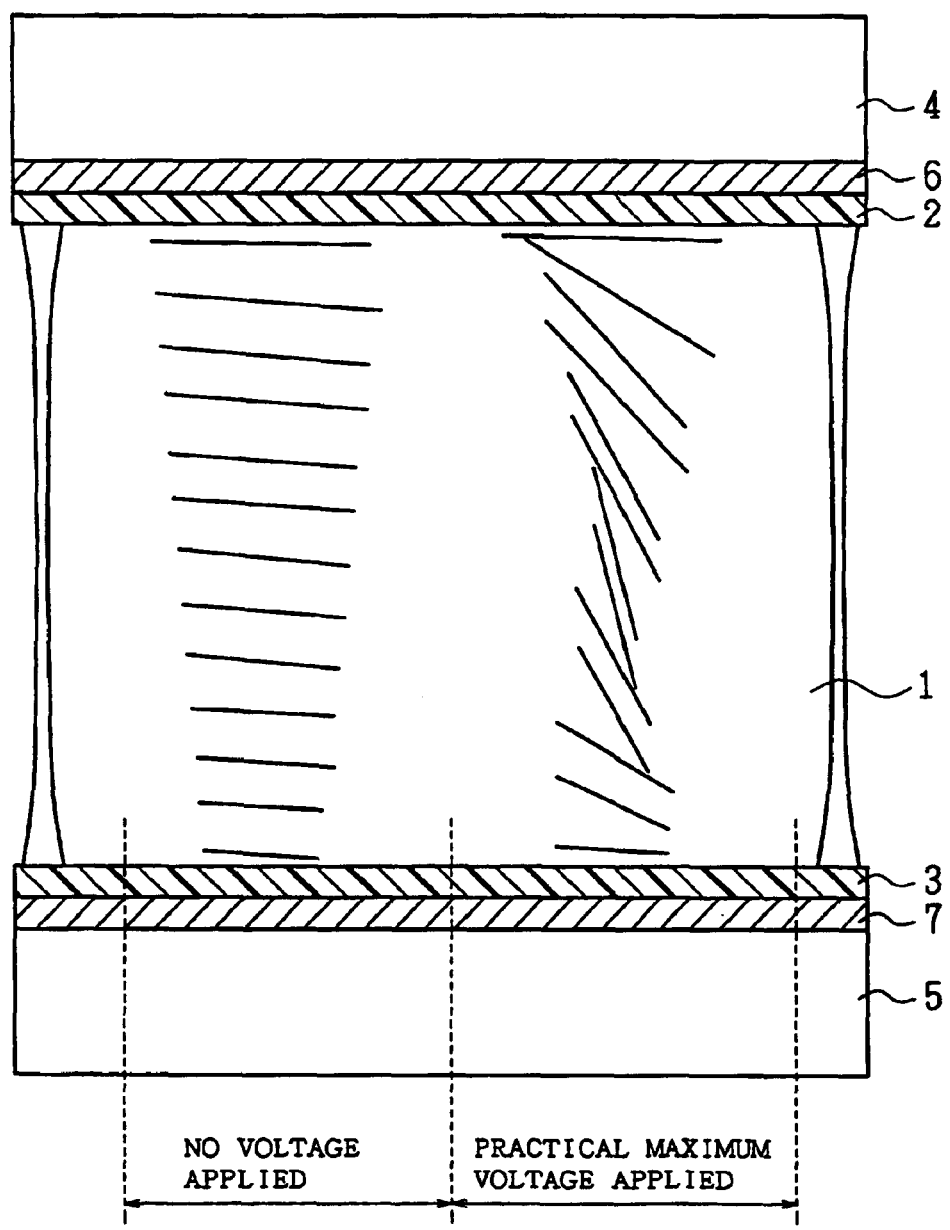
FIG. 27 is an explanatory drawing showing voltage inducing different states of the alignment of a liquid crystal layer of a reflective liquid crystal display device.

FIG. 27 shows schematically a three-dimensional alignment in an actual driven state of the liquid crystal layer 1. Note that FIG. 27 shows the alignment of the liquid crystal of the reflective liquid crystal display device shown in FIG. 25 more faithfully to the actual alignment. In such a state, the residual birefringence of the light passing through the liquid crystal layer 1 in the normal direction of the display surface can be cancel by a uniaxial optical retardation compensator plate having the slow axis direction thereof on an ordinary plane; however, as to the light obliquely passing through the liquid crystal layer 1, the use of an optical retardation compensator plate is effective with the inclination of the alignment of the liquid crystal layer 1 being further taken into consideration.

First, since the liquid crystal aligns approximately perpendicular to the substrates 4 and 5, the refractive index of the liquid crystal layer 1 has a large component with respect to the electric field that is in the substrate normal direction. In order to cancel this, an optical retardation compensator plate having a smaller refractive index with respect to the electric field that is in the layer thickness direction of the third optical retardation compensator plate 101 is effective; this is achieved by employing an optical retardation compensator plate that is optically uniaxial and has a smaller refractive index with respect to the electric field that is in a film thickness direction than with respect to the electric field that is in a film surface direction as the optical retardation compensator plate 101. Further, the optical retardation compensator plate 101 may be an optically biaxial index ellipsoid with the purpose of canceling the residual phase difference of the aforementioned liquid crystal layer in a direction on a layer surface.

In addition, more strictly, it is effective to take into account that the alignment of the liquid crystal is not completely perpendicular to the substrates 4 and 5. Especially when a diffuse reflector film or a reflective film are configured obliquely to the display surface of the reflective liquid crystal display device, or more generally when such a reflecting surface is used that has a function to reflect light in a direction other than the specular reflection direction of the display surface, it is effective in achieving a satisfactory viewing angle characteristic to cancel the residual birefringence of the liquid crystal with respect to the optical path that extends from the transmission through the liquid crystal layer 1 to the arrival to the light reflective film 7 and also with respect to the outgoing optical path that extends from the light reflective film 7 to the transmission through the liquid crystal layer 1.

Figure 28:
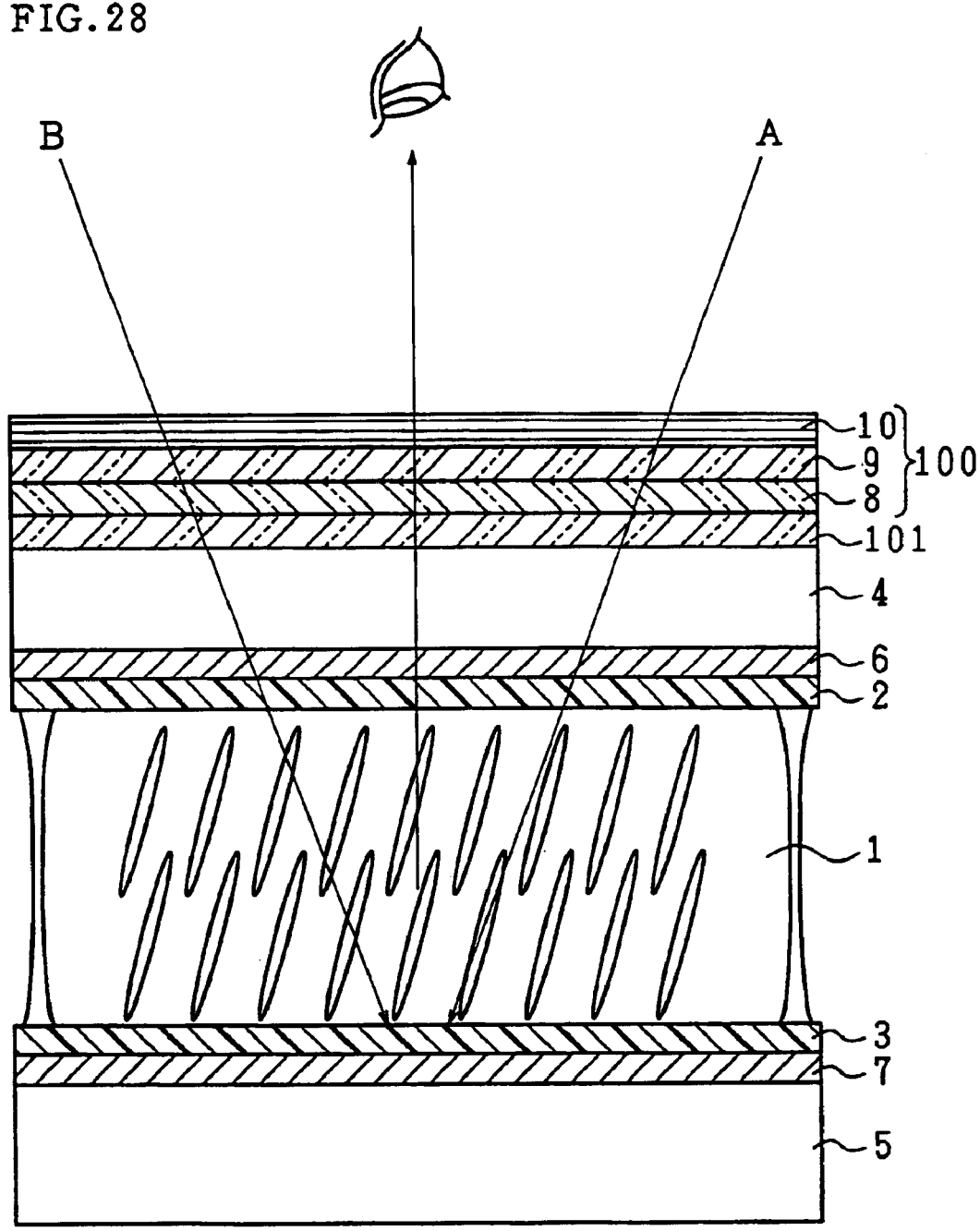
FIG. 28 is an explanatory drawing showing changes in the viewing angle characteristic with a relationship between the direction of illumination and that of the alignment of a liquid crystal layer of a reflective liquid crystal display device.

Referring to FIG. 28, a more detailed explanation will be given. As illustrated in FIG. 28, changes in illumination-associated environment brought onto the viewer who is in the front direction of the reflective liquid crystal display device as a result of the switching of illumination from ambient illumination light A to illumination light which is principally composed of illumination light B will be examined.

In such an event, while the viewer and the liquid crystal display device are fixed in position, the brightness and hue in a dark display alter with a change in the ambient illumination light. This is because the residual birefringence of the liquid crystal is cancel to a variable degree according to the direction of the optical path in the liquid crystal layer 1 through which light passes; a more satisfactory display can be achieved by preventing this from happening.

EXAMPLE 11

As Example 11, two Samples #11a and #11b were obtained by fabricating reflective liquid crystal display devices incorporating the arrangement shown in aforementioned FIG. 25 in accordance with the parameters listed in Table 6.

TABLE 6

| Sample Parameter | #11a | #11b |
| --- | --- | --- |
| $\Delta nd$ (nm) | 260 | 260 |
| $\theta 3$ (°) | 40 | 40 |
| Twist Angle (°) | 70 | 60 |
| Angle, $\theta 1$, of Optical Retardation Compensator Plate 8 (°) | 75 | 75 |
| Retardation Caused by Optical Retardation Compensator Plate 8 | 135 nm | 135 nm |
| Angle, $\theta 2$, of Optical Retardation Compensator Plate 9 (°) | 15 | 15 |
| Retardation Caused by Optical Retardation Compensator Plate 9 | 270 nm | 270 nm |
| $\theta 5$ (°) | 165 | 165 |
| Retardation Caused by Optical Retardation Compensator Plate 101 | 30 nm | 30 nm |

Figure 29:
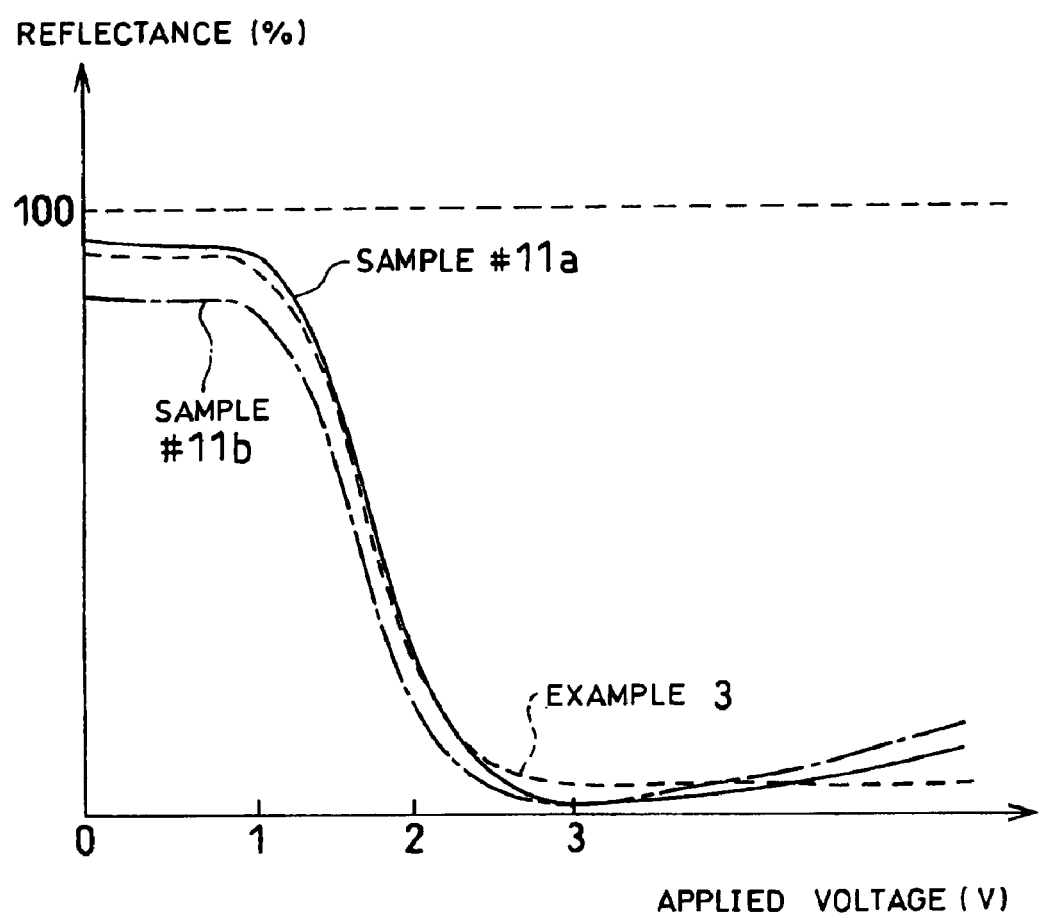
FIG. 29 is a drawing showing, in terms of measurements, a voltage dependency of reflectance of a reflective liquid crystal display device of Example 11.

FIG. 29 shows voltage versus reflectance curves for Samples #11a and #11b. For comparison, FIG. 29 also shows a voltage versus reflectance curve for the reflective liquid crystal display device of Example 3.

It is understood from this that as to Sample #11a of the present example, the reflectance slightly decreased in a bright display, but a satisfactory dark display was achieved and also that as to Sample #11b, the brightness did not decrease and a satisfactory dark display was achieved.

Here, a further research was made to replace the two optical retardation compensator plates 101 and 8 with only one optical retardation compensator plate that offered the same function as the two plates, which would eventually enable the fabrication of liquid crystal display devices having the same function as these arrangement examples at lower costs through reducing the number of optical retardation compensator plates used.

In such an event, the inventors exploited the fact that two optical retardation compensator plates can be substituted for a single optical retardation compensator plate that has a retardation equivalent to the sum of the retardations of the two optical retardation compensator plates if the two optical retardation compensator plates are stacked so that their slow axes are parallel to each other, and can be substituted for a single optical retardation compensator plate that has a retardation equal to the difference between the retardations of the two optical retardation compensator plates if the optical retardation compensator plates are stacked so that their slow axes are perpendicular to each other.

In other words, since the optical retardation compensator plate 8 and the optical retardation compensator plate 101 in Sample #11b of the present example were configured so as to be stacked in a close proximity and also so that the slow axis directions were perpendicular to each other, a single optical retardation compensator plate having a retardation equal to the retardation of the two plates could replace the two plates. In other words, by changing the retardation of the optical retardation compensator plate 8, the same effects resulted as Samples #11a and #11b, etc.

To confirm these effects, Samples #11c and #11d were additionally fabricated. Samples #11c and #11d each had the cross-sectional structure as that shown in FIG. 1 mentioned in aforementioned Embodiment 1. Table 7 shows the configuration of the optical retardation compensator plates 8 and 9 in Samples #11c and #11d.

TABLE 7

| Sample Parameter | #11c | #11d |
|---|---|---|
| Δnd (nm) | 260 | 260 |
| θ3 (°) | 45 | 135 |
| Twist Angle (°) | 60 | 60 |
| θ3 (°) | 75 | 75 |
| Retardation Caused by Optical Retardation Compensator Plate 8 | 105 | 165 |
| θ2 | 15 | 15 |
| Retardation Caused by Optical Retardation Compensator Plate 9 | 270 nm | 270 nm |

The voltage versus reflectance curves of Samples #11c and #11d are similar to that of Sample #11b shown in FIG. 29.

This shows that a more satisfactory property can achieved by additionally including a third optical retardation compensator plate and thereby cancelling the residual phase difference of liquid crystal across which a practically maximum voltage is being applied. Further, it is confirmed that when two optical retardation compensator plates are in use, similar effects can be achieved by adjusting retardation. In other words, it is confirmed that a more satisfactory black display can be achieved by the addition and adjustment of an optical retardation compensator plate with actual driving being taken into account.

EXAMPLE 12

In Example 12, an optically uniaxial optical retardation compensator plate having an inclined optical axis was used as the third optical retardation compensator plate 101 so as to cancel the residual birefringence of the liquid crystal layer 1 in more directions. The resultant reflective liquid crystal display device including the arrangement shown in FIG. 30 was designated as Sample #12a. In addition, a biaxial optical retardation compensator plate was used as the third optical retardation compensator plate 101 to obtain a reflective liquid crystal display device having the arrangement shown in FIG. 31, which was designated as Sample #12b.

In this example, the index ellipsoid of the optical retardation compensator plate 101 was not inclined to the substrate.

Here, a concave and convex reflector plate made of metal (not shown) was used as the light reflective film 7 similarly to the reflective liquid crystal display device shown in FIG. 16 so as to provide a light diffusion property.

In addition, as Sample #12c, a reflective liquid crystal display device were fabricated having the same arrangement as Samples #12a and #12b, except that a positively uniaxial optical retardation compensator plate was used as the optical retardation compensator plate 101.

Table 8 shows the configurations of optical elements of Samples #12a to #12c.

TABLE 8

| Sample Parameter | #12a | #12b | #12c |
|---|---|---|---|
| Δnd (nm) | 260 | 260 | 260 |
| θ3 (°) | 45 | 45 | 45 |
| Twist Angle (°) | 60 | 60 | 60 |
| θ1 (°) | 75 | 75 | 75 |
| Retardation Caused by Optical Retardation Compensator Plate 8 | 135 nm | 135 nm | 135 nm |
| Angle, θ2, of Optical Retardation Compensator Plate 9 (°) | 15 | 15 | 15 |
| Retardation Caused by Optical Retardation Compensator Plate 9 | 270 nm | 270 nm | 270 nm |
| Type of Optical Retardation Compensator Plate 101 | Inclined, negative, uniaxial | Biaxial | Negative, uniaxial |
| Angle, θ5, of Optical Retardation Compensator Plate 101 (°) | 165* | 165* | 165* |
| Retardation Caused by Optical Retardation Compensator Plate 101 | 30 nm* | 30 nm* | 30 nm* |

*The directions of the optical retardation compensator plates 101 of Samples #12a and #12b represent attachment directions in the x-direction of the optical retardation compensator plate, while the retardation of the optical retardation compensator 101 represents the value with respect to light propagating in the substrate normal direction with the x-direction being as the slow axis direction.

In addition, Table 9 shows results of the evaluation on Samples #12a to #12c regarding viewing angles characteristics.

TABLE 9

| Sample Parameter | #12a | #12b | #12c |
|---|---|---|---|
| Bright Display Viewed from Front | White Display | White Display | White Display |
| Dark Display Viewed from Front | No Coloring Caused by Change in Illumination Direction. No Increase in | Coloring Observed Depending on Illumination Direction. No Increase in | Coloring Observed Depending on Illumination Direction. Increase in |

TABLE 9-continued

| Sample Parameter | #12a | #12b | #12c |
|---|---|---|---|
| | Reflectance in Black Display | Reflectance in Black Display | Reflectance in Black Display |
| Bright Display Viewed from Oblique Angle | White Display | White Display | White Display |
| Dark Display Viewed from Oblique Angle | Black Display with no Coloring for Every Direction | Black Display with Coloring depending on Inclination Direction | Black Display with Coloring depending on Inclination Direction, Increasingly Bright with Greater Inclination |

The optical retardation compensator plate 101 used in Sample #12a was fabricated through working on stretching process so that the index ellipsoid was inclined, and that the resultant light passing in the front direction showed retardation of approximately 30 nm.

Figure 30:
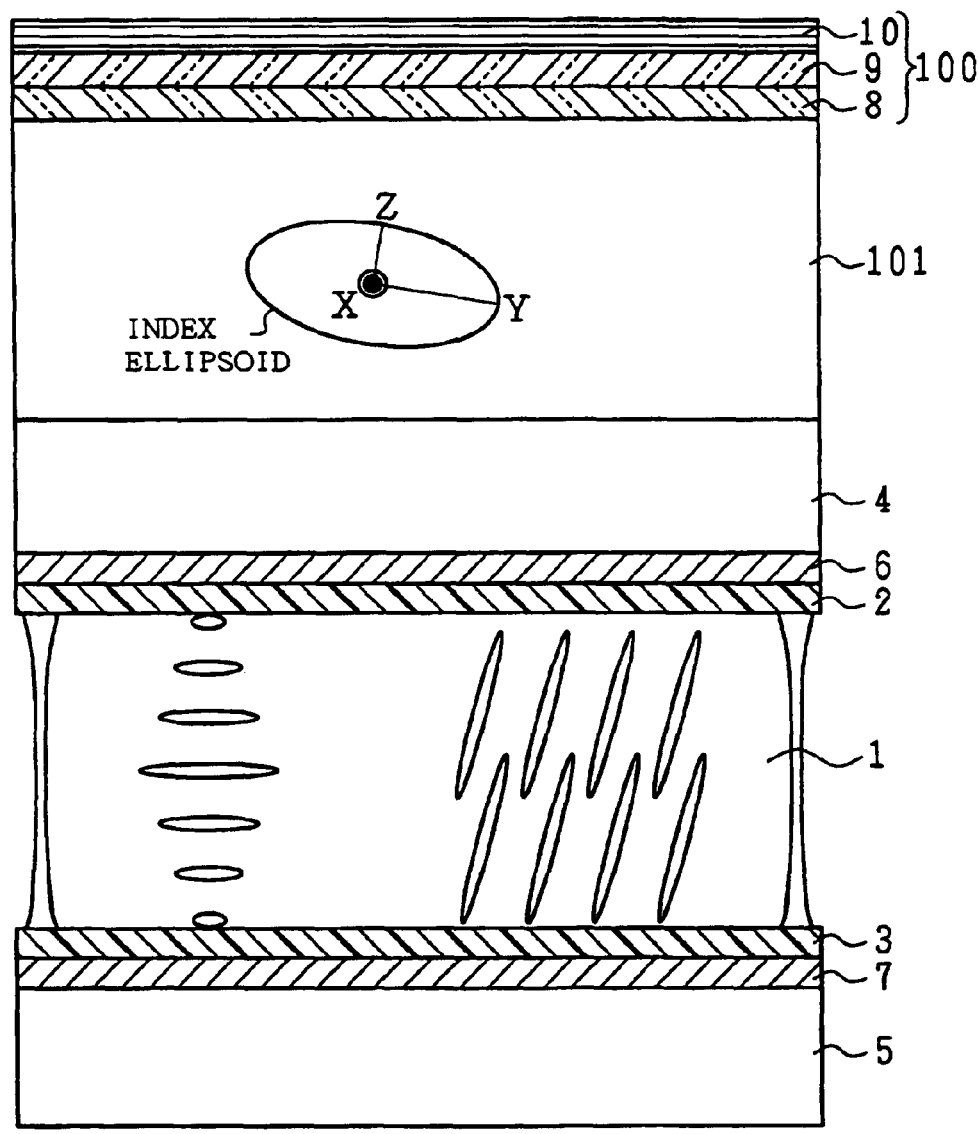
FIG. 30 is a cross-sectional view showing a structure of a major part of Sample #12a of Example 12.

As shown in FIG. 30, the film showed a negative uniaxiality that only the refractive index for the z-component of the electric field was smaller than the refractive indices for the other, i.e., x- and y-, components, and the z-direction was inclined from the normal direction of the optical retardation compensator plate 101 of a planar film. The optical retardation compensator plate 101 was configured so that the z-direction was similar to the direction of the alignment of the liquid crystal at a practically maximum voltage, and the x-direction functioned as the slow axis to the light travelling in the front direction of the optical retardation compensator plate 101.

The optical retardation compensator plate 101 satisfied $$(n_y-n_z)d_{101}=(n_x-n_z)d_{101}=300 \text{ nm},$$

where $d_{101}$ represents the thickness of the optical function layer, and $n_x$, $n_y$, $n_z$, represent the respective refractive indices in the x-, y-, and z-directions shown in FIG. 30.

Further, needless to say, polymer film for fixing nematic liquid crystalline alignment or discotic liquid crystalline alignment may be used to precisely cancel the three-dimensional alignment of the liquid crystal layer 1.

The optical retardation compensator plate 101 used in Sample #12b was fabricated through working on stretching process so that the index ellipsoid was biaxial, and the resultant retardation with respect to the optical axis for transmission in the front direction was approximately 30 nm.

Figure 31:
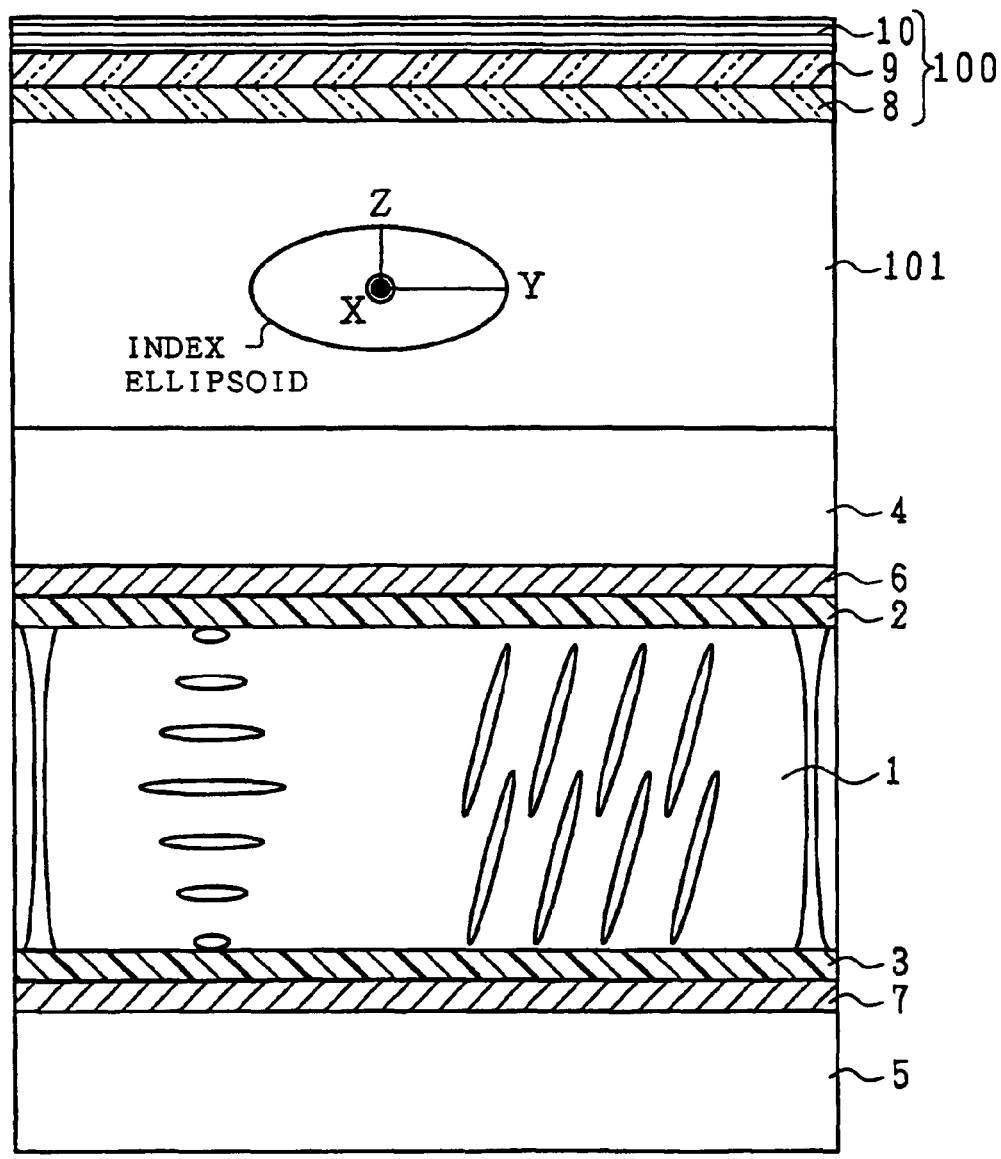
FIG. 31 is a cross-sectional view showing a structure of a major part of Sample #12b of Example 12.

As shown in FIG. 31, the refractive indices of the film, with respect to the components of an electric field, were the x-component, the y-component, and the z-component in descending order of magnitude. In addition, $(n_x-n_y)d_{101}=30$ nm, and $(n_y-n_z)d_{101}=300$ nm.

As shown in Table 9, each bright display was a white display; however, the most satisfactory dark display was achieved with Sample #12a, followed by Sample #12b, then by Sample #12c. In addition, an overall evaluation ranked Samples #12a, #12b, and #12c in this order from the most satisfactory to less satisfactory. This is because in a white display the properties varied, but created no visual changes. In contrast, in a black display, large visual changes were created, affecting the overall evaluation.

As mentioned above, it has been confirmed that a liquid crystal display device can be achieved with a satisfactory viewing angle characteristic through working on the optical retardation compensator plate with the three-dimensional alignment of the liquid crystal taken into consideration. It has been also confirmed that a more satisfactory dark state can be achieved by rendering the optical retardation compensator plates 8 and 9 biaxial.

Note, needless to say, in the present example that a retardation compensator film may be used that double-functions as the optical retardation compensator plate 8 and the optical retardation compensator plate 101 to reduce costs similarly to Example 11.

INDUSTRIAL APPLICABILITY

As detailed so far, with the reflective liquid crystal display device in accordance with the present invention, the reflecting surface of a light reflector plate, such as a light reflective film, can be disposed on the liquid crystal layer side, and a satisfactory dark state can be obtained. Consequently, reflective liquid crystal display devices are obtainable that are free from parallax and displays high contrast, high resolution images, as well as moving pictures.

In addition, by adopting a color filter geared for high brightness in the reflective liquid crystal display device in accordance with the present invention, a high quality, reflective-type color liquid crystal display device is obtainable with a satisfactory color reproduction capability.

In addition, with the reflective liquid crystal display device incorporating a touch panel in accordance with the present invention, when a touch panel is attached to the reflective liquid crystal display device in accordance with the present invention, by employing a touch panel constituted by a polarizer plate and two optical retardation compensator plates, a high quality, reflective liquid crystal display device incorporating a touch panel is obtainable with a capability to prevent reflected light from adversely affecting display properties.

As detailed so far, with the reflective liquid crystal display device in accordance with the present invention, the reflecting surface of a light reflector plate, such as a light reflective film, can be disposed on the liquid crystal layer side, and a satisfactory dark state can be obtained. Consequently, reflective liquid crystal display devices are obtainable that is free from parallax and displays high contrast, high resolution images, as well as moving pictures.

What is claimed is:

1. A liquid crystal display device, comprising:
   a first substrate having a light reflectibility;
   a second substrate having a light transmissibility;
   a liquid crystal layer sandwiched between the first substrate and the second substrate, the liquid crystal layer being composed of twist-aligned nematic liquid crystal having,
      a dielectric anisotropy,
      a twist angle in a range of about 0° to 10°, and
      a birefringence difference, which for twist angle in the range of about 0° to 5° if multiplied by a thickness of the liquid crystal layer produces a product in the range of not less than about 90 nm and not more than about 188 nm, or not less than about 382 nm and not more than about 451 nm, and which for twist angle in the range of about 5° to 10° if multiplied by a thickness of the liquid crystal layer produces a product in the range of not less than about 90 nm and not more than about 188 nm, or not less than about 380 nm and not more than about 451 nm; and
   a circular polarizing unit that selectively passes either right handed or left handed substantially circularly polarized light out of a plurality of wavelengths of natural light in the visible spectrum, wherein, the circular polarizing unit is disposed such that a major surface of the circular polarizing unit is on a liquid crystal layer side, the substantially circularly polarized light exiting the circular polarizing unit through the major surface when natural light enters the circular polarizing unit, and wherein, said incoming substantially circularly polarized light being linearly polarized at a surface of said first substrate in a plurality of directions respectively representative of said plurality of wave lengths of said natural light to thereby create a display.

2. A liquid crystal display device, comprising:

a first substrate having a light reflectibility;

a second substrate having a light transmissibility;

a liquid crystal layer sandwiched between the first substrate and the second substrate, the liquid crystal layer being composed of twist-aligned nematic liquid crystal having,
  a dielectric anisotropy,
  a twist angle in a range of about 10° to 20°, and
  a birefringence difference, which for a twist angle in a range of about 10° to 15° if multiplied by a thickness of the liquid crystal layer produces a product in the range of not less than about 90 nm and not more than about 190 nm, or not less than about 378 nm and not more than about 450 nm, and which for a twist angle in a range of about 15° to 20° if multiplied by a thickness of the liquid crystal layer produces a product in the range of not less than about 90 nm and not more than about 192 nm, or not less than about 372 nm and not more than about 448 nm; and a circular polarizing unit that selectively passes either right handed or left handed substantially circularly polarized light out of a plurality of wavelengths of natural light in the visible spectrum, wherein, the circular polarizing unit is disposed such that a major surface of the circular polarizing unit is on a liquid crystal layer side, the substantially circularly polarized light exiting the circular polarizing unit through the major surface when natural light enters the circular polarizing unit, and wherein, said incoming substantially circularly polarized light being linearly polarized at a surface of said first substrate in a plurality of directions respectively representative of said plurality of wave lengths of said natural light to thereby create a display.

3. A liquid crystal display device, comprising:

a first substrate having a light reflectibility;

a second substrate having a light transmissibility;

a liquid crystal layer sandwiched between the first substrate and the second substrate, the liquid crystal layer being composed of twist-aligned nematic liquid crystal having,
  a dielectric anisotropy,
  a twist angle in a range of about 20° to 30°, and
  a birefringence difference, which for a twist angle in a range of about 20° to 25° if multiplied by a thickness of the liquid crystal layer produces a product in the range of not less than about 92 nm and not more than about 195 nm, or not less than about 365 nm and not more than about 448 nm, and which for a twist angle in a range of about 25° to 30° if multiplied by a thickness of the liquid crystal layer produces a product in the range of not less than about 95 nm and not more than about 202 nm, or not less than about 356 nm and not more than about 445 nm; and a circular polarizing unit that selectively passes either right handed or left handed substantially circularly polarized light out of a plurality of wavelengths of natural light in the visible spectrum, wherein, the circular polarizing unit is disposed such that a major surface of the circular polarizing unit is on a liquid crystal layer side, the substantially circularly polarized light exiting the circular polarizing unit through the major surface when natural light enters the circular polarizing unit, and wherein, said incoming substantially circularly polarized light being linearly polarized at a surface of said first substrate in a plurality of directions respectively representative of said plurality of wave lengths of said natural light to thereby create a display.

4. A liquid crystal display device, comprising:

a first substrate having a light reflectibility;

a second substrate having a light transmissibility;

a liquid crystal layer sandwiched between the first substrate and the second substrate, the liquid crystal layer being composed of twist-aligned nematic liquid crystal having,
  a dielectric anisotropy,
  a twist angle in a range of about 30° to 45°, and
  a birefringence difference, which for a twist angle in a range of about 30° to 35° if multiplied by a thickness of the liquid crystal layer produces a product in the range of not less than about 98 nm and not more than about 210 nm, or not less than about 341 nm and not more than about 441 nm, which for a twist angle in a range of about 35° to 40° if multiplied by a thickness of the liquid crystal layer produces a product in the range of not less than about 98 nm and not more than about 220 nm, or not less than about 323 nm and not more than about 437 nm, and which for a twist angle in a range of about 40° to 45° if multiplied by a thickness of the liquid crystal layer produces a product in the range of not less than about 100 nm and not more than about 240 nm, or not less than about 300 nm and not more than about 432 nm a circular polarizing unit that selectively passes either right handed or left handed substantially circularly polarized light out of a plurality of wavelengths of natural light in the visible spectrum, wherein, the circular polarizing unit is disposed such that a major surface of the circular polarizing unit is on a liquid crystal layer side, the substantially circularly polarized light exiting the circular polarizing unit through the major surface when natural light enters the circular polarizing unit, and wherein, said incoming substantially circularly polarized light being linearly polarized at a surface of said first substrate in a plurality of directions respectively representative of said plurality of wave lengths of said natural light to thereby create a display.

5. The liquid crystal display device as set forth in any one of claims 1, 2, 3 and 4, wherein the first substrate having a light reflectibility includes a light reflective film, and the light reflective film has smooth and continuously changing concavities and convexities, and is made of a conductive material.

6. The liquid crystal display device as set forth in any one of claims 1, 2, 3 and 4, further comprising:
one of an optical retardation compensator unit and a plurality of optical retardation compensator units provided between the circular polarizing unit and the liquid crystal layer to minimize influence from a residual phase difference of the liquid crystal layer.

7. The liquid crystal display device as set forth in any one of claims 1, 2, 3 and 4, wherein
the circular polarizing unit performs as an optical retardation compensator that minimizes influence from a residual phase difference of the liquid crystal layer during application of a voltage to the liquid crystal layer.

8. The liquid crystal display device as set forth in any one of claims 1, 2, 3 and 4, wherein the circular polarizing unit includes,
a first optical retardation compensator plate,
a second optical retardation compensator plate having a retardation in a substrate normal direction set to not less than 200 nm and not more than 360 nm, and
a linear polarizer plate, and
wherein, $|2\times\theta2-\theta1|$ has a value not less than 35° and not more than 55°, where $\theta1$ represents an angle formed by a slow axis of the first optical retardation compensator plate and either a transmission axis or an absorption axis of the linear polarizer plate, and $\theta2$ represents an angle formed by a slow axis of the second optical retardation compensator plate and either the transmission axis or the absorption axis of the linear polarizer plate,
a direction of the slow axis of the first optical retardation compensator plate is parallel to an alignment direction of a liquid crystal in a middle of the liquid crystal later in a thickness direction, and
a retardation in the substrate normal direction of the first optical retardation compensator plate is set to a retardation that is smaller, by 10 nm to 50 nm, than a retardation for not less than 100 nm and not more than 180 nm that provides, across an entire visible range, a phase difference equivalent to a quarter wavelength.

9. The liquid crystal display device as set forth in any one of claims 1, 2, 3 and 4, wherein the circular polarizing unit includes,
a first optical retardation compensator plate,
a second optical retardation compensator plate having a retardation in a substrate normal direction set to not less than 200 nm and not more than 360 nm, and
a linear polarizer plate, and
wherein, $|2\times\theta2-\theta1|$ has a value not less than 35° and not more than 55°, where $\theta1$ represents an angle formed by a slow axis of the first optical retardation compensator plate and either a transmission axis or an absorption axis of the linear polarizer plate, and $\theta2$ represents an angle formed by a slow axis of the second optical retardation compensator plate and either the transmission axis or the absorption axis of the linear polarizer plate,
the slow axis of the first optical retardation compensator plate is orthogonal to an alignment direction of a liquid crystal in a middle of the liquid crystal layer in a thickness direction, and
a retardation in the substrate normal direction of the first optical retardation compensator plate is set to a retardation that is greater, by 10 nm to 50 nm, than a retardation for not less than 100 nm and not more than 180 nm that provides, across an entire visible range, a phase difference equivalent to a quarter wavelength.

10. A liquid crystal display device, comprising:
a first substrate having a light reflectibility;
a second substrate having a light transmissibility;
a liquid crystal layer sandwiched between the first substrate and the second substrate, the liquid crystal layer being composed of twist-aligned nematic liquid crystal having,
a dielectric anisotropy,
a birefringence difference, which if multiplied by a thickness of the liquid crystal layer produces a product in the range of not less than 100 nm and not more than 185 nm, or not less than 385 nm and not more than 430 nm, and
a twist angle in a range of 0° to 45°; and
a circular polarizing unit, including a single linear polarizer plate, that selectively passes either right handed or left handed substantially circularly polarized light out of a plurality of wavelengths of natural light in the visible spectrum,
wherein, the circular polarizing unit is disposed such that a major surface of the circular polarizing unit is on a liquid crystal layer side, the substantially circularly polarized light exiting the circular polarizing unit through the major surface when natural light enters the circular polarizing unit, and
wherein, said incoming substantially circularly polarized light being linearly polarized at a surface of said first substrate in a plurality of directions respectively representative of said plurality of wave lengths of said natural light to thereby create a display.

11. A liquid crystal display device, comprising:
a first substrate having a light reflectibility;
a second substrate having a light transmissibility;
a liquid crystal layer sandwiched between the first substrate and the second substrate, the liquid crystal layer being composed of twist-aligned nematic liquid crystal having,
a dielectric anisotropy,
a birefringence difference, which if multiplied by a thickness of the liquid crystal layer produces a product in the range of not less than 95 nm and not more than 125 nm, and
a twist angle in a range of 0° to 45°; and
a circular polarizing unit, including a single linear polarizer plate, that selectively passes either right handed or left handed substantially circularly polarized light out of a plurality of wavelengths of natural light in the visible spectrum,
wherein, the circular polarizing unit is disposed such that a major surface of the circular polarizing unit is on a liquid crystal layer side, the substantially circularly polarized light exiting the circular polarizing unit through the major surface when natural light enters the circular polarizing unit, and
wherein, said incoming substantially circularly polarized light being linearly polarized at a surface of said first substrate in a plurality of directions respectively representative of said plurality of wave lengths of said natural light to thereby create a display.

12. A liquid crystal display device, comprising:
a first substrate having a light reflectibility;
a second substrate having a light transmissibility;

a liquid crystal layer sandwiched between the first substrate and the second substrate, the liquid crystal layer being composed of twist-aligned nematic liquid crystal having,
a dielectric anisotropy, and
a birefringence difference $\Delta n$, a thickness of the liquid crystal layer d, and a twist angle $\phi_{tw}$ in the range of 0° to 45°, such that the value of the function $$f_{vis} = k \int_{380}^{780} \bar{y}(\lambda) S_{D65}(\lambda) f(\lambda) d\lambda$$

is 0.7 or higher, where $$k = 1 \bigg/ \int_{380}^{780} \bar{y}(\lambda) S_{D65}(\lambda) d\lambda$$

$\bar{y}(\lambda)$ is the visual sensitivity curve of the color matching function of CIE1931,
$S_{D65}(\lambda)$ is the spectrum density of a $D_{65}$ standard light source, $$f(\lambda) = 1 - \{1 - 2\phi_{ref}^2 (\sin c\sqrt{\phi_{ref}^2 + \phi_{ref}^2})^2\}^2$$

$$\phi_{ret} = \pi \frac{\Delta nd}{\lambda}$$

and $$\sin cX = \frac{\sin X}{X};$$

and
a circular polarizing unit, including a single linear polarizer plate, that selectively passes either right handed or left handed substantially circularly polarized light out of a plurality of wavelengths of natural light in the visible spectrum,
wherein, the circular polarizing unit is disposed such that a major surface of the circular polarizing unit is on a liquid crystal layer side, the substantially circularly polarized light exiting the circular polarizing unit through the major surface when natural light enters the circular polarizing unit, and
wherein, said incoming substantially circularly polarized light being linearly polarized at a surface of said first substrate in a plurality of directions respectively representative of said plurality of wave lengths of said natural light to thereby create a display.

13. A liquid crystal display device, comprising:
a first substrate having a light reflectibility;
a second substrate having a light transmissibility;
a liquid crystal layer sandwiched between the first substrate and the second substrate, the liquid crystal layer being composed of twist-aligned nematic liquid crystal having a dielectric anisotropy and a twist angle in a range of 0° to 45°; and
a circular polarizing unit that selectively passes either right handed or left handed substantially circularly polarized light out of a plurality of wavelengths of natural light in the visible spectrum,
wherein, the circular polarizing unit is disposed such that a major surface of the circular polarizing unit is on a liquid crystal layer side, the substantially circularly polarized light exiting the circular polarizing unit through the major surface when natural light enters the circular polarizing unit, and
wherein, said incoming substantially circularly polarized light being linearly polarized at a surface of said first substrate in a plurality of directions respectively representative of said plurality of wave lengths of said natural light to thereby create a display.

* * * * *